(12) United States Patent
Kikkoji et al.

(10) Patent No.: US 9,264,468 B2
(45) Date of Patent: Feb. 16, 2016

(54) RECORDING DEVICE, RECORDING METHOD, AND PROGRAM

(75) Inventors: Hiroyuki Kikkoji, Tokyo (JP); Nozomu Okuzawa, Tokyo (JP); Shinsuke Yamashita, Kanagawa (JP); Jun Moriya, Tokyo (JP); Yasuhiro Murase, Tokyo (JP)

(73) Assignee: SONY CORPORATION, Tokyo (JP)

(*) Notice: Subject to any disclaimer, the term of this patent is extended or adjusted under 35 U.S.C. 154(b) by 2123 days.

(21) Appl. No.: 10/556,729

(22) PCT Filed: May 18, 2004

(86) PCT No.: PCT/JP2004/007018
§ 371 (c)(1),
(2), (4) Date: Nov. 14, 2005

(87) PCT Pub. No.: WO2005/006608
PCT Pub. Date: Jan. 20, 2005

(65) Prior Publication Data
US 2007/0071418 A1 Mar. 29, 2007

(30) Foreign Application Priority Data

Jul. 14, 2003 (JP) ................................. 2003-274302
Aug. 11, 2003 (JP) ................................. 2003-291741
Sep. 4, 2003 (JP) ................................. 2003-313167
Sep. 25, 2003 (JP) ................................. 2003-332895

(51) Int. Cl.
*H04L 29/06* (2006.01)
*G06Q 30/00* (2012.01)
*H04L 29/08* (2006.01)

(52) U.S. Cl.
CPC ............ *H04L 65/4076* (2013.01); *G06Q 30/00* (2013.01); *H04L 29/06* (2013.01); *H04L 65/4084* (2013.01); *H04L 67/02* (2013.01); *H04L 67/325* (2013.01)

(58) Field of Classification Search
USPC ............... 705/50–79; 455/3.01–3.06; 707/27; 725/88, 101, 102
See application file for complete search history.

(56) References Cited

U.S. PATENT DOCUMENTS

| | | | |
|---|---|---|---|
| 4,405,942 A * | 9/1983 | Block | ................. H04N 7/1696 348/E7.059 |
| 5,481,294 A | 1/1996 | Thomas et al. | |

(Continued)

FOREIGN PATENT DOCUMENTS

| | | |
|---|---|---|
| JP | 7-30843 | 1/1995 |
| JP | 8-162981 | 6/1996 |

(Continued)

OTHER PUBLICATIONS

Chan, S.H.G.; Tobagi, F., "Distributed servers architecture for networked video services," Networking, IEEE/ACM Transactions on , vol. 9, No. 2, pp. 125-136, Apr. 2001.*

(Continued)

*Primary Examiner* — Mamon Obeid
(74) *Attorney, Agent, or Firm* — Oblon, McClelland, Maier & Neustadt, L.L.P.

(57) ABSTRACT

A content receiving apparatus including a receiver receiving first contents from a broadcasting station, a temporary memory unit temporarily storing first contents-related information related to the first contents, a memory storing the first contents and storing, based on an input recording request, the first contents-related information; and the memory storing a plurality of second contents and a plurality of second contents-related information received from a server, the second contents-related information being related to the first contents, and displayable.

16 Claims, 19 Drawing Sheets

(56) References Cited

U.S. PATENT DOCUMENTS

| | | | |
|---|---|---|---|
| 5,640,590 A * | 6/1997 | Luther | G06F 3/16 715/201 |
| 5,961,603 A * | 10/1999 | Kunkel et al. | 709/229 |
| 6,038,434 A * | 3/2000 | Miyake | 455/186.1 |
| 6,205,419 B1 * | 3/2001 | Fiedler | 704/201 |
| 6,272,472 B1 * | 8/2001 | Danneels et al. | 705/27 |
| 6,484,182 B1 * | 11/2002 | Dunphy | G06F 17/30958 700/231 |
| 6,505,160 B1 * | 1/2003 | Levy et al. | 704/270 |
| 6,507,727 B1 * | 1/2003 | Henrick | G06Q 30/06 348/E7.071 |
| 6,912,431 B2 * | 6/2005 | Kim et al. | 700/83 |
| 6,961,858 B2 * | 11/2005 | Fransdonk | G06F 21/10 380/281 |
| 7,020,635 B2 * | 3/2006 | Hamilton | G06Q 20/00 705/51 |
| 7,028,096 B1 * | 4/2006 | Lee | 709/231 |
| 7,080,049 B2 * | 7/2006 | Truitt | G06Q 20/16 380/30 |
| 7,107,462 B2 * | 9/2006 | Fransdonk | G06Q 20/12 380/282 |
| 7,150,045 B2 * | 12/2006 | Koelle | G06F 21/552 380/201 |
| 7,164,882 B2 * | 1/2007 | Poltorak | 455/3.06 |
| 7,171,174 B2 * | 1/2007 | Ellis et al. | 455/132 |
| 7,191,467 B1 * | 3/2007 | Dujari et al. | 726/5 |
| 7,343,141 B2 * | 3/2008 | Ellis et al. | 455/132 |
| 7,587,502 B2 * | 9/2009 | Crawford | A63F 13/12 463/42 |
| 7,631,036 B2 * | 12/2009 | Kikkoji | H04H 20/82 709/203 |
| 7,711,586 B2 * | 5/2010 | Aggarwal | G06Q 10/02 700/14 |
| 8,073,898 B2 * | 12/2011 | Kikkoji | H04H 60/27 709/203 |
| 2001/0034219 A1 * | 10/2001 | Hewitt | G06Q 30/02 455/186.1 |
| 2002/0116360 A1 * | 8/2002 | Oh | G06Q 30/02 |
| 2003/0060157 A1 * | 3/2003 | Henrick | G06Q 30/06 455/3.04 |
| 2003/0063752 A1 * | 4/2003 | Medvinsky | G06F 21/10 380/279 |
| 2004/0073693 A1 * | 4/2004 | Slater | G11B 27/002 709/231 |
| 2004/0255135 A1 * | 12/2004 | Kitaya | G06F 21/10 713/193 |
| 2005/0060701 A1 | 3/2005 | Murase | |
| 2005/0091679 A1 | 4/2005 | Tanaka et al. | |
| 2006/0168651 A1 * | 7/2006 | Araki | G06Q 10/107 726/6 |
| 2006/0209733 A1 * | 9/2006 | Iwatsu | H04L 29/06 370/312 |
| 2006/0230910 A1 * | 10/2006 | Song | G10H 1/0025 84/616 |
| 2007/0073649 A1 * | 3/2007 | Kikkoji | H04H 60/74 |
| 2008/0046466 A1 * | 2/2008 | Yun | G06F 21/10 |
| 2013/0132509 A1 * | 5/2013 | Styles | H04L 67/06 709/217 |

FOREIGN PATENT DOCUMENTS

| | | |
|---|---|---|
| JP | 9-503636 | 4/1997 |
| JP | 11-55201 | 2/1999 |
| JP | 11-73730 | 3/1999 |
| JP | 200-36949 | 2/2000 |
| JP | 2000-36158 | 2/2000 |
| JP | 2000-222360 | 8/2000 |
| JP | 2001-216434 | 8/2001 |
| JP | 2001-309349 A | 11/2001 |
| JP | 2002-198841 | 7/2002 |
| JP | 2002-218377 | 8/2002 |
| JP | 2002-319226 | 10/2002 |
| JP | 2002-342420 | 11/2002 |
| JP | 2002-358283 | 12/2002 |
| JP | 2003-60596 | 2/2003 |
| JP | 2003-67661 | 3/2003 |
| JP | 2003-92556 | 3/2003 |
| JP | 2003-203467 | 7/2003 |
| JP | 2003-208369 | 7/2003 |
| KR | 2002-0065724 A | 8/2002 |
| WO | WO 02/32026 A1 | 4/2002 |

OTHER PUBLICATIONS

IEEE, "IEEE 100: the authoritative dictionary of IEEE standards terms", seventh edition, pp. 204, 684, 934, 1112, 1234, 1235. Published Dec. 2000.*
U.S. Appl. No. 10/526,902, filed Aug. 16, 2005, Yamashita et al.
U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.
Supplemental European Search Report issued Mar. 18, 2014 in Patent Application No. 04733636.7.

* cited by examiner

RECORDING DEVICE, RECORDING METHOD, AND PROGRAM

TECHNICAL FIELD

This invention relates to a recording apparatus, a recording method and a program. More particularly, the present invention relates to a recording apparatus, a recording method and a program for acquiring sounds and images of programs broadcast by radio and TV broadcasting and information provided by way of networks.

BACKGROUND ART

Radio and TV stations (to be referred to simply as "broadcasting stations" hereinafter) broadcast various programs. Viewers/listeners watch and listen to programs by receiving broadcast signals transmitted from various stations by means of radio receiving sets and TV receiving sets. Viewers/listeners can generally record broadcast information in the form of sounds and images of programs broadcast by broadcasting stations on certain conditions that are required to be met.

Broadcasting stations publicize information on broadcast programs such as the contents of broadcast programs and information on the pieces of music broadcast in programs (the titles and the names of the performing artists as well as the titles, the numbers, the released years and the selling agents of CDs (compact disks) where pieces of music are recorded along with the times and dates when the pieces of music are broadcast) and allow anyone who wants such information to acquire it by way of a personal computer (PC) or the like that is connected to the broadcasting station by way of a network.

Currently, such acquired information can be used to receive various services. For example, a person who has acquired such information can have pieces of music delivered to him or her and/or purchase CDs where such pieces of music are recorded by using the information on the pieces of music that the person has acquired.

There have been proposed systems where broadcasting stations broadcast music data, or pieces of music, and also they broadcast in advance image data such as jacket photographs for such pieces of music, text data including the titles of such pieces of music and sound data including sample sounds and compressed/encrypted data of proper music data so that users can receive them at their user terminals to watch the received images and/or listen to the received sounds. Additionally, with the proposed system, the user can acquire the proper music data during or after watching and/or listening by carrying out predetermined operations at the user terminal, using the compressed/encrypted data recorded in the user terminal, typically by way of an EMD (electric music distribution) server (see, inter alia, Patent Document 1: Japanese Patent Application Laid-Open Publication No. 2000-183835 (paragraph numbers [0019]~[0026], FIG. 1).

However, when the user is required to watch images and/or listen to sounds and record information on pieces of music while they are being broadcast so that he or she may sometime thereafter retrieve the delivered pieces of music or merchandised CDs where the pieces of music are recorded, using the recorded information, it may be difficult for the user to accurately recollect the sounds of the pieces of music and the images relating to them, if the user simply knows the titles of the pieces of music, the names of the performing artists, the time and date of the broadcast and so on, particularly when the number of pieces of music is large and hence a large number of names and other pieces of information are involved. Then, if the user has to select a CD, although he or she wants to acquire ten pieces of music, for example, because of the limited budget, it may be difficult for the user to tell which one he or she is most concerned about is.

Additionally, while it is possible for the user to identify pieces of music after they are broadcast by listening to sample sounds contained in the broadcast data if he or she wants to acquire the proper music data by means of such a known system, the system configuration and the configuration of the broadcast data that are transmitted from the broadcasting station to the user terminal are inevitably complex.

DISCLOSURE OF THE INVENTION

In view of the above-identified circumstances, it is therefore an object of the present invention to provide a recording apparatus, a recording method and a program that allow a user to identify a specific piece of information out of a plurality of pieces of recorded information without requiring a complex system.

In an aspect of the present invention, the object of the present invention is achieved by providing a recording apparatus comprising: a reception means for receiving contents-related information relating to contents contained in broadcast information being received; a temporary memory means for temporarily storing the contents-related information; a related information recording means for recording the contents-related information stored in the temporary memory means in a keeping means in response to a recording request input externally; and a broadcast information recording means for recording the broadcast information being received in the keeping means, relating it to the related information to be recorded in the keeping means, in response to the externally input recording request.

With a recording apparatus having the above-described configuration, the reception means receives the contents-related information contained in the broadcast information that is being received and the temporary memory means temporarily stores the contents-related information. Then, the related information recording means records the contents-related information in the temporary memory means in a keeping means in response to a recording request that is input externally, and the broadcast information recording means records the broadcast information being received in the keeping means, relating it to the related information to be recorded in the keeping-means. Since the related information are related to the broadcast information that is being received and recorded in the keeping means, the related information that is related to the broadcast information can be identified with ease anytime thereafter.

In another aspect of the present invention, there is provided a recording method comprising: a reception step of receiving contents-related information relating to contents contained in broadcast information being received; a temporarily storing step of temporarily storing the contents-related information; a related information recording step of recording the contents-related information stored in the temporarily storing step in a keeping means in response to a recording request input externally; and a broadcast information recording step of recording the broadcast information being received in the keeping means, relating it to the related information to be recorded in the keeping means, in response to the externally input recording request.

With a recording method having the above-described configuration, the contents-related information contained in the broadcast information that is being received is received in the reception step and temporarily stored in the temporarily storing step. Then, the related information stored in the temporarily storing step is recorded in the keeping means in a related information recording step and then the broadcast information being received in the broadcast information recording step is related to the related information to be recorded in the keeping means and actually recorded in the keeping means.

In still another aspect of the present invention, there is provided a program for causing a computer to execute a process of receiving contents-related information relating to contents contained in broadcast information being received; temporarily storing the contents-related information; recording the temporarily stored contents-related information in a keeping means in response to a recording request input externally; and recording the broadcast information being received in the keeping means, relating it to the related information to be recorded in the keeping means, in response to the externally input recording request.

With a program having the above-described configuration, the contents-related information contained in the broadcast information that is being received is received and temporarily stored. Then, the related information that is temporarily stored is recorded in a keeping means in response to a recording request input externally and then the broadcast information being received is related to the related information to be recorded in the keeping means and actually recorded in the keeping means.

Thus, according to the invention, when recording the contents-related information contained in the broadcast information that is being received, the broadcast information being received is related to the related information at the time of recording so that the related information can be discriminated from other related information and identified with ease by using the broadcast information that is related to the related information when checking related information. Then, the user can accurately recollect the piece of music with which he or she is most concerned about when checking related information. Therefore, the outcome of the operation of retrieving the related information is highly reliable and hence the user can reliably receive a service of delivering the piece of music or buy a merchandised CD where the piece of music is recorded. Then, the market for such music-related services can be expanded. Such a market can by turn do a lot for creating new music cultures.

BEST MODE FOR CARRYING OUT THE INVENTION

Now, the present invention will be described in greater detail by referring to the accompanying drawings that illustrate preferred embodiments of the invention.

Figure 1:
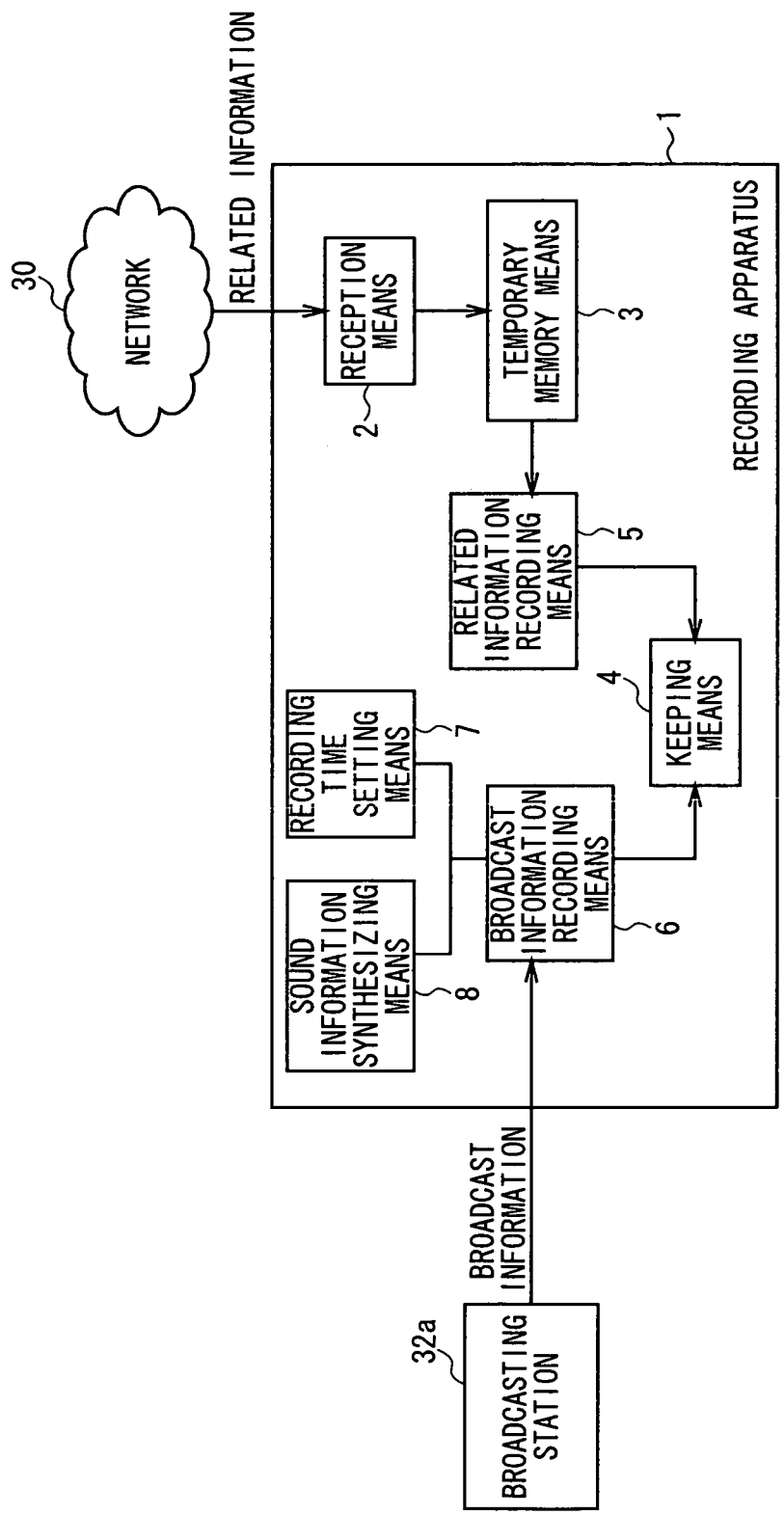
FIG. 1 is a schematic block diagram of an embodiment of recording apparatus according to the invention, illustrating the principle and the configuration thereof.

(1) Principle and Configuration of a Recording Apparatus According to the Invention FIG. 1 is a schematic block diagram of an embodiment of recording apparatus according to the invention, illustrating the principle and the configuration thereof.

The recording apparatus 1 illustrated in FIG. 1 can receive broadcast information from broadcasting station 32a and record it. Additionally, it can record contents-related information relating to contents that is provided by way of a network 30.

More specifically, the recording apparatus 1 includes a reception means 2 having a function of receiving broadcast information and outputting and displaying sound and images and also a function of receiving related information relating to the contents such as pieces of music that are contained in the broadcast information it receives (e.g., titles of the pieces of music and the names of the performing artists as well as the titles, the numbers, the released years and the selling agents of CDs where pieces of music are recorded along with the times and dates when the pieces of music are broadcast) and a temporary memory means 3 for temporarily storing the related information received by the reception means 2. The broadcast information may contain the contents of the related information.

The recording apparatus 1 additionally comprises a related information recording means 5 for recording the related information that is temporarily stored in the temporary memory means 3 in a keeping means 4 when a recording request is input to the recording apparatus 1 and a broadcast information recording means 6 for recording the broadcast information being received, relating it to the related information recorded in the keeping means 4.

The recording apparatus 1 further comprises a recording time setting means 7 for setting the recording time period of the broadcast information to be recorded by the broadcast information recording means 6 and a sound information synthesizing means 8 for synthesizing sound information with the broadcast information to be recorded.

The temporary memory means 3 and the keeping means 4 may typically be part of the recording apparatus or the recording region that the recording apparatus 1 has or that is connected to the recording apparatus 1.

When recording contents-related information relating to contents of such as pieces of music in the recording apparatus 1, the recording apparatus 1, for instance, records the broadcast information it is receiving, relating it to the related information from the clock time when it received the recording request for recording the related information.

In this case, if the user of the recording apparatus 1 wants to record the related information on a broadcast piece of music, a recording request for recording the related information relating to the piece of music is input to the recording apparatus 1 as the user carries out a predetermined operation on the recording apparatus 1. Then, as the recording request is in put, the recording apparatus 1 records the related information received by the reception means 2 and temporarily stored in the temporary memory means 3 in the keeping means 4 by way of the related information recording means 5. At the same time the recording apparatus 1 starts recording the sounds and the images of the broadcast information it is receiving and records it by way of the broadcast information recording means 6 for a predetermined time period. The recording apparatus 1 performs this recording operation, relating it to the related information recorded in the keeping means 4. Thus, the recording apparatus 1 records the broadcast information from the clock time when the recording request is input to it for the related information, relating to the broadcast information to the related information.

Alternatively, it may be so arranged that, when the recording apparatus 1 records related information relating to contents such as a piece of music, it records broadcast information before and after the input of the recording request, relating it to the related information.

If such is the case, the recording apparatus 1 starts recording the sounds and the images of the broadcast information it is receiving at a predetermined clock time such as the clock time when the user starts listening the program that is being broadcast and for a predetermined time period in the keeping means 4 by way of the broadcast information recording means 6. When the predetermined time period has passed, the recording apparatus 1 determines if a recording request is made by the user for the related information or not. If it determines that there is no recording request, it starts recording the sounds and the images of the broadcast information it is receiving for a predetermined time period in the keeping means 4. Now, the recording apparatus 1 overwrites the contents it has recorded so that it operates as ring recording apparatus for continuously recording the preceding broadcast information and the succeeding broadcast information (by ring buffer recording).

If, on the other hand, the recording apparatus 1 determines when the predetermined time period has passed that there is a recording request made by the user, it records the related information temporarily stored in the temporary memory means 3 in the keeping means 4 by way of the related information recording means 5 starting from the clock time when the recording request is made. At the same time, the recording apparatus 1 records the broadcast information in the keeping means 4 by way of the broadcast information recording means 6 for another predetermined time period from the clock time when the predetermined time period has passed. At this time, it records the broadcast information, relating it to the related information recorded in the keeping means 4. Thus, the recording apparatus 1 records the broadcast information before and after the input of the recording request, relating it to the related information.

In this way, as the related information is related to the broadcast information at the time when a recording request is made and recorded, it is possible for the user to easily discriminate the related information from other related information and identify it, using the broadcast information related to the related information, when viewing the related information that has been recorded.

The time period for which the recording apparatus 1 records broadcast information can be appropriately defined by the user by way of the recording time setting means 7.

The contents of the broadcast information and those of the related information that are recorded in the keeping means 4 may not be directly linked to each other. For example, when recording related information relating to a piece of music, the broadcast information to be recorded for a predetermined time period in response to a recording request may contain the voice of the host, or the presenter, of the program in which the piece of music is broadcast in addition to the sounds of the piece of music. The broadcast information may not contain the sounds of the piece of music but contain the sounds of the pieces of music broadcast that are before and after the piece of music. The related information can be discriminated and identified with ease when the broadcast information that is being broadcast when the recording request for recording the related information is input is recorded.

It is also possible for the recording apparatus 1 to synthetically combine sound information such as a beeping sound with the broadcast information when the recording request is made for the related information and record the broadcast information synthetically combined with the sound information, relating it to the related information. With this arrangement, it is very clear when the recording request is input and hence at what clock time in the broadcast information the user wants to record the related information in the time period of the broadcast information that is recorded before and after the clock time when the recording request is made for recording the related information. Then, the user can confirm the relationship between the related information and the broadcast information and identify the related information more accurately.

In the following description of a preferred embodiment, a network where the recording apparatus 1 is used as terminal apparatus connected to the server of a broadcasting station by way of the network and the user of the terminal apparatus receives broadcast information such as a piece of music from the broadcasting station and, at the same time, can acquire related information relating to the piece of music that the server of the broadcasting station provides by way of the network will be described.

The related information relating to the piece of music includes the title and the names of the performing artists as well as the title, the number, the released year and the selling agent of the CD where the piece of music is recorded along with the times and dates when the pieces of music are broadcast. In the following description, a process of recording related information when the user acquires the related information of a piece of music is referred to as "clip" and the related information that is clipped is referred to as "clip information".

(2) First Embodiment

Figure 2:
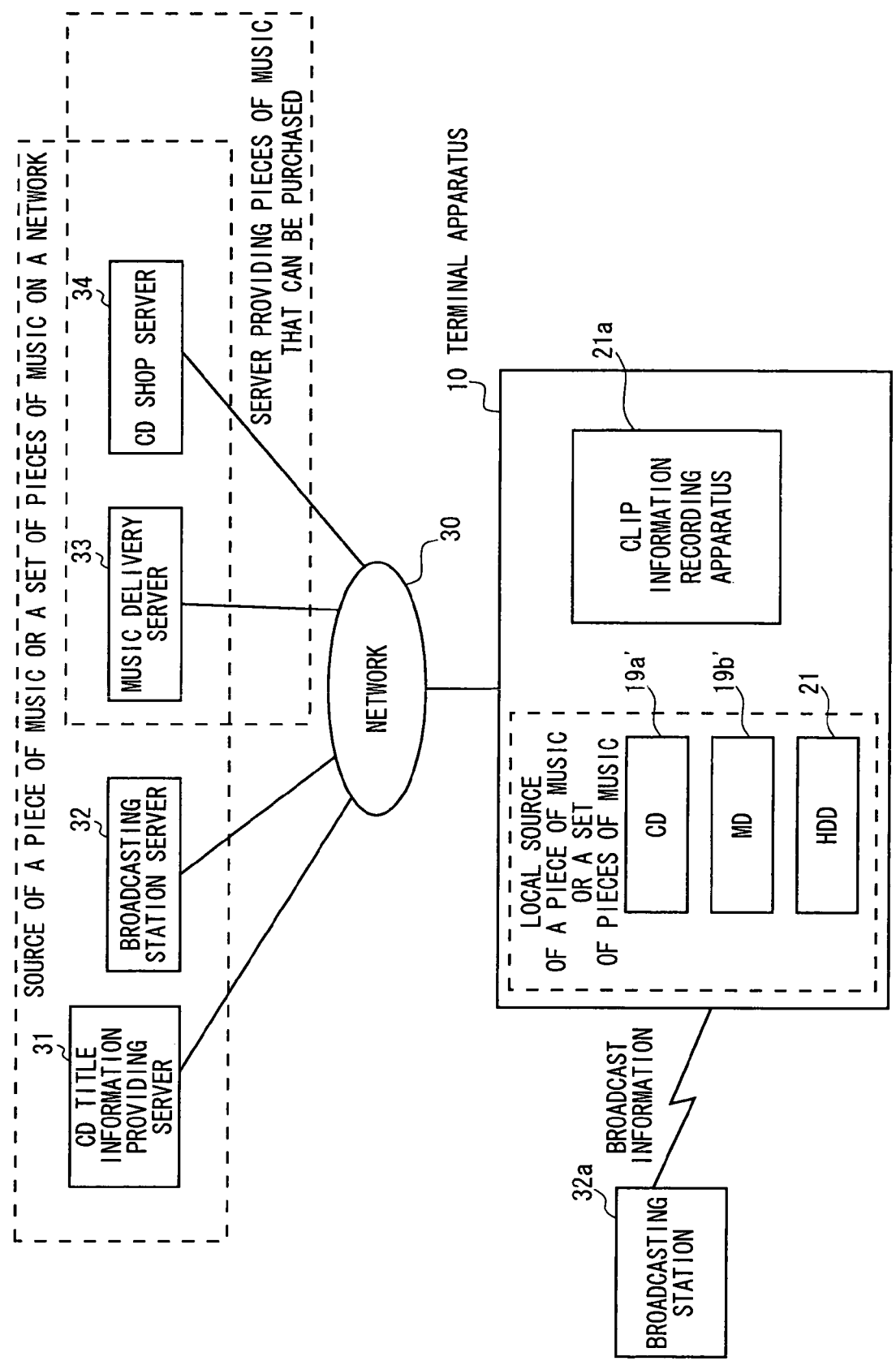
FIG. 2 is a schematic block diagram of a network system that can be used with the first embodiment of the present invention.

FIG. 2 is a schematic block diagram of a network system that can be used with the first embodiment of the present invention.

Referring to FIG. 2, terminal apparatus 10 is connected to various servers by way of network 30. The network 30 is, for instance, an Internet server. The network 30 may be the Internet. Servers that can be used for the purpose of the present invention include a CD title information providing server 31, a broadcasting station server 32, a music information delivery server 33 and CD shop server 34.

The CD title information providing server 31 provides services of delivering related information relating to pieces of music recorded on commercially available CDs and sound data of pieces of music for auditions.

The broadcasting station server 32 is a server managing broadcasting station 32a for FM broadcasting, TV broadcasting and/or some other broadcasting. The function of the broadcasting station server 32 for providing related information is roughly subdivided into two categories. The first one is a function of providing related information relating to the piece of music that is currently being broadcast (now-on-air). The second one is a function of providing a list of related information relating to the pieces of music that have already been broadcast (on-air list) in response to a request from a terminal apparatus 10. For example, the broadcasting station server 32 may provide related information relating to the pieces of music that were broadcast in a specified program and related information relating to the pieces of music that were broadcast in a specified time zone.

The music delivery server 33 is a server providing services of delivering digital data on pieces of music (music data). For example, the music delivery server 33 may provide music data only to the terminal apparatus 10 that have subscribed for one or more than one pieces of music. The music delivery server 33 may also provide related information relating to the pieces of music it delivers.

The CD shop server 34 is a server for receiving orders for mail-order sale of CDs. The CD shop server 34 provides services of delivering sound data for auditions and also of providing related information relating to the pieces of music recorded on the CDs being on sale.

In this way, a plurality of servers provide information relating to a piece of music or a set of pieces of music on the network 30. In other words, each of the servers operates as a source of a piece of music or a set of pieces of music on the network 30.

Note, however, that the servers shown in FIG. 2 are only examples of apparatus that provide sources of a piece of music or a set of pieces of music through the network 30. In other words, an apparatus that provides a source of a piece of music or a set of pieces of music that can be accessed from some other apparatus on the network 30 can operate as a source of a piece of music or a set of pieces of music on the network 30.

The music delivery server 33 and the CD shop server 34 are servers from which a piece of music can be purchased. In other words, they operate to sell the sound data of a piece of music or the sound data of a set of pieces of music online. Therefore, a user can actually purchase a piece of music or a set of pieces of music by accessing a server selling a piece of music by operating the terminal apparatus 10 by way of the network 30. The user of the terminal apparatus 10 can download the sound data from the music delivery server 33 by making a purchase contract with the music delivery server 33. The user of the terminal apparatus 10 can also have the CD shop server 34 deliver one or more than one CDs to his or her house by making a purchase contract with the CD shop server 34.

The terminal apparatus 10 locally holds sources of a piece of music or a set of pieces of music on recording mediums that may include a CD 19a', an MD (mini disk) 19b' and/or a hard disk drive (HDD) 21. The sources may vary depending on the type and the objective of the terminal apparatus 10.

Note that the local sources of a piece of music or a set of pieces of music illustrated in FIG. 2 are only examples. In other words, if the terminal apparatus 10 is a locally existing recording medium, it can operate as a local source of a piece of music or of a set of pieces of music when the piece of music is or the set of pieces of music are recorded on the recording medium.

The terminal apparatus 10 includes a clip information memory device 21a for recording (keeping) the clipped related information. The clip information memory device 21a is a secondary memory device of the terminal apparatus 10. For example, the terminal apparatus 10 can have part of the memory region of the HDD 21 or of some other medium device operate as clip information memory device 21a. Note that the terminal apparatus 10 can clip a piece of music or a set of pieces of music. Therefore, as the terminal apparatus 10 clips an entire FM broadcasting program or an entire CD music album that contains a large number of pieces of music that the user is concerned about, the group of pieces of music that the user is concerned about can be kept by a single clip operation.

Meanwhile, the terminal apparatus 10 of this embodiment can also operate as an audio appliance for replaying pieces of music.

Figure 3:
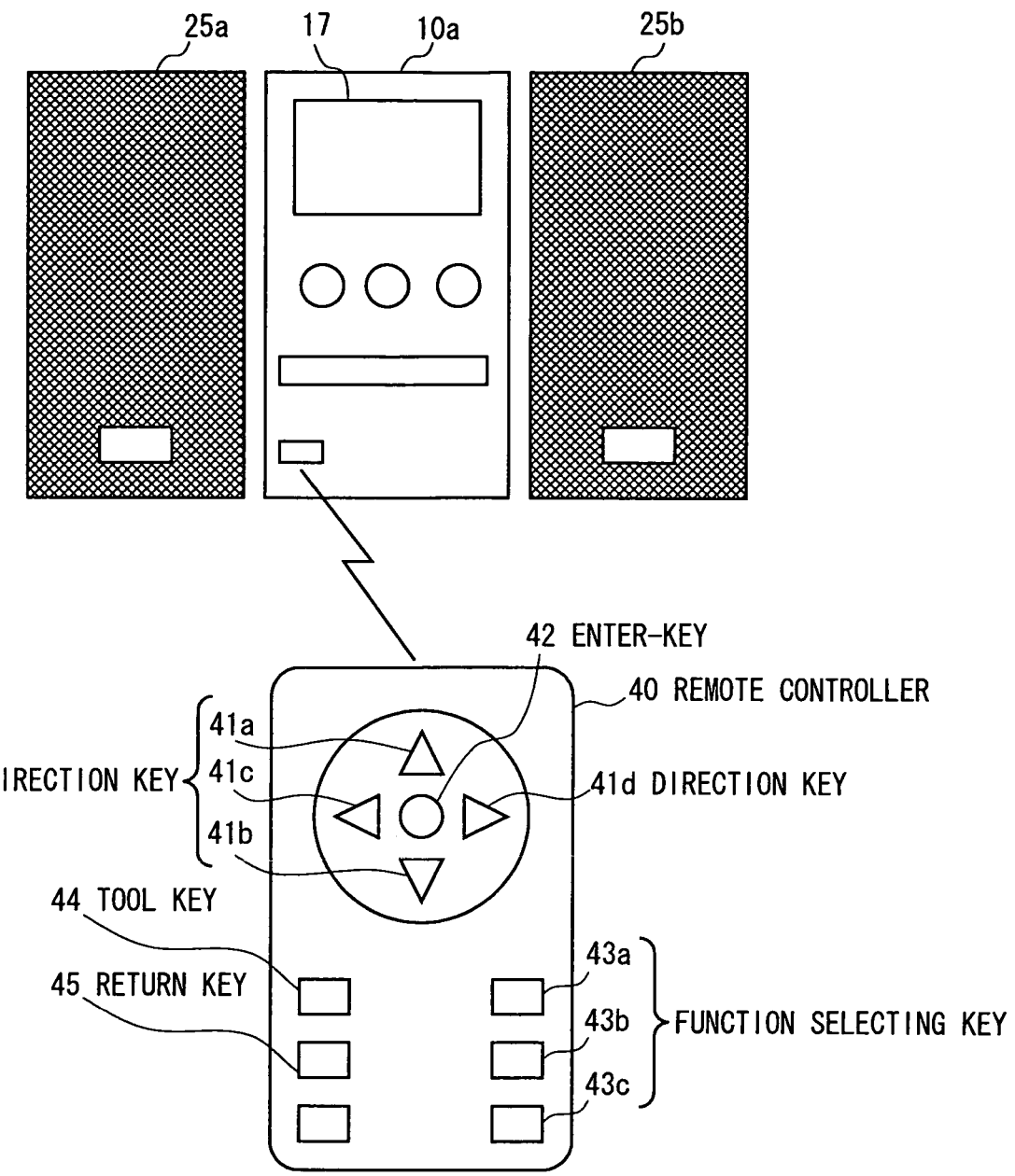
FIG. 3 is a schematic front view of a terminal apparatus.

FIG. 3 is a schematic front view of the terminal apparatus.

As shown in FIG. 3, the terminal apparatus 10 that can be used for this embodiment shows an appearance resembling that of an ordinary audio system component. The terminal apparatus 10 comprises an apparatus main body 10a, speakers 25a, 25b and a remote controller 40. The apparatus main body 10a has a function of replaying CDs and DVDs (digital versatile disks), that of recording pieces of music on and replaying an MD and that of receiving FM broadcasting and TV broadcasting. The speakers 25a, 25b output sounds as the sound signal generated by the apparatus main body 10a to the speakers 25a, 25b.

The apparatus main body 10a also has a display apparatus 17. The display apparatus 17 displays related information relating to the piece of music that is being replayed and/or clipped related information.

The remote controller 40 is an input apparatus for remotely operating the apparatus main body 10a. The remote controller 40 is provided with a plurality of operation keys. As one of the operation keys is depressed by the user, the remote controller 40 transmits a signal that corresponds to the depressed operation key to the apparatus main body 10a by a wireless communication means, which may be infrared rays.

The operation keys typically include direction keys 41a through 41d, an enter-key 42, function selecting keys 43a through 43c, a tool key 44 and a return key 45.

The direction keys 41a through 41d are used when moving the cursor being displayed on the display apparatus 17 or the lighted spot on the display apparatus 17. The four direction keys 41a through 41d correspond respectively to above, below, left and right so that the cursor or the lighted spot moves in the direction of the depressed key.

The enter-key 42 is typically used to confirm what is displayed on the display apparatus 17.

The function selecting keys 43a through 43c are used to select functions. For example, the three function selecting keys 43a through 43c may correspond respectively to a comprehensive service utilizing function, a tuner function, and a local contents managing function. As one of the function selecting keys is depressed, the apparatus main body 10a is brought into the operation mode of the function that corresponds to the depressed function selecting key.

The tool key 44 is a button for displaying a tool menu on the display apparatus 17. The tool menu contains commands that are selected according to what is displayed on the display apparatus 17. Thus, the user can select one of the commands from the tool menu and have the terminal apparatus 10 execute a process that corresponds to the selected command. For example, the user may select a command by operating any of the direction keys 41a through 41d and depress the enter-key 42. Then, the process that corresponds to the selected command is executed in the apparatus main body 10a. For instance, when information on the piece of music that is being broadcast is displayed on the display apparatus 17 as now-on-air information, the user of the terminal apparatus 10 can clip the piece of music, information on which is displayed, by selecting the clip command by means of the tool key 44 and one of the direction keys 41a through 41d and depressing the enter-key 42.

The return key 45 is a button for returning the display content on the display apparatus 17 to the state immediately before. Note that, the remote controller 40 can be provided with a plurality of operation keys other than the keys shown in FIG. 3. For example, such operation keys include a volume control key, replay key, and stop key for CDs or the like.

Now, the internal configuration of the terminal apparatus 10 will be described below.

Figure 4:
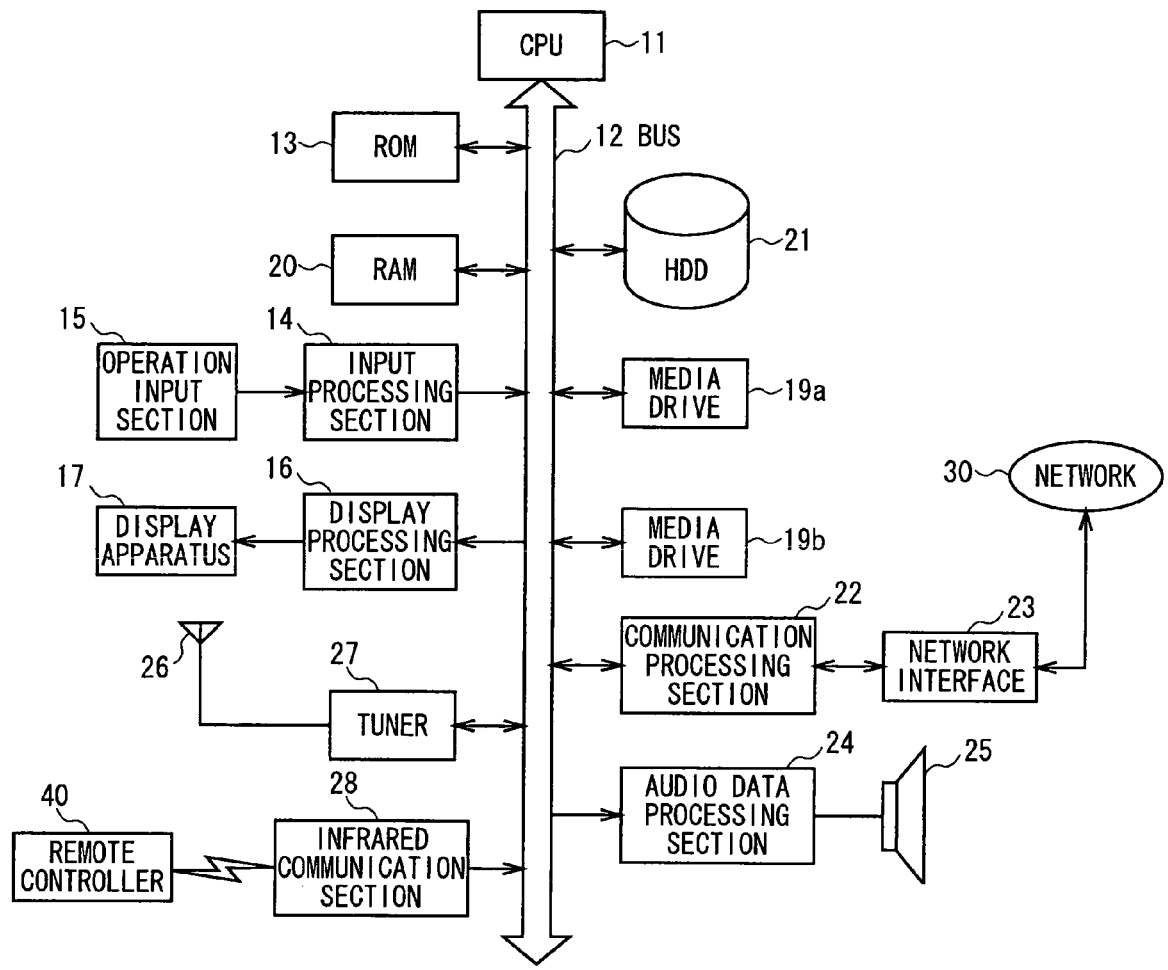
FIG. 4 is a schematic block diagram of the terminal apparatus of FIG. 3, illustrating the hardware configuration thereof.

FIG. 4 is a schematic block diagram of the terminal apparatus 10, illustrating the hardware configuration thereof.

It is possible to manage sources of pieces of music and record and replay pieces of music by means of the terminal apparatus 10 as shown in FIG. 4.

CPU (central processing unit) 11 controls the entire terminal apparatus 10 and executes processing operations according to the started program. For example, the CPU 11 may operate for communications by way of the network 30, execute input/output operations for the user, perform operations such as replaying and/or clipping contents from a media and storing and managing contents to the HDD 21 and retrieve information by way of the network 30 according to the clipped related information. Contents data that the terminal apparatus 10 of this embodiment can record and reproduce include audio contents data and video contents data of moving images. The CPU 11 transmits control signals to and exchanges data with any of the component circuit sections by way of a bus 12.

ROM (read only memory) 13 stores operation programs that the CPU 11 is supposed to execute, program loaders, various arithmetic coefficients and parameters to be used in programs. The program to be executed by the CPU 11 is developed in RAM (random access memory) 20. The RAM 20 also operates as data region and task region that are required when the CPU 11 executes various processes. For example, the related information that the terminal apparatus 10 receives from the server is temporarily stored in the RAM 20.

Operation input section 15 has various operation elements including operation keys, a jog dial and a touch panel that are arranged on the cabinet of the terminal apparatus 10. The terminal apparatus 10 may be provided in the operation input section 15 with a keyboard and a mouse for operating a GUI (graphical user interface). The information input to the operation input section 15 is subjected to a predetermined process in the input processing section 14 and transmitted to the CPU 11 as operation command. The CPU 11 controls and executes necessary processing operations so that the terminal apparatus 10 may operate in response to the input operation command.

Display processing section 16 is connected to display apparatus 17, which may typically be a liquid crystal display, to display various pieces of information on the display apparatus 17. As the CPU 11 supplies display data to the display processing section 16 according to the state of any of various operations, that of any of various input operations and/or that of communication, the display processing section 16 has the display apparatus 17 operate for displaying according to the display data supplied to it. For example, the display apparatus 17 may display the received broadcast information, the contents and the contents-related information delivered from a server and/or clip information. When one or more than one pieces of music are retrieved by way of the network 30, the outcome of the retrieval is displayed on the display apparatus 17.

Media drives 19a, 19b are drives that can record and reproduce contents of one or more than one pieces of music recorded on a portable recording medium (but it may only be able to reproduce contents depending on the type of the recording medium). It is not necessarily be limited to a single type of recording medium that the media drives 19a, 19b can operate for recording and reproducing contents. In other words, the media drives 19a, 19b may be able to record contents on and reproduce contents from recording mediums of a plurality of different types. For example, the media drive 19a may be adapted to reproduce contents from CDs and DVDs, whereas the media drive 19b may be adapted to record contents on and reproduce contents from MDs.

It should be noted here that the portable recording medium where one or more than one pieces of music are recorded is not limited to an optical recording medium such as CD or DVD. For example, a recording medium comprising a semiconductor memory such as flash memory that stores contents may be used for the purpose of the present invention. If such is the case, a reader/writer is connected to the bus 12 for the flash memory.

The user can enjoy a piece of music by inserting the recording medium (CD, DVD, MD or the like) where contents including the piece of music are recorded into the media drive 19a or 19b and carrying out a predetermined operation on the remote controller 40 or the operation input section 15. If, for example, the user operates the remote controller 40 for a replay operation of the media drive 19a, the CPU 11 issues a command for reproducing contents to the media drive 19a. Then, in response, the media drive 19a accesses the specified contents recorded on the recording medium that is loaded in it and reads out the contents.

If the contents that are read out in this way are audio contents, the CPU 11 executes a decoding process, if necessary, and subsequently transfers them to audio data processing section 24. Then, the audio data processing section 24 executes appropriate processes including a sound field process such as equalizing, a D/A conversion process and an amplification process on the audio data and outputs them from speaker section 25. The speaker section 25 comprises a plurality of speakers 25a, 25b as shown in FIG. 3 and can output stereo sounds.

The contents reproduced by the media drive 19a or 19b can be accumulated in the HDD 21 as audio data file under the control of the CPU 11. The audio data file may store the audio data in the CD format where audio data are quantized with 16 bits and sampled with a sampling frequency of 44.1 KHz. The contents may be subjected to a compression process of a predetermined system and stored in the HDD 21 as compressed audio data in order to save the capacity of the HDD 21. While any compression system may be used, compression systems that can be used for the purpose of the present invention include the ATRAC (advanced transform acoustic coding) system, the MP3 (MPEG audio layer—3) system, and the like.

Tuner 27 is typically an AM/FM radio tuner that demodulates the broadcast signal received by antenna 26 under the control of the CPU 11. However, it may be needless to say that the tuner 27 may be a TV tuner, a satellite broadcasting tuner or a digital broadcasting tuner. The demodulated broadcast signal is then subjected to a predetermined process in the audio data processing section 24 and output from the speaker section 25 as broadcast sounds. Or, the demodulated broadcast signal is then subjected to a predetermined process in the display processing section 16 and displayed on the display apparatus 17 as broadcast images.

The received broadcast signal (broadcast information) that has been subjected to a predetermined process in the audio data processing section 24 or the display processing section 16 under the control of the CPU 11 is then recorded in the HDD 21 or the clip information memory device 21a. At this time, the broadcast signal can be related to a specific piece of related information to be recorded in the clip information memory device 21a and recorded in the clip information memory device 21a under the control of the CPU 11.

Additionally and if necessary, appropriate sound information such as a beeping sound may be added to the received broadcast signal in the audio data processing section 24 or the display processing section 16 under the control of the CPU 11. For example, when a command for recording a broadcast signal in the HDD 21 is input to the CPU 11, sound information is added to the broadcast signal and the broadcast signal to which the sound information is added is recorded in the clip information recording apparatus 21a or some other appropriate recording apparatus.

The user can select the time period for which the broadcast signal is to be recorded in the clip information recording apparatus 21a or some other appropriate recording apparatus by means of the operation input section 15 or the remote controller 40. When the broadcast signal is actually recorded, the CPU 11 executes the necessary process in the audio data processing section 24 or the display processing section 16 according to the selected value.

Communication processing section 22 executes an encoding process on the data to be transmitted under the control of the CPU 11. It also executes a decoding process on the received data also under the control of the CPU 11. Network interface 23 transmits the data to be transmitted that are encoded by the communication processing section 22 to a predetermined corresponding appliance on an external network by way of the network. The network interface 23 also delivers the information transmitted from a predetermined corresponding appliance on an external network by way of the network to the communication processing section 22. The communication processing section 22 then transfers the received information to the CPU 11. The information to be transmitted from the terminal apparatus 10 by way of the network may be contents-related information, which may be a request information requesting related information on a piece of music that is broadcast by an FM radio broadcasting system. The information to be received by the terminal apparatus 10 may also be such contents-related information.

Infrared communication section 28 communicates with the remote controller 40 by way of a radio communication means such as infrared rays. The infrared communication section 28 executes a predetermined process on the signal transmitted from the remote controller 40 and transmits it to the CPU 11 as operation command. The CPU 11 performs a necessary processing operation and a control operation so that the apparatus may operate in a manner corresponding to the input operation command.

The processing function of this embodiment is realized by the above-described hardware configuration.

Note that the configuration of the terminal apparatus 10 is not limited to the one illustrated in FIG. 4 and the apparatus may have any of various alternative configurations. For example, the terminal apparatus 10 may be provided with an interface for communicating with a peripheral apparatus by means of a communication system such as USB (universal serial bus), IEEE1394 or Bluetooth. Then, the terminal apparatus 10 can store the audio contents downloaded by the network interface 23 by way of the network 30 or the audio contents transferred by way of the interface, which may be a USB or an IEEE1394 bus, in the HDD 21. The terminal apparatus 10 may also be provided with a terminal to be used when it is connected to a microphone or an external head phone, a video output terminal that matches an operation of replaying a DVD, a line connection terminal and/or a optical digital connection terminal. Additionally, the terminal apparatus 10 may also be provided with a PCMCIA slot and/or a memory card slot so that it can exchange data with an external information processing apparatus and/or an audio appliance.

Now, the configurations of program modules of a system to which this embodiment is applicable will be described below. A program module refers to data that describe a process to be executed by the terminal apparatus 10. In other words, the terminal apparatus 10 can realize a predetermined function according to a program module. In the following description the function that is realized by executing a program module will be referred to by means of the denomination of the program module.

Figure 5:
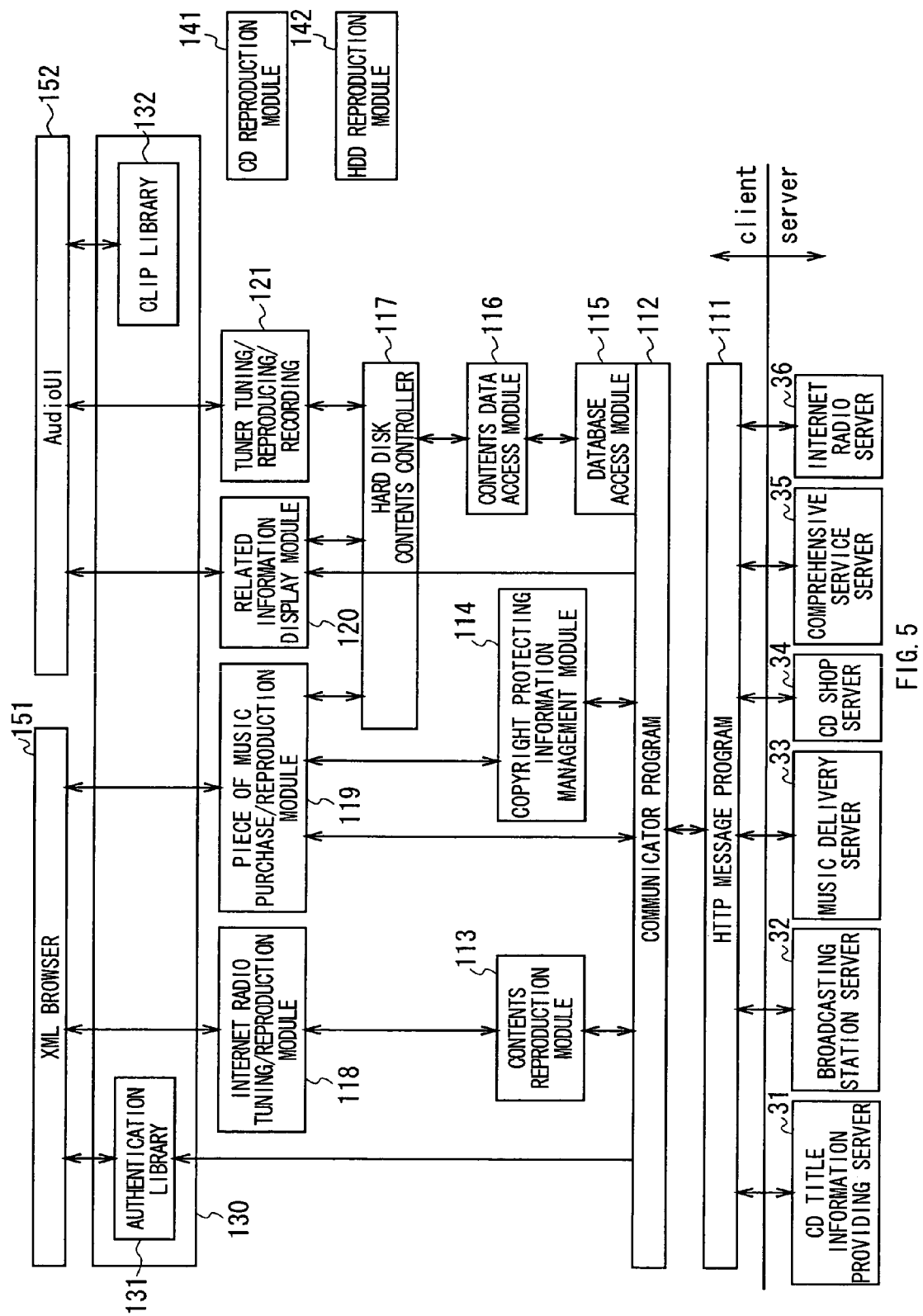
FIG. 5 is a schematic illustration of the program modules of the terminal apparatus, illustrating the configuration thereof.

FIG. 5 is a schematic illustration of the program modules of the terminal apparatus, illustrating the configuration thereof.

As shown in FIG. 5, the program modules of the terminal apparatus 10 are so designed as to operate on an OS (operation system). The terminal apparatus 10 can communicate with a variety of servers that may include a comprehensive service server 35 adapted to provide various comprehensive services and an Internet radio server 36 in addition to the CD title information providing server 31, the broadcasting station server 32, the music delivery server 33 and the CD shop server 34 due to the functions of the program modules.

HTTP (hyper text transfer protocol) message program 111 is designed to communicate with various servers including the CD title information providing server 31, the broadcasting station server 32, the CD shop server 34 and the comprehensive service server 35 by HTTP communication. Communicator program 112 is a communication module designed to communicate with various servers including the comprehensive service server 35.

A contents reproduction module 113 to be used when interpreting the codec of contents and reproducing the contents and a copyright protecting information management module 114 to be used when handling information relating to protection of copyrights are arranged as modules of a higher order relative to the communicator program (function close to the user interface). An Internet radio tuning/reproduction module 118 to be used when tuning in an Internet radio station and reproducing the broadcast information of the station is arranged as module of a higher order relative to the contents reproduction module 113. A piece of music purchase/reproduction module 119 to be used when purchasing a piece of music and reproducing the piece of music for audition is arranged as module of a higher order relative to the copyright protecting information management module 114.

An XML (extensible markup language) browser 151 is arranged as module of a higher order relative to the Internet radio tuning/reproduction module 118 and the piece of music purchase/reproduction module 119. The XML browser 151 interprets the contents of the XML files transmitted from various servers and displays them on the display apparatus 17. When the terminal apparatus 10 is operating in a comprehensive service utilization mode, the contents of the input made by the user to the terminal apparatus 10 are interpreted by the XML browser 151. Then, the XML browser 151 delivers a processing request to some other module according to the contents of the input. For example, the piece of music selected by the user by way of the XML browser 151 is purchased by the piece of music purchase/reproduction module 119 and written to the HDD 21 by way of hard disk contents controller 117.

The communicator program 112 is connected to authentication library 131 of library 130. The authentication library 131 executes authentication processes for various servers including the comprehensive service server 35.

A database access module 115, a contents data access module 116 and a hard disk contents controller 117 are arranged as modules of higher order relative to the communicator program 112. The database access module 115 accesses the various databases formed in the HDD 21. The contents data access module 116 accesses the contents stored in the HDD 21. The hard disk contents controller 117 manages the contents stored in the HDD 21.

A related information display module 120, a tuner tuning/reproduction/recording module 121 and the piece of music purchase/reproduction module 119 are arranged as modules of higher order relative to the hard disk contents controller 117. The related information display module 120 displays the titles of the pieces of music broadcast by a radio station and the names of the performing artists on the display apparatus 17. The tuner tuning/reproduction/recording module 121 is adapted to tune in a radio station and record the contents of the pieces of music received from the radio station in the HDD 21.

For example, the pieces of music received by the radio station that is tuned in by way of the audio user interface (Audio UI) 152 are written to the HDD 21 by way of the contents data access module 116.

The related information display module 120 receives the titles of the pieces of music broadcast from a radio station and the names of the performing artists from the title information providing server 31 and/or the broadcast station server 32 by means of the tuner tuning/reproduction/recording module 121 and by way of the HTTP message program 111 as related information and display them on the display apparatus 17 by way of the audio user interface 152.

The related information that is displayed on the display apparatus 17 by way of the audio user interface 152 may be temporarily stored in clip library 132 of library 130. The related information may ultimately be stored in the HDD 21 by way of the database access module 115 according to an instruction given by the user.

The program modules of the terminal apparatus 10 also include a CD replay module 141 for replaying a CD and an HDD reproduction module 142 for reproducing data from the HDD 21. The CD replay module 141 and the HDD reproduction module 142 are adapted to output the outcome of the operation on replaying the CD or that of the operation of reproducing data from the HDD 21 by way of the audio data processing section 24 and the speaker section 25.

The terminal apparatus 10 having the above-described configuration can receive related information from a server and clip the related information. It can also operate for retrieving one or more than one pieces of music and buying them at the time of clipping the related information.

Now, the process to be executed when clipping related information by means of the above described terminal apparatus 10, relating it to broadcast information it receives from a broadcasting station 32a, will be described below.

The user of the terminal apparatus 10 receives the broadcast information broadcast from the broadcasting station 32a by means of the terminal apparatus 10 and watches the images and/or listens to the sounds that are broadcast. At the same time, the user of the terminal apparatus 10 receives the contents transmitted from the broadcasting station server 32 of the broadcasting station 32a, that may typically be a piece of music, and displays them on the display apparatus 17. Thus, the contents correspond to the broadcast information transmitted from the broadcasting station 32a. Therefore, the user of the terminal apparatus 10 can refer to the contents (which may be the title of the piece of music being broadcast and the names of the performing artists) that correspond to the broadcast information while watching and/or listening to the broadcast information. At this time, the terminal apparatus 10 also receives the related information relating to the contents (e.g., the title, the number, the released year and the selling agent of the CD where the piece of music is recorded in addition to the title of the piece of music and the names of the performing artists). The related information is temporarily stored in the terminal apparatus 10.

While the user of the terminal apparatus 10 is watching and listening to the broadcast information, he or she may find one that the user is concerned about. Then, when the contents of the piece of music (now-on-air information) are displayed, the user can clip the related information relating to the piece of music that is being displayed by carrying out a predetermined operation at the remote controller 40 or the operation input section 15.

Then, the terminal apparatus 10 records the broadcast information that is being received when the clip request is issued to the terminal apparatus 10, relating it to the related information.

As pointed out earlier, there are two methods that can be used for clipping related information, relating it to the broadcast information that is being received. The first one is a technique of recording broadcast information for a predetermined time period from the time point when a clip request is issued to the terminal apparatus 10. The second one is a technique of recording broadcast information for a predetermined time period before and after the time point when a clip request is issued to the terminal apparatus 10.

Firstly, the first technique will be discussed below.

Figure 6:
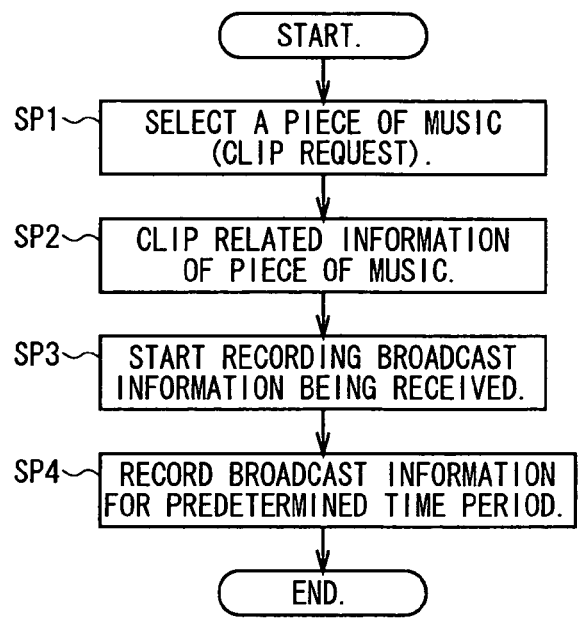
FIG. 6 is a flowchart of an operation using a method of recording broadcast information from the time point of a clip request given to the terminal apparatus.

FIG. 6 is a flowchart of an operation using a method of recording broadcast information from the time point of a clip request given to the terminal apparatus 10.

As the user of the terminal apparatus 10 selects the title of the piece of music that corresponds to the contents being displayed typically by means of the remote controller 40 (Step S1), a request for clipping the related information relating to the piece of music is input to the terminal apparatus 10.

Then, in response to the input, the terminal apparatus 10 records the related information of the piece of music, the contents for which are temporarily stored, in the HDD 21 and clips it (Step S2).

Additionally, the terminal apparatus 10 starts recording the sounds and the images of the broadcast information that is being received from the time point when the clip request is input along with the clip of the related information (Step S3). Then, it records the broadcast information for a predetermined time period, e.g., 100 seconds, in the HDD 21 (Step S4). At this time, the terminal apparatus 10 relates the broadcast information that is being received to the related information that is clipped.

As a result, the broadcast information is recorded in the terminal apparatus 10 for the predetermined time period starting from the time point when the clip request for the related information is given and related to the related information.

Now, the second technique will be discussed below.

Figure 7:
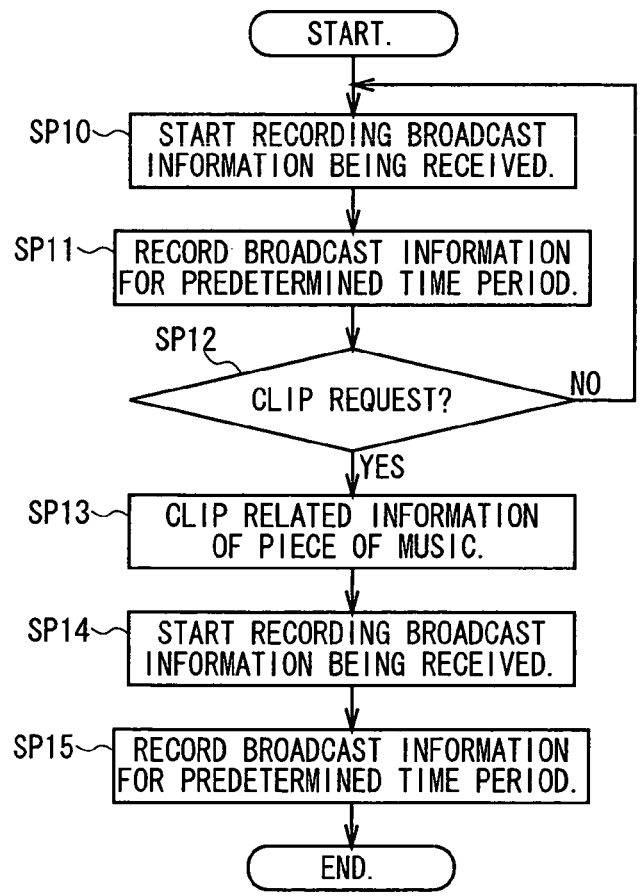
FIG. 7 is a flowchart of an operation using a method of recording broadcast information for a predetermined time period before and after the time point of a clip request given to the terminal apparatus.

FIG. 7 is a flowchart of an operation using a method of recording broadcast information for a predetermined time period before and after the time point of a clip request given to the terminal apparatus.

The terminal apparatus 10 starts recording the sounds and the images of the broadcast information being received from the time point when the user starts watching and listening it (Step S10). Then, it records the broadcast information for a predetermined time period, e.g., 100 seconds, in the HDD 21 (Step S11).

When the predetermined time period has elapsed, the terminal apparatus 10 determines if there is a clip request for the related information or not (Step S12).

If it is determined in Step S12 that there is no clip request, the terminal apparatus 10 returns to Step S10 and starts recording the broadcast information from this time point for the predetermined time period. This time, the terminal apparatus 10 overwrites the related information that has been recorded.

At any time during the above described Step S10 through Step S12, the user of the terminal apparatus 10 can select the piece of music corresponding to the contents that are being displayed typically by means of the remote controller 40. Note, however, if the piece of music is selected by the user and a clip request is input, the terminal apparatus 10 does not clip the related information of the piece of music immediately but is standing by the recording process of the related information for the predetermined time period during which the broadcast information is recorded (until the time when the determination is made).

If, on the other hand, it is determined in Step S12 that there is a clip request before the time point when a predetermined time period has elapsed, the terminal apparatus 10 records the related information of the piece of music corresponding to the contents, which has been temporarily stored, in the HDD 21 and clips it (Step S13).

Additionally, when the predetermined time period of Step S11 has elapsed, the terminal apparatus 10 starts recording the sounds and the images of the broadcast information that are being received for another predetermined time period, e.g., 100 seconds, along with the clip of the related information (Step S14) and records the broadcast information for the predetermined time period in the HDD 21 (Step S15). At this time, the terminal apparatus 10 records the broadcast information being received, relating it to the clipped related information.

As a result, the broadcast information is recorded in the terminal apparatus 10 for 200 seconds, for example, before and after the time point when the clip request is given and related to the related information.

The items of the pieces of related information that are clipped by either of the first technique or the second technique as described above is then displayed on the display apparatus 17 in the form of a list in response to a corresponding user's operation that is conducted on the remote controller 40. The user views the list and may select one of the items on the remote controller 40. Then, the selected piece of related information and the broadcast information related to the related information and recorded are reproduced by the terminal apparatus 10.

In this way, as a piece of related information is clipped and related to the broadcast information that is being broadcast at the time when a clip request is given, the user of the terminal apparatus 10 can easily discriminate the related information from the remaining pieces of related information by listening the sounds and watching the images that are related to the related information and recorded when he or she views the clipped related information.

The clipped information can be utilized when the user accesses the CD title information providing server 31, the music delivery server 33 or the CD shop server 34 from the terminal apparatus 10 to retrieve a piece of music or purchase a set of sound data, a CD or a DVD.

The above-described processing functions are realized by a program to be executed by the CPU 11 of the terminal apparatus 10. Such a program is stored typically in the HDD 21 or the ROM 13 for installation.

It is also possible to temporarily or permanently store the program on a removable recording medium such as a flexible disk, a CD-ROM (compact disk read only memory), an MO (magneto-optical) disk, a DVD, a magnetic disk or a semiconductor memory. Such a removable recording medium can be provided as so-called packaged software.

For example, in the case of this embodiment, the program may be recorded on a medium that the media drives 19a, 19b can accommodate and provided as packaged software. Then, the terminal apparatus 10 can read the program from the recording medium by way of either of the media drives 19a, 19b and stores it in the HDD 21 or the ROM 13 for installation. When the program is provided as packaged software, it is possible to install the program of a system to which the present invention is applicable in any general purpose personal computers.

The program can be installed from a removable recording medium as described above. Additionally, it can be downloaded from a server storing the program by way of a network such as a LAN (local area network) or the Internet.

Furthermore, an updating program may be prepared so as to add the processing functions of the present invention and distributed as packaged software or delivered on the network. Then, a user can obtain the updating program and install it in an environment where a system is already installed and exists.

(3) Second Embodiment

Now, a service system for providing related information of a piece of music that is being broadcast that can be realized by one of a plurality of service providing servers will be described by way of the second embodiment. This service system has a single sign-on feature.

(3-1) System Configuration of Music-Related Service Providing System

Figure 8:
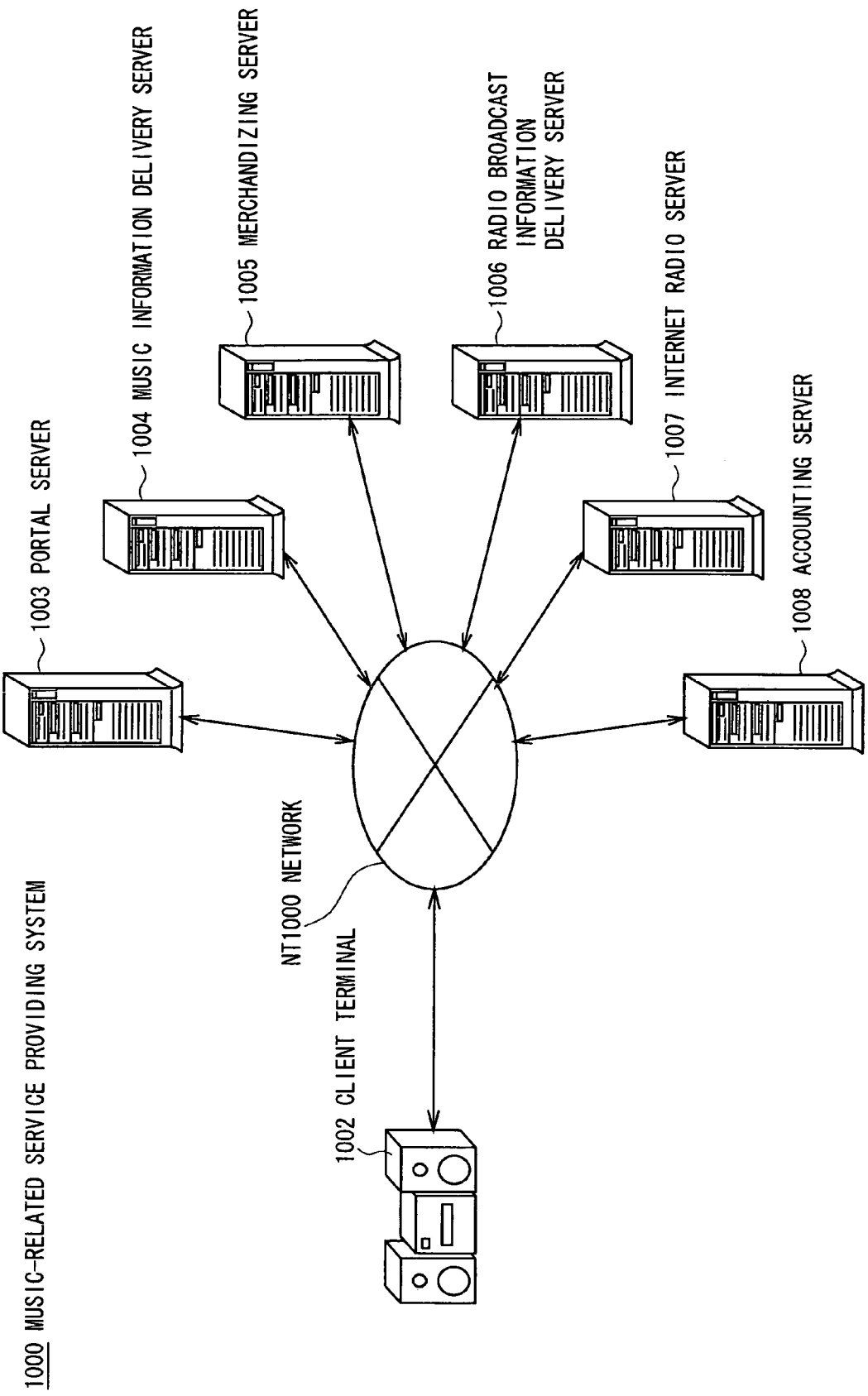
FIG. 8 is a schematic block diagram of a music-related service providing system that can be used with the second embodiment of the present invention, illustrating the overall configuration thereof.

Referring to FIG. 8, there is shown a music-related service providing system that is denoted generally by reference symbol 1000. The system comprises a user terminal 1002, or a client terminal, of a client who can is under contract with the operator of the music-related service providing system 1000, a portal server 1003 that manages the client terminal 1002 and a plurality of servers 1004 through 1008 that provide various music-related services to the client terminal 1002.

In the case of this embodiment, music information delivery server 1004 provides music data delivery services of delivering music data in the formats of ATRAC3 (Adaptive Transform Acoustic Coding 3), AAC (advanced audio coding), WMA (Windows Media Audio), Real AUDIO G2 Music Codec, MP3 (MPEG Audio Layer—3) and so on to the client terminal 1002.

Merchandizing server 1005 provides merchandizing services of selling CDs (compact disks), DVDs (digital versatile disks) and so on to the user by way of the client terminal 1002.

Radio broadcast information delivery server 1006 provides radio broadcast information delivery services of providing radio broadcast information on radio programs and pieces of music that are broadcast from radio stations, to the client terminal 1002.

Internet radio server 1007 provides Internet radio broadcasting services of transmitting radio broadcast data by means of streaming delivery technology by way of network NT1000 that corresponds to the Internet.

Additionally, accounting server 1008 executes accounting processes for charging the user for various services in response to requests from the portal server 1003 and other servers.

(3-2) Functional Circuit Block Configuration of Client Terminal

Figure 9:
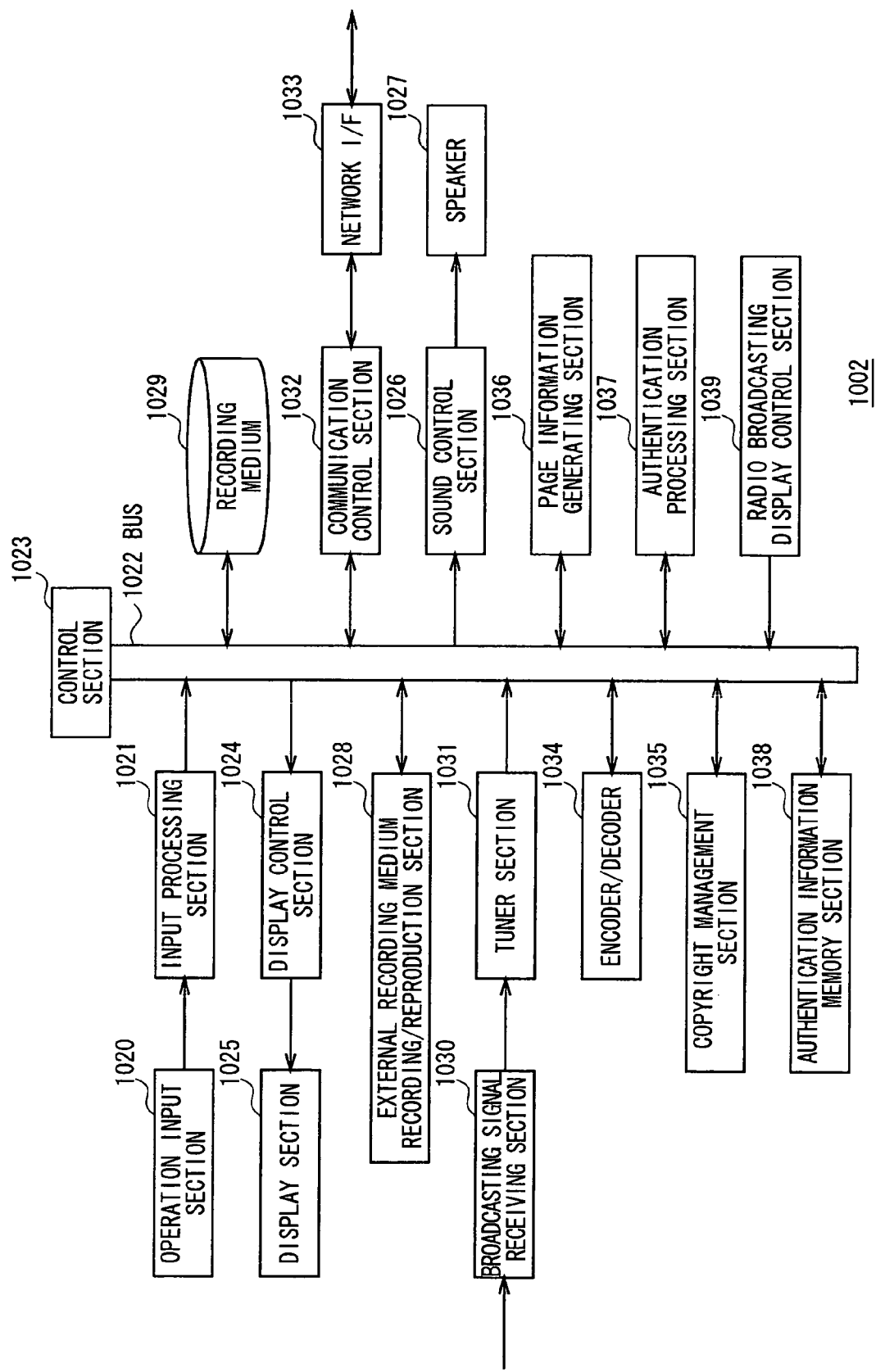
FIG. 9 is a schematic functional circuit block diagram of a client terminal, illustrating the hardware configuration thereof.

Now, the hardware configuration of the client terminal 1002 will be described below in terms of function circuit blocks. As shown in FIG. 9, the client terminal 1002 comprises an operation input section 1020 that comprises various operation buttons arranged on the surface of the cabinet and the memory controller (not shown) thereof. As the user operates the operation input section 1020, the latter recognizes it and transmits an operation input signal that corresponds to the operation to input processing section 1021.

The input processing section 1021 converts the operation input signal applied to it from the operation input section 1020 into a specific operation command and transmits it to control section 1023 by way of bus 1022.

The control section 1023 controls the various circuits connected to it by way of the bus 1022 according to the operation commands sent to it from the circuits and control signals.

Display control section 1024 executes a digital/analog conversion process on the video data supplied to it by way of the bus 1022 and transmits the obtained analog video signal to display section 1025.

The display section 1025 is a display device such as a liquid crystal display that may be fitted directly to the surface of the cabinet of the apparatus or arranged as a separate unit.

The display section 1025 receives the outcome of the processing operation of the control section 1023 and various video data in the form of an analog video signal by way of the display control section 1024, it displays images corresponding to the analog video signal.

Sound control section 1026 executes a digital/analog conversion process on the audio data supplied to it by way of the bus 1022 and transmits the obtained analog audio signal to the speaker 1027. The speaker 1027 outputs sounds corresponding to the analog audio signal supplied from the sound control section 1026.

External recording medium recording/reproduction section 1028 operates to read out the contents data recorded on an external recording medium such as CD or Memory Stick (tradename) that contains a flash memory in an armor case and reproduce them or record contents data to be recorded on an external recording medium.

As the external recording medium recording/reproduction section 1028 reads out video data from an external recording medium as contents data, it supplies the read out video data to the display control section 1024 by way of the bus 1022.

Then, the display control section 1024 converts the video data read out from the external recording medium as contents data by the external recording medium recording/reproduction section 1028 into an analog video signal and supplies it to the display section 1025.

On the other hand, as the external recording medium recording/reproduction section 1028 reads out audio data from an external recording medium as contents data, it supplies the read out audio data to the sound control section 1026 by way of the bus 1022.

Then, the sound control section 1026 converts the audio data read out from the external recording medium as contents data by the external recording medium recording/reproduction section 1028 into an analog audio signal and supplies it to the speaker 1027.

Furthermore, the control section 1023 can transmit the contents data read out from the external recording medium by the external recording medium recording/reproduction section 1028 to the recording medium 1029 that is arranged in the inside of the client terminal 1002 by way of the bus 1022 and store the contents data in the recording medium 1029 (the action of storing contents data in the recording medium 1029 is referred to as ripping hereinafter).

When the control section 1023 reads out video data, which may also be referred to as image data, from the recording medium 1029 as contents data, it supplies the video data it reads out to the display control section 1024 by way of the bus 1022.

When, on the other hand, the control section 1023 reads out audio data, which may also be referred to as sound data, from the recording medium 1029 as contents data, it supplies the audio data it reads out to the sound control section 1026 by way of the bus 1022.

Additionally, the control section 1023 reads out music data from the recording medium 1029 and transfers the music data to an external recording medium recording/reproduction section 1028 to record the music data in the external recording medium by means of the external recording medium recording/reproduction section 1028.

Broadcast signal receiving section 1030 receives radio broadcast waves transmitted from radio stations and supplies them to tuner section 1031.

The tuner section 1031 extracts the radio broadcast signal of the broadcasting frequency that corresponds to the radio station typically specified by way of the operation input section 1020 and executes a predetermined reception process on the signal under the control of the control section 1023. Then, it transmits the audio data obtained as a result of the process to the sound control section 1026 by way of the bus 1022.

The sound control section 1026 transforms the audio data transmitted from the tuner section 1031 into an analog audio signal and transmits it to the speaker 1027 so as to have the speaker 1027 output the radio program being broadcast from the radio station and hence the user listen to the sounds of the radio program.

The control section 1023 can record the sounds of the radio program in the recording medium 1029 by transmitting the audio data obtained at the tuner section 1031 to the recording medium 1029 and storing them in the recording medium 1029.

Additionally, the control section 1023 can connect the user terminal 1002 to the network NT1000 by way of communication control section 1032 and network interface 1033 and access the portal server 1003 and the other servers 1004 through 1007 on the network NT1000 to thereby exchange various pieces of information and various data with the portal server 1003 and the other servers 1004 through 1007.

Encoder/decoder section 1034 decodes the contents data that are compressed/encoded and received from the network NT1000 sequentially by way of the network interface 1033 and the communication control section 1032 and also the contents data that are compressed/encoded and read out from the recording medium 1029 and an external recording medium and transmits them to the display control section 1024 and the sound control section 1026.

Additionally, the encoder/decoder section 1034 compresses/encodes contents data that are read out from an external recording medium but not compressed/encoded and the audio data supplied from the tuner section 1031 and transmits the compressed/encoded contents data to the recording medium 1029.

As a result, the contents data compressed/encoded by the encoder/decoder section 1034 are stored in the recording medium 1029 under the control of the control section 1023.

Copyright management section 1035 generates copyright management information that corresponds to the contents data downloaded from the network NT100 sequentially by way of the network interface 1033 and the communication control section 1032 and also copyright management information that corresponds to the contents data read out from an external recording medium by the external recording medium recording/reproduction section 1028.

The copyright management information generated by the copyright management section 1035 is associated with the corresponding contents data and registered in the recording medium 1029 under the control of the control section 1023.

When the contents data that are associated with corresponding copyright management information are checked out between the recording medium 1029 and a specific external recording medium and when the contents data that are associated with corresponding copyright management information are checked in between the specific external recording medium and the recording medium 1029, the copyright management section 1035 protects the copyright of the contents data by appropriately updating the contents of the copyright management information that corresponds to the contents data.

Page information generating section 1036 interprets the page information of the XML (extensible markup language) file or the HTML (hyper text markup language) file received from the network NT1000 sequentially by way of the network interface 1033 and the communication control section 1032 and generates video data to be displayed on the display section 1025. Then, it transmits the generated video data to the display control section 1024.

Authentication processing section 1037 executes authentication processes of transmitting authentication information to the portal server 1003 and the other servers 1004 through 1007 on the network NT1000 that are connected to it by way of the network interface 1033 sequentially by way of the communication control section 1032 and the network interface 1033.

Authentication information memory section 1038 stores authentication information that is required when the authentication processing section 1037 accesses the portal server 1003 and the other servers 1004 through 1007.

Radio broadcasting display control section 1039 transmits a request signal for request radio broadcast information relating the radio program being tuned in so that the user may listen to it to the radio broadcast information delivery server 1006 that corresponds to the radio station broadcasting the radio program that is being received.

Thus, the radio broadcasting display control section 1039 receives the radio broadcast information transmitted from the radio broadcast information delivery server 1006 on the network NT1000 sequentially by way of the network interface 1033 and the communication control section 1032 and transmits the received radio broadcast information to the display control section 1024 so as to have the display section 1025 display the radio broadcast information including the title of the radio program that is currently being received, the title of the piece of music that is being received and the names of the performing artists.

Figure 10:
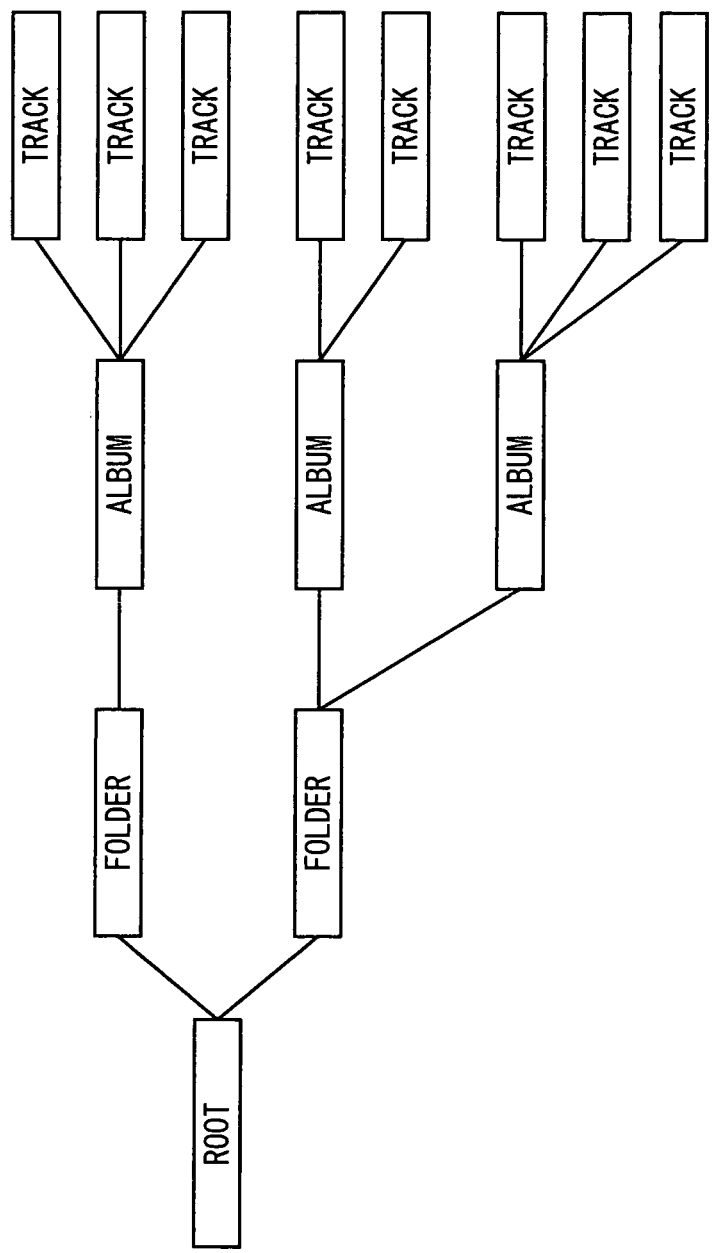
FIG. 10 is a schematic block diagram illustrating a directory configuration.

The control section 1023 of the client terminal 1002 manages the contents data to be stored in the recording medium 1029 by means of directories as shown in FIG. 10. Firstly, an arbitrarily selected number of "folder" directories are prepared for the immediately lower layer of "root" directory within a predefined range. The "folder" directories are prepared typically to correspond to the genres of contents or the users/owners of terminal apparatus.

An arbitrarily selected number of "album" directories are prepared for the immediately lower layer of each of the "folder" directories within a predetermined range. The "album" directories are prepared typically to correspond to respective album titles. One or more than one "track" files are stored in the layer under each of the "album" directories and belong to the "album" directory. Each "track" file is used for a piece of music or a set of contents.

The directories of contents data are managed by a database file stored in the recording medium 1029.

(3-3) Functional Circuit Block Configuration of Portal Server 1003

Figure 11:
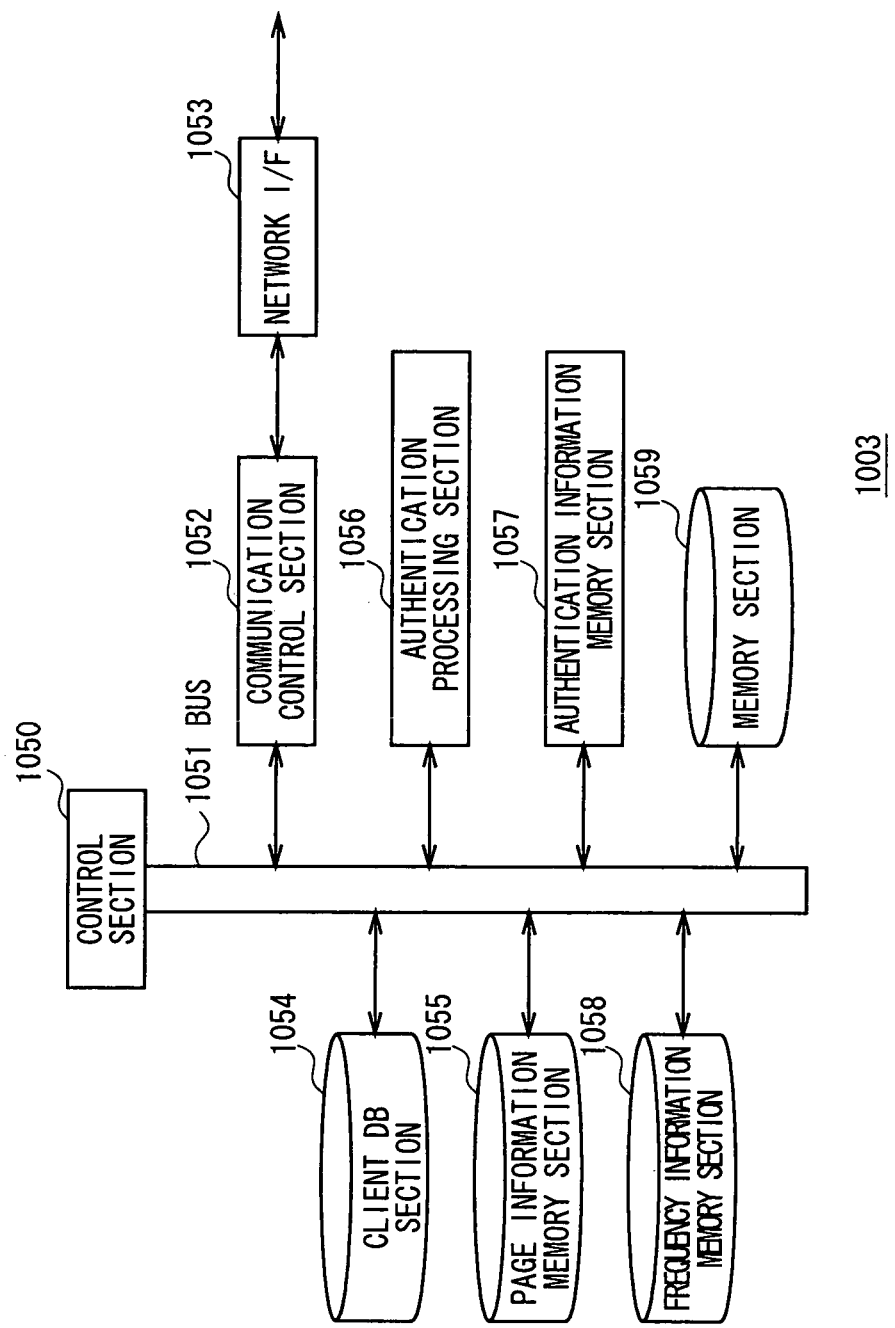
FIG. 11 is a schematic functional circuit block diagram of a portal server, illustrating the hardware configuration thereof.

Now, the hardware configuration of the portal server 1003 will be described below in terms of function circuit blocks by referring to FIG. 11. The control section 1050 in the portal server 1003 controls the operations of the various circuits connected to it by way of bus 1051.

Communication control section 1052 exchanges various pieces of information with the client terminal 1002 and the other servers 1004 through 1008 by way of network interface 1053 under the control of the control section 1050.

User ID (identification) information and password information of each of the users who have already concluded contracts with the operator of the music-related service providing system 1000 are correlated with each other and registered in the client database section 1054.

Page information memory section 1055 stores page information or the like that the operator of the music-related service providing system 1000 manages.

Note that page information is described by a language such as the XML and contains URL (uniform resource locator) information necessary for accessing the music information delivery server 1004, the merchandizing server 1005, the radio broadcast information delivery server 1006 and the Internet radio server 1007.

As authentication processing section 1056 receives the user ID information and the password information transmitted from the client terminal 1002 sequentially by way of the network interface 1053 and the communication control section 1052, it checks if the user ID information and the password information it received are registered in the client database section 1054 as client information or not in a user authentication process.

As the authentication processing section 1056 ends the user authentication process, it issues information on the portal authentication results (authentication session ID information as will be described hereinafter) that shows the outcome of the user authentication process and temporarily stores the issued information on the portal authentication results in the authentication information memory section 1057.

At this time, if the user is authenticated as authorized user as a result of the user authentication process executed by the authentication processing section 1056, the control section 1050 transmits the page information stored in the page information memory section 1055 for the subscriber to the client terminal 1002 sequentially by way of the communication control section 1052 and the network interface 1053 along with the information on the portal authentication results.

It may be so arranged that, if the user is not authenticated as authorized user as a result of the user authentication process executed by the authentication processing section 1056, the control section 1050 transmits authentication error information to the client terminal 1002 sequentially by way of the communication control section 1052 and the network interface 1053 along with authentication failure notification page information indicating the failure of authentication that is stored in the page information memory section 1055.

Additionally, when the authentication processing section 1056 receives the information on the portal authentication results (authentication ticket as will be described hereinafter) that the client terminal 1002 of the user acquires and transmits as a result of executing the authentication process for the user from the music information delivery server 1004, the merchandising server 1005 and the radio broadcast information delivery server 1006 sequentially by way of the network interface 1053 and the communication control section 1052, it compares the received information on the portal authentication results and the information on the portal authentication results that is temporarily stored in the authentication information memory section 1057 and corresponds to the user.

With the above-described arrangement, the authentication processing section 1056 checks as authentication process the information on the portal authentication results received from the music information delivery server 1004, the merchandizing server 1005 and the radio broadcast information delivery server 1006 if it is the proper information on the portal authentication results or not and transmits information on the outcome of the checking process back to the music information delivery server 1004, the merchandising server 1005 and the radio broadcast information delivery server 1006 sequentially by way of the communication control section 1052 and the network interface 1053.

Frequency information memory section 1058 stores regional codes for identifying respective regions such as postal codes, frequency information on the broadcasting frequencies of the radio broadcastings that can be received in each region that is indicated by a corresponding regional code, the names of the radio stations of the radio broadcastings (to be referred to as radio station names hereinafter) and the call signs of the radio stations that are pieces of identification information unique to the respective radio stations in an coordinated manner.

URL memory section 1059 stores the call sign of each of the radio broadcasting stations and URL information that can be used to acquire radio broadcast information including the title of the radio program being broadcast from the radio station corresponding to the call sign and the title of the piece of music that is currently being played in the radio program (to be referred to as now-on-air information hereinafter).

(3-4) Functional Circuit Block Configuration of Music Information Delivery Server 1004

Figure 12:
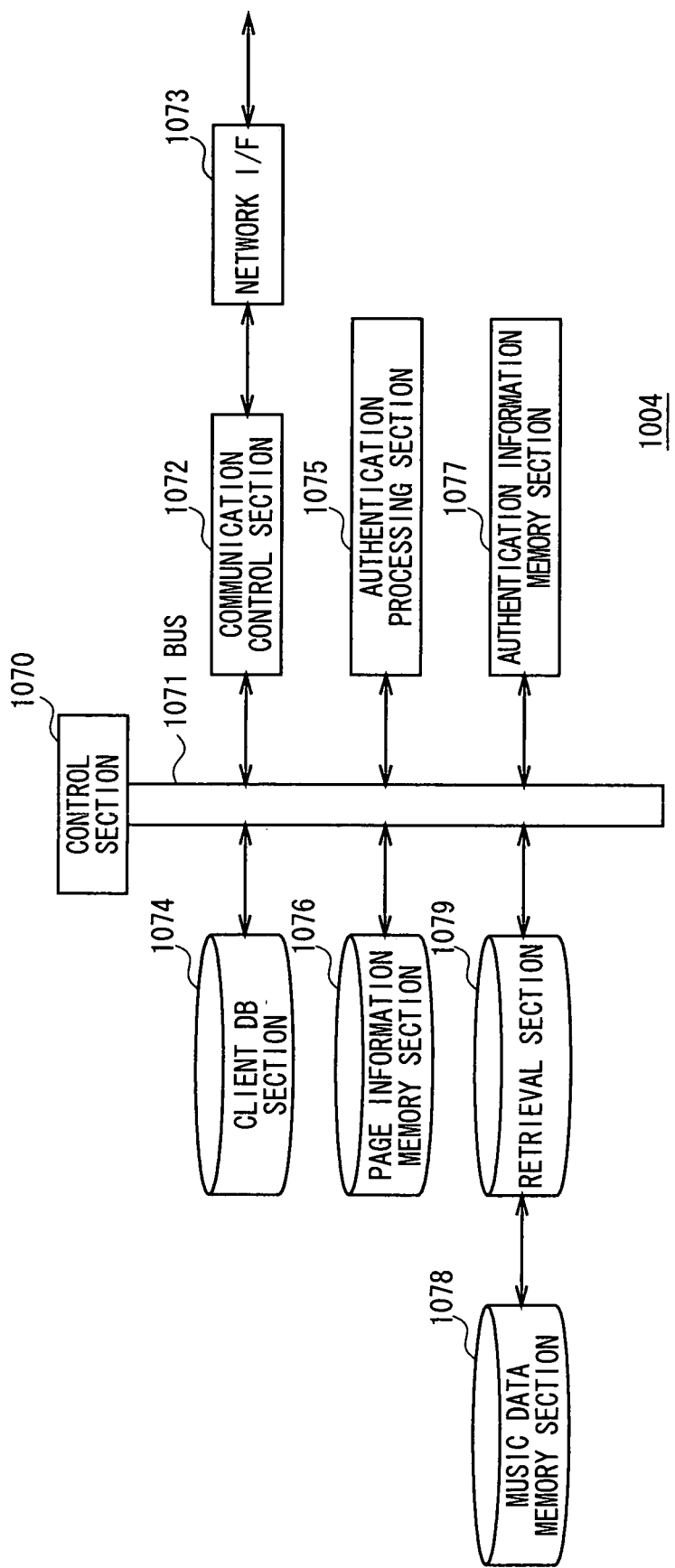
FIG. 12 is a schematic functional circuit block diagram of a music information delivery server, illustrating the hardware configuration thereof.

Now, the hardware configuration of the music information delivery server 1004 will be described below in terms of function circuit blocks by referring to FIG. 12. The control section 1070 in the music information delivery server 1004 controls the operations of the various circuits connected to it by way of the bus 1071.

Communication control section 1072 exchanges various pieces of information and various data including contents data with the client terminal 1002 and the other servers including the portal server 1003 by way of network interface 1073 under the control of the control section 1070.

The user ID information and the password information of each of the users who have already concluded contracts with the operator of the music information delivery server 1004 are correlated with each other and registered in client database section 1074. Note, however, that the client database section 1074 may be omitted if the authentication processing section 1075, which will be described in greater detail hereinafter, has a function of executing an authentication process on each user according to the information on the portal authentication results issued from the portal server 1003 and transmitted from the client terminal 1002.

Page information memory section 1076 stores page information for delivery of music data that introduce the pieces of music that can be downloaded. The page information is managed by the music information delivery server 1004.

Note that page information for delivery of music data is described by a language such as the XML and allows the user of the client terminal 1002 to select music data that he or she wants to download.

As the control section 1070 receives the page information acquisition request signal requesting page information for delivery of music data that is transmitted from the client terminal 1002 sequentially by way of the network interface 1073 and the communication control section 1072, it transmits the page information for delivery of music data that is stored in the page information memory section 1076 to the client terminal 1002 sequentially by way of the communication control section 1072 and the network interface 1073 in response to the received page information acquisition request signal.

As the authentication processing section 1075 receives the user ID information and the password information of the user using the client terminal 1002 that are transmitted from the client terminal 1002 sequentially by way of the network interface 1073 and the communication control section 1072, it checks if the user ID information and the password information it received are registered in the client database section 1074 as client information or not in a user authentication process.

Additionally, as a user authentication technique different from the user authentication process using the user ID information and the password information, the authentication processing section 1075 receives the information on the portal authentication results (authentication ticket as will be described hereinafter) issued from the portal server 1003 and transmitted from the client terminal 1002 sequentially by way of the network interface 1073 and the communication control section 1072 and transmits the received information on the portal authentication results to the portal server 1003 sequentially by way of the communication control section 1072 and the network interface 1073.

Then, the authentication processing section 1075 receives the information on the outcome of the checking process that is transmitted back as a result of the execution of the authentication process (that is the above described checking process) on the information on the portal authentication results from the portal server 1003 sequentially by way of the network interface 1073 and the communication control section 1072 in response to the transmission of the information on the portal authentication results to the portal server 1003. Then, it checks if the user has already concluded a contract with the operator of the music-related service providing system 1000 or not on the basis of the received information on the outcome of the checking process.

As the authentication processing section 1075 ends the user authentication process, it issues server authentication result information (service session ID information as will be described hereinafter) that shows the outcome of the user authentication process.

At this time, if the user is authenticated as authorized user as a result of the user authentication process executed by the authentication processing section 1075, the control section 1070 transmits the page information for delivery of music data that is stored in the page information memory section 1076 for the subscriber to the client terminal 1002 sequentially by way of the communication control section 1072 and the network interface 1073 along with the server authentication result information.

If, on the other hand, the user is not authenticated as authorized user as a result of the user authentication process executed by the authentication processing section 1075, the control section 1070 transmits authentication error information to the client terminal 1002 sequentially by way of the communication control section 1072 and the network interface 1073 along with authentication failure notification page information indicating the failure of authentication that is stored in the page information memory section 1076.

Meanwhile, authentication information memory section 1077 temporarily stores the server authentication result information issued from the authentication processing section 1075 and also various pieces of authentication information that the authentication processing section 1075 requires in a user authentication process for the user using the client terminal 1002.

Music data memory section 1078 stores a plurality sets of music data that are compressed/encoded in the above described ATRAC3 format and the MP3 format and correlated with retrieval keys that may be contents ID information for the sets of music data.

As the retrieval section 1079 receives sequentially by way of the network interface 1073 and the communication control section 1072 a download request signal that is transmitted from the client terminal 1002 as a result of that page information for delivery of music data is transmitted to the client terminal 1002, requesting it to download the desired music data containing a retrieval key for retrieving the music data desired to be downloaded, it takes out the retrieval key from the received download request signal.

Then, the retrieval section 1079 retrieves the music data desired to be downloaded that meet the requirements for retrieval indicated in the retrieval key out of the plurality of sets of music data stored in the music data memory section 1078, using the retrieval key.

Then, the control section 1070 transmits the retrieved music data that are desired to be downloaded to the client terminal 1002 sequentially by way of the communication control section 1072 and the network interface 1073.

Additionally, the control section 1070 transmits accounting information to be used for the accounting process of charging the user for the service of downloading the music data to the client terminal 1002 to the accounting server 1008 sequentially by way of the communication control section 1072 and the network interface 1073 so as to have the accounting server 1008 execute the accounting process for the service of downloading the music data to the user.

(3-5) Functional Circuit Block Configuration of Merchandizing Server 1005

Figure 13:
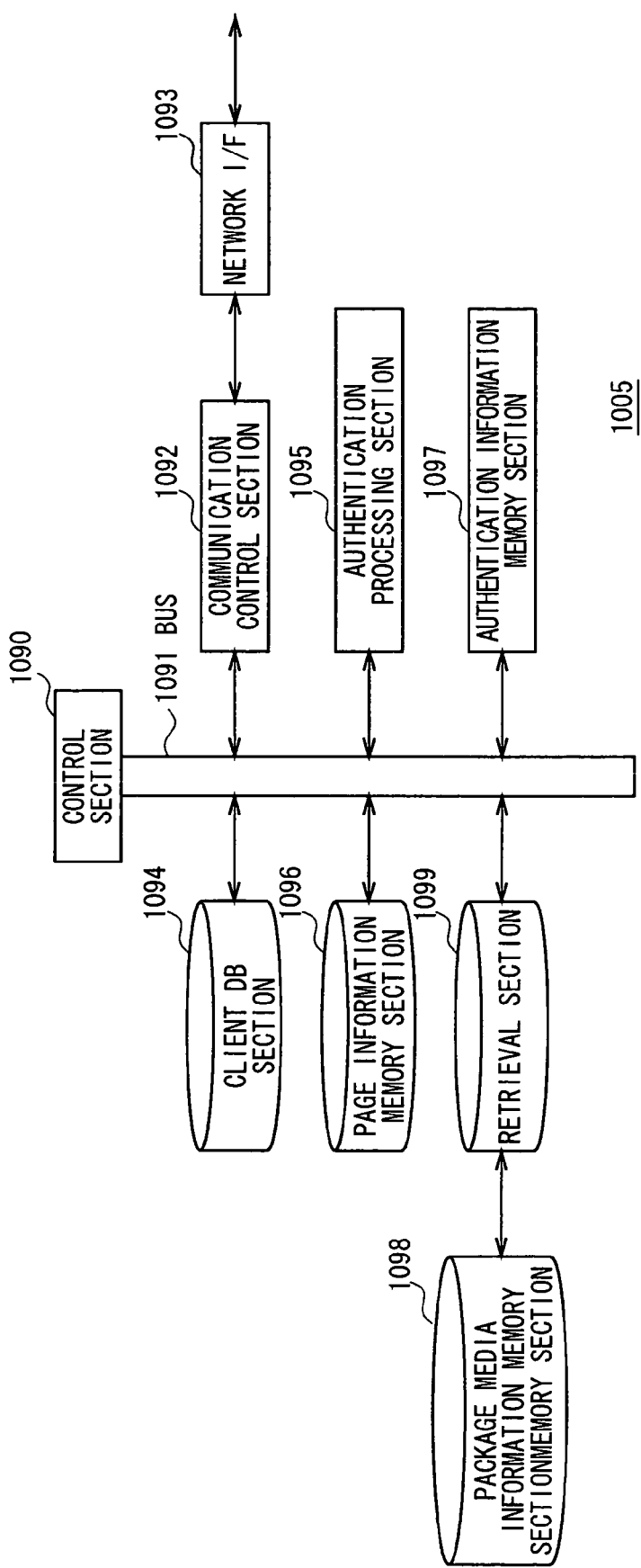
FIG. 13 is a schematic functional circuit block diagram of a merchandising server, illustrating the hardware configuration thereof.

Now, the hardware configuration of the merchandising server 1005 will be described below in terms of function circuit blocks by referring to FIG. 13. The control section 1090 in the merchandizing server 1005 controls the operations of the various circuits connected to it by way of bus 1091.

Communication control section 1092 exchanges various pieces of information with the client terminal 1002 and the other servers including the portal server 1003 by way of network interface 1093 under the control of the control section 1090.

The user ID information and the password information of each of the users who have already concluded contracts with the operator of the merchandising server 1005 are correlated with each other and registered in client database section 1094 as client information. Note, however, that the client database section 1094 may be omitted if authentication processing section 1095 has a function of executing an authentication process on each user according to the information on the portal authentication results issued from the portal server 1003 and transmitted from the client terminal 1002.

Page information memory section 1096 stores page information for merchandising package media that introduce the package media such as CDs, DVDs and the like to be merchandised. The page information is managed by the merchandising server 1005.

Note that page information for merchandising package media is described by a language such as the XML and allows the user of the client terminal 1002 to select one or more than one package media such as CDs, DVDs and the like that he or she wants to purchase.

As the control section 1090 receives the page information acquisition request signal requesting page information for merchandising package media that is transmitted from the client terminal 1002 sequentially by way of the network interface 1093 and the communication control section 1092, it transmits the page information for merchandising package media that is stored in the page information memory section 1096 to the client terminal 1002 sequentially by way of the communication control section 1092 and the network interface 1093 in response to the received page information acquisition request signal.

As the authentication processing section 1095 receives the user ID information and the password information of the user using the client terminal 1002 that are transmitted from the client terminal 1002 sequentially by way of the network interface 1093 and the communication control section 1092, it checks if the user ID information and the password information it received are registered in the client database section 1094 as client information or not in a user authentication process.

Additionally, as a user authentication technique different from the user authentication process using the user ID information and the password information, the authentication processing section 1095 receives the information on the portal authentication results (authentication ticket as will be described hereinafter) issued from the portal server 1003 and transmitted from the client terminal 1002 sequentially by way of the network interface 1093 and the communication control section 1092 and transmits the received information on the portal authentication results to the portal server 1003 sequentially by way of the communication control section 1092 and the network interface 1093.

Then, the authentication processing section 1095 receives the information on the outcome of the checking process that is transmitted back as a result of the execution of the authentication process (that is the above described checking process) on the information on the portal authentication results from the portal server 1003 sequentially by way of the network interface 1093 and the communication control section 1092 in response to the transmission of the information on the portal authentication results to the portal server 1003. Then, it checks if the user has already concluded a contract with the operator of the music-related service providing system 1000 or not on the basis of the received information on the outcome of the checking process.

As the authentication processing section 1095 ends the user authentication process, it issues server authentication result information (service session ID information as will be described hereinafter) that shows the outcome of the user authentication process.

At this time, if the user is authenticated as authorized user as a result of the user authentication process executed by the authentication processing section 1095, the control section 1090 transmits the page information for merchandizing package media that is stored in the page information memory section 1096 for the subscriber to the client terminal 1002 sequentially by way of the communication control section 1092 and the network interface 1093 along with the server authentication result information.

If, on the other hand, the user is not authenticated as authorized user as a result of the user authentication process executed by the authentication processing section 1095, the control section 1090 transmits authentication error information to the client terminal 1002 sequentially by way of the communication control section 1092 and the network interface 1093 along with authentication failure notification page information indicating the failure of authentication that is stored in the page information memory section 1096.

Meanwhile, authentication information memory section 1097 temporarily stores the server authentication result information issued from the authentication processing section 1095 and also various pieces of authentication information that the authentication processing section 1095 requires in a user authentication process for the user using the client terminal 1002.

Package media information memory section 1098 stores information on a plurality of package media to be merchandized such as CDs and DVDs (to be referred to as package media information hereinafter) that is correlated with retrieval keys that may be package media ID information for the plurality of package media.

As the retrieval section 1099 receives sequentially by way of the network interface 1093 and the communication control section 1092 a media information request signal that is transmitted from the client terminal 1002 as a result of that page information for merchandising package media is transmitted to the client terminal 1002, requesting package media information relating to a specific package media such as CDs or DVDs, it takes out the retrieval key for retrieving the specific package media from the received media information request signal.

Then, the retrieval section 1099 retrieves the package media information for the specific package media that meets the requirements for retrieval indicated in the retrieval key out of the plurality of pieces of package media information stored in the package media information memory section 1098, using the retrieval key.

Then, the control section 1090 transmits the retrieved package media information to the client terminal 1002 sequentially by way of the communication control section 1092 and the network interface 1093. Thus, the package media information relating to the specific package media is presented to the user.

Then, if the control section 1090 receives a purchase request signal for requesting the purchase of the specific package media transmitted from the client terminal 1002 sequentially by way of the network interface 1093 and the communication control section 1092 as a result, it executes a purchase process for delivering the specific package media to the user utilizing the client terminal 1002.

Additionally, the control section 1090 transmits accounting information to be used for the accounting process of charging the user for the purchase of the specific package media to the accounting server 1008 sequentially by way of the communication control section 1092 and the network interface 1093 so as to have the accounting server 1008 execute the accounting process for the purchase of the specific package media service by the user.

Furthermore, as the accounting process of the accounting server 1008 for the user is completed, the control section 1090 transmits purchase completion page information indicating that the purchase process for the package media is completed to the client terminal 1002 sequentially by way of the communication control section 1092 and the network interface 1093.

(3-6) Functional Circuit Block Configuration of Radio Broadcast Information Delivery Server 1006

Figure 14:
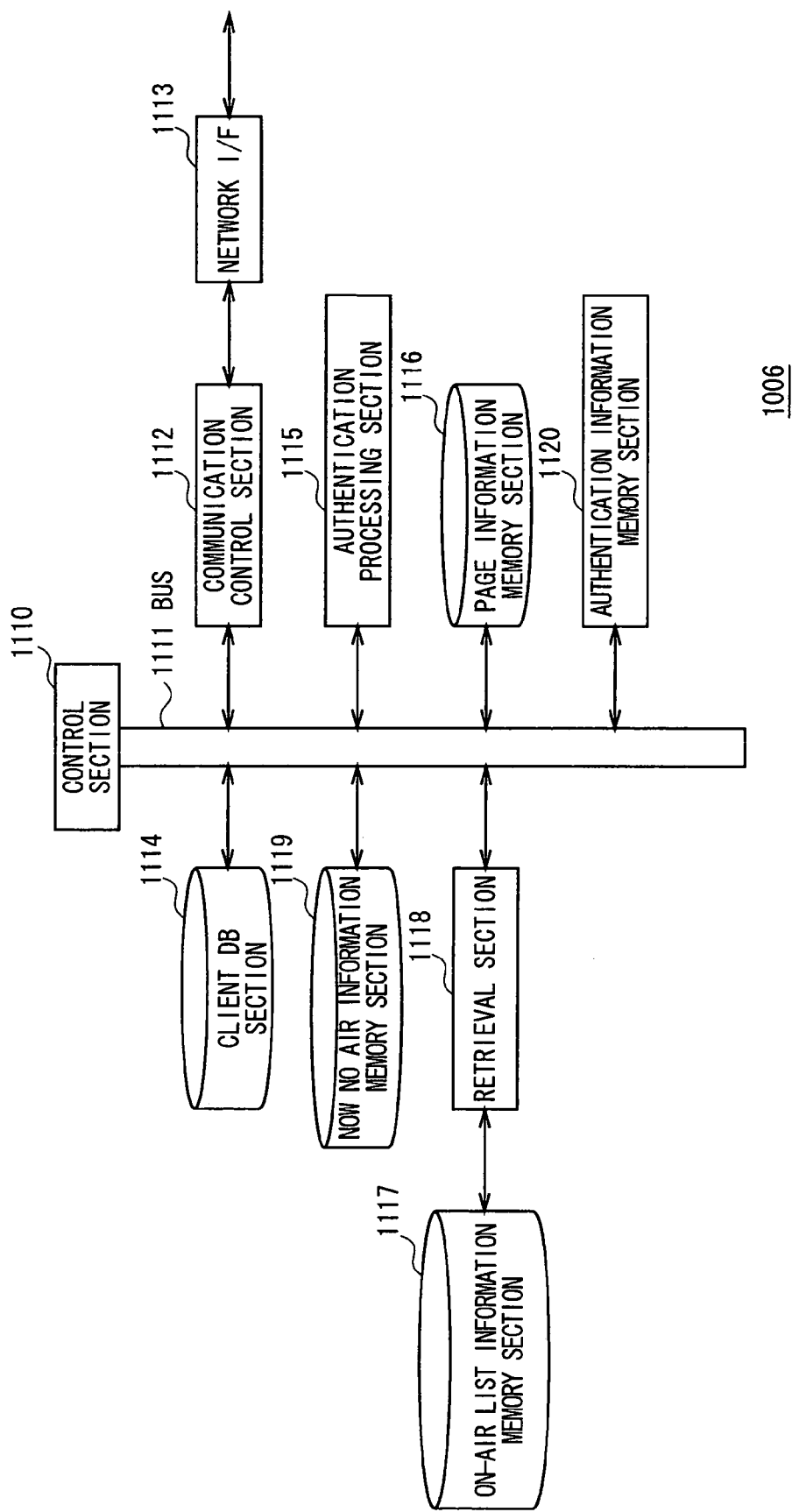
FIG. 14 is a schematic functional circuit block diagram of a radio broadcast information delivery server, illustrating the hardware configuration thereof.

Now, the hardware configuration of the radio broadcast information delivery server 1006 will be described below in terms of function circuit blocks by referring to FIG. 14. The control section 1110 in the radio broadcast information delivery server 1006 controls the operations of the various circuits connected to it by way of bus 1111.

Communication control section 1112 exchanges various pieces of information and various data with the client terminal 1002 and the other servers including the portal server 1003 by way of network interface 1113 under the control of the control section 1110.

The user ID information and the password information of each of the users who have already concluded contracts with the operator of the radio broadcast information delivery server 1006 are correlated with each other and registered in client database section 1114 as client information. Note, however, that the client database section 1114 may be omitted if the authentication processing section 1115 has a function of executing an authentication process on each user according to the information on the portal authentication results issued from the portal server 1003 and transmitted from the client terminal 1002.

Page information memory section 1116 stores page information for delivery of radio broadcast information relating to the radio programs (to be referred to as on-air list information hereinafter) that have already broadcast from each of the radio stations managed by the radio broadcast information delivery server 1006 and corresponding to the radio broadcast information delivery server 1006. The page information is typically utilized to acquire on-air lists.

Note that page information for delivery of on-air list information is described by a language such as the XML and provided with input boxes for prompting the user of the client terminal 1002 to input the time and date of transmission of a radio program and the title of the program as retrieval key for the on-air list information that the user wants to acquire.

The on-air list information memory section 1117 stores on-air list information including the titles of the radio programs that have already been broadcast from each of the radio stations corresponding to the radio broadcast information delivery server 1006, the clock time of the start and that of the end of each of the radio programs and the title, the names of the performing artists, the clock time of the start and that of the end of each of the pieces of music broadcast in each of the radio programs. These pieces of information are generated in the form of list.

As the control section 1110 receives the page information acquisition request signal requesting page information for delivery of on-air list information that is transmitted from the client terminal 1002 sequentially by way of the network interface 1113 and the communication control section 1112, it transmits the page information for delivery of on-air list information that is stored in the page information memory section 1116 to the client terminal 1002 sequentially by way of the communication control section 1112 and the network interface 1113 in response to the received page information acquisition request signal.

As the retrieval section 1118 receives sequentially by way of the network interface 1113 and the communication control section 1112 an on-air list information request signal that is transmitted from the client terminal 1002, requesting it to download the desired on-air list information containing a retrieval key for retrieving the on-air list information that the user wants to acquire and inputs on the page information for delivery of on-air list information, it takes out the retrieval key from the received on-air list information request signal.

Then, the retrieval section 1118 retrieves the part of the on-air list information stored in the on-air list information memory section 1117 that meets the retrieval requirements of the retrieval key as on-air list information that is desired to be acquired, using the retrieval key.

Then, the control section 1110 transmits the retrieved on-air list information that the user wants to acquire to the client terminal 1002 sequentially by way of the communication control section 1112 and the network interface 1113.

Now-on-air information memory section 1119 stores now-on-air information including the title of the radio program that is currently being broadcast from each of the radio stations corresponding to the radio broadcast information delivery server 1006, the clock time of the start and that of the end of the radio program and the title, the names of the performing artists, the clock Lime of the start and that of the end of the piece of music that is currently being broadcast in the radio program.

As the authentication processing section 1115 receives the user ID information and the password information of the user using the client terminal 1002 that are transmitted from the client terminal 1002 with the now-on-air information request signal, requesting acquisition of now-on-air information sequentially by way of the network interface 1113 and the communication control section 1112, it checks if the user ID information and the password information it received are registered in the client database section 1114 as client information or not in a user authentication process.

Additionally, as a user authentication technique different from the user authentication process using the user ID information and the password information, the authentication processing section 1115 receives the information on the portal authentication results (authentication ticket as will be described hereinafter) issued from the portal server 1003 and transmitted from the client terminal 1002 sequentially by way of the network interface 1113 and the communication control section 1112 and transmits the received information on the portal authentication results to the portal server 1003 sequentially by way of the communication control section 1112 and the network interface 1113.

Then, the authentication processing section 1115 receives the information on the outcome of the checking process that is transmitted back as a result of the execution of the authentication process (that is the above described checking process) on the information on the portal authentication results from the portal server 1003 sequentially by way of the network interface 1113 and the communication control section 1112 in response to the transmission of the information on the portal authentication results to the portal server 1003. Then, it checks if the user has already concluded a contract with the operator of the music-related service providing system 1000 or not on the basis of the received information on the outcome of the checking process.

As the authentication processing section 1115 ends the user authentication process, it issues server authentication result information (service session ID information as will be described hereinafter) that shows the outcome of the user authentication process.

At this time, if the user is authenticated as authorized user as a result of the user authentication process executed by the authentication processing section 1115, the control section 1110 transmits the now-on-air information that is stored in the now-on-air information memory section 1116 to the client terminal 1002 sequentially by way of the communication control section 1112 and the network interface 1113 along with the server authentication result information.

If, on the other hand, the user is not authenticated as authorized user as a result of the user authentication process executed by the authentication processing section 1115, the control section 1110 transmits authentication error information to the client terminal 1002 sequentially by way of the communication control section 1112 and the network interface 1113 along with authentication failure notification page information indicating the failure of authentication that is stored in the page information memory section 1116.

In this way, the control section 1110 delivers the now-on-air information to the user in response to the user's request for acquiring now-on-air information if the user is authenticated as authorized user, whereas it prevents the user from receiving the radio broadcast information delivery service including the service of delivering now-on-air information that the radio broadcast information delivery server 1006 provides if the user is not authenticated as authorized user.

Meanwhile, authentication information memory section 1120 temporarily stores the server authentication result information issued from the authentication processing section 1115 and also various pieces of authentication information that the authentication processing section 1115 requires in a user authentication process for the user using the client terminal 1002.

(3-7) Summary of Processing Operation of Each Server

Now, the process that is executed between the client terminal 1002 and the portal server 1003 and the process that is executed between the client terminal 1002 and each of the other servers including the music information delivery server 1004, the merchandizing server 1005 and the radio broadcast information delivery server 1006 will be summarily described by referring to the sequence charts of FIGS. 15 through 20.

(3-7-1) User Authentication Process Sequence between Client Terminal 1002 and Portal Server 1003

Figure 15:
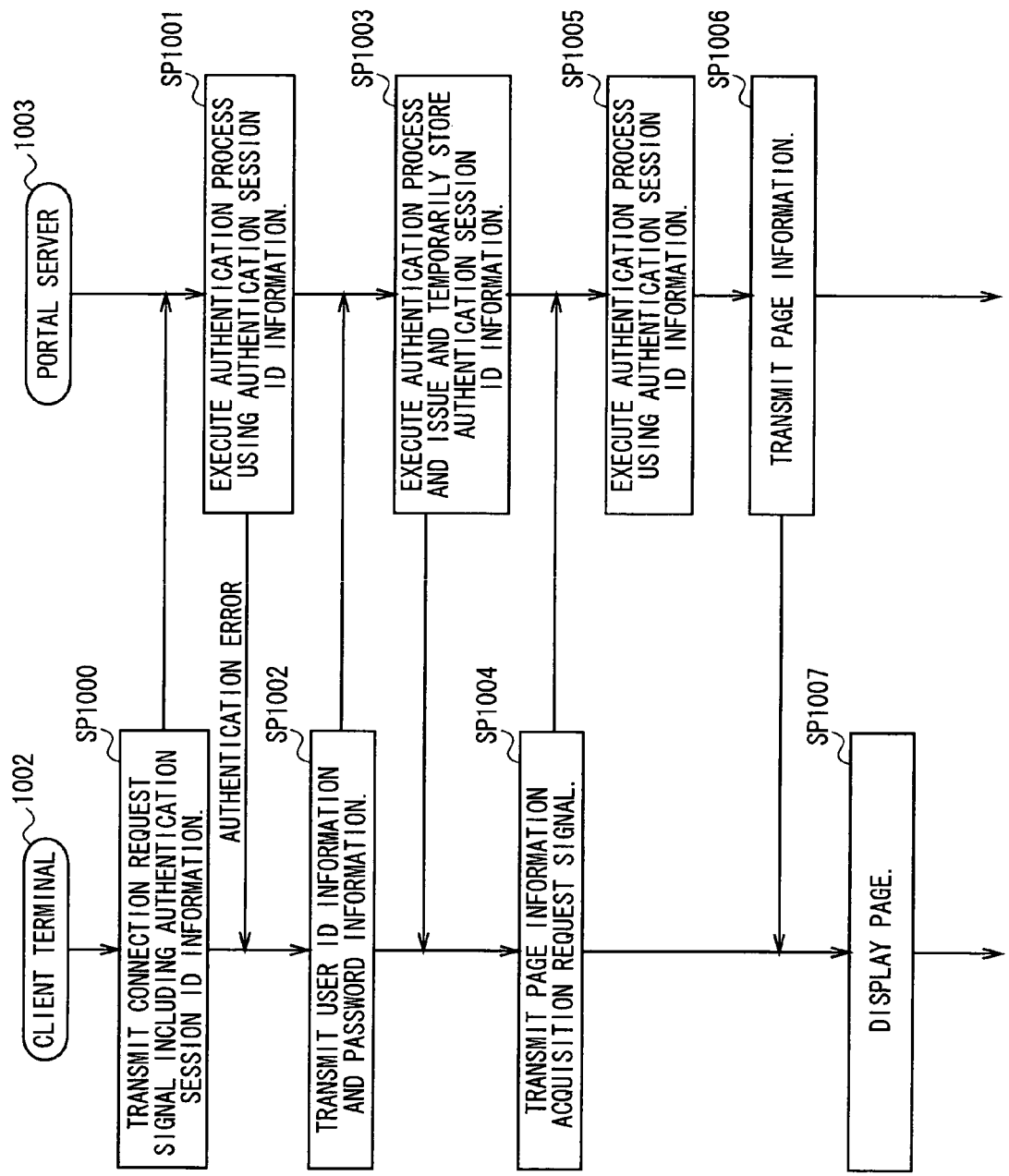
FIG. 15 is a sequence chart illustrating the processing sequence for user authentication between a client terminal and a portal server.

Firstly, the procedures of the user authentication process that is executed between the client terminal 1002 and the portal server 1003 will be described by referring to FIG. 15.

The control section 1023 of the client terminal 1002 that is under contract with the operator of the music-related service providing system 1000 starts an authentication request process when the power supply to the client terminal 1002 is turned on or the operation input signal that is recognized by the operation input section 1020 in response to an operation by the user of depressing a specific operation button of the operation input section 1020 is converted into an operation command by the input processing section 1021.

As the client terminal 1002 starts an authentication request process, the control section 1023 generates a connection request signal containing the authentication session ID information and other pieces of information that are temporarily stored in advance in the authentication information memory section 1038 and transmits the generated connection request signal to the portal server 1003 sequentially by way of the communication control section 1032 and the network interface 1033 in Step SP1000.

Note that authentication session ID information is identification information that is issued by the portal server 1003 to identify the state of individual connection for communication (or session) each time the client terminal 1002 and the portal server 1003 are connected for communication in order to execute any of various processes such as a user authentication process.

A predetermined effective period (e.g., about 1 minute) is defined for each piece of authentication session ID information. The effective period starts when the portal server 1003 issues the authentication session ID information for a user authentication process or the like.

Therefore, if the client terminal 1002 that has acquired authentication session ID information from the portal server 1003 cannot present the authentication session ID information to the portal server 1003 within the effective period, the portal server 1003 determines that the connection for communication that is identified by the authentication session ID information is disconnected.

With this arrangement, the portal server 1003 prevents the authentication session ID information that has been issued in the past from being improperly and fraudulently utilized by a user who is not under contract with the operator of the music-related service providing system 1000 for the user authentication process and other purposes.

The authentication session ID information that is temporarily stored in the authentication information memory section 1038 was issued by the portal server 1003 when the client terminal 1002 and the portal server 1003 were connected for communication for the purpose of executing a user authentication process or the like in the past.

As a connection request signal is transmitted from the client terminal 1002, the control section 1050 of the portal server 1003 receives the connection request signal sequentially by way of the network interface 1053 and the communication control section 1052 and transmits the authentication session ID information and the other pieces of information contained in the received connection request signal to the authentication processing section 1056 in Step SP1001.

Then, the authentication processing section 1056 executes a user authentication process under the control of the control section 1050 on the basis of the authentication session ID information received as connection request signal from the client terminal 1002.

If, as a result, the authentication processing section 1056 cannot authenticate the user who is utilizing the client terminal 1002 as authorized user probably because the effective period of the authentication session ID information or the like received from the client terminal 1002 has expired, the control section 1050 transmits authentication error information showing an authentication error to the client terminal 1002 sequentially by way of the communication control section 1052 and the network interface 1053.

Then, in Step SP1002, as the control section 1023 of the client terminal 1002 receives the authentication error information transmitted from the portal server 1003 sequentially by way of the network interface 1033 and the communication control section 1032, it reads out the user ID information, the password information and other pieces of information stored in the authentication information memory section 1038 and transmits the user ID information, the password information and the other pieces of information it read out to the portal server 1003 sequentially by way of the communication control section 1032 and the network interface 1033 in response.

In Step SP1003, the control section 1050 of the portal server 1003 receives the user ID information, the password information and the other pieces of information transmitted from the client terminal 1002 sequentially by way of the network interface 1053 and the communication control section 1052 and transmits the user ID information, the password information and other pieces of information it received to the authentication processing section 1056.

Then, the authentication processing section 1056 detects if the user ID information, the password information and the other pieces of information received from the client terminal 1002 are contained in the client information that is registered in the client database section 1054 or not in a user authentication process under the control of the control section 1050.

If, as a result, the control section 1050 authenticates that the user who is utilizing the client terminal 1002 is an authorized user by way of the authentication processing section 1056, it issues authentication session ID information for the state of connection for communication between the client terminal 1002 and the portal server 1003 at present as information on the portal authentication results and, at the same time, temporarily stores the authentication session ID information that is issued to the client terminal 1002 in the authentication information memory section 1057 along with other pieces of information.

Then, the control section 1050 transmits the authentication session ID information issued to the client terminal 1002 by the authentication processing section 1056 and other pieces of information to the client terminal 1002 sequentially by way of the communication control section 1052 and the network interface 1053.

Then, in Step SP1004, the control section 1023 of the client terminal 1002 receives the authentication session ID information and the other pieces of information transmitted from the portal server 1003 sequentially by way of the network interface 1033 and the communication control section 1032 and transmits the authentication session ID information and other pieces of information it receives to the authentication processing section 1037.

Subsequently, the authentication processing section 1037 temporarily stores the authentication session ID information and the other pieces of information it receives from the portal server 1003 in the authentication information memory section 1038 under the control of the control section 1023.

Then, the control section 1023 transmits a page information acquisition request signal for requesting page information from the portal server 1003 along with the authentication session ID information and the other pieces of information received from the portal server 1003 and temporarily stored in the authentication information memory section 1038 to the portal server 1003 sequentially by way of the communication control section 1032 and the network interface 1033.

Then, in Step SP1005, the control section 1050 of the portal server 1003 receives the page information acquisition request signal, the authentication session ID information and the other pieces of information that are transmitted from the client terminal 1002 and transmits the authentication session ID information and the other pieces of information it receives to the authentication processing section 1056.

Then, the authentication processing section 1056 executes a user authentication process under the control of the control section 1050, where it compares the authentication session ID information and the other pieces of information received from the client terminal 1002 with the authentication session ID information and the other pieces of information issued to the client terminal 1002 and temporarily stored in the authentication information memory section 1057 in Step SP1003.

If, in Step SP1006, the authentication processing section 1056 authenticates the user utilizing the client terminal 1002 is an authorized user, it determines that the request for acquiring page information from the client terminal 1002 is a proper request and extends the effective period of the authentication session ID information and the other pieces of information issued to the client terminal 1002.

Then, the control section 1050 reads out the page information requested by the user for acquisition from the page information memory section 1055 and transmits the page information it reads out to the client terminal 1002 sequentially by way of the communication control section 1052 and the network interface 1053 along with the authentication session ID information and the other pieces of information, the effective period of which is extended by the authentication processing section 1056.

Then, in Step SP1007, the control section 1023 of the client terminal 1002 receives the page information, the authentication session ID information and the other pieces of information, the effective period of the authentication session ID information and the other pieces of information being extended, transmitted from the portal server 1003 sequentially by way of the network interface 1033 and the communication control section 1032 and transmits the received page information to the page information generating section 1036 while it also transmits the authentication session ID information and the other pieces of information, the effective period of which is extended, to the authentication processing section 1037.

The page information generating section 1036 generates video data of the page where the links to the music information delivery server 1004, the merchandising server 1005 and the radio broadcast information delivery server 1006 are buried according to the page information supplied from the control section 1023 and transmits the video data it generates to the display control section 1024

Then, the display control section 1024 executes a digital/analog conversion process on the video data supplied from the page information generating section 1036 and transmits the obtained analog video signal to the display section 1025 so as to have the display section 1025 display the page of the portal server 1003 as an image that is based on the analog video signal.

On the other hand, the authentication processing section 1037 temporarily stores the authentication session ID information and the other pieces of information that are received from the portal server 1003 and the effective period of which is extended in the authentication information memory section 1038 under the control of the control section 1023 so as to overwrite the authentication session ID information and the other pieces of information before the extension of the effective period. In this way, it updates the authentication session ID information and the other pieces of information temporarily stored in Step SP1004 for the extended effective period.

(3-7-2) User Authentication Process Sequence between Client Terminal 1002 and Each of the Servers 1004 through 1006

Figure 16:
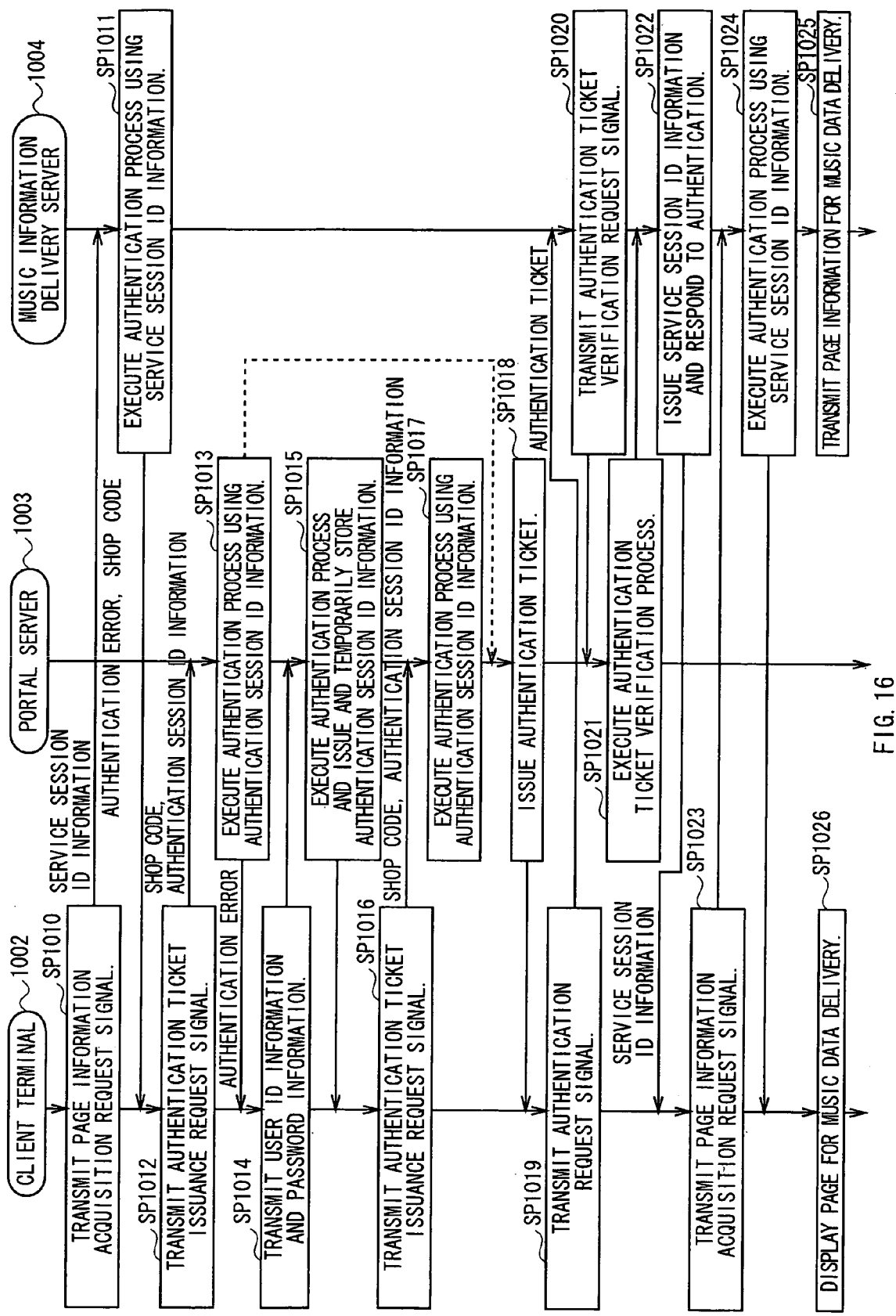
FIG. 16 is a sequence chart illustrating the processing sequence for user authentication between a client terminal and a music information delivery server.

Now, the sequence of the user authentication process that is executed between the client terminal 1002 and each of the other servers including the music information delivery server 1004, the merchandising server 1005 and the radio broadcast information delivery server 1006 will be described by referring to FIG. 16.

The user authentication process may be such a user authentication process where the client terminal 1002 acquires page information from the portal server 1003 and subsequently accesses the music information delivery server 1004, the merchandizing server 1005 or the radio broadcast information delivery server 1006 by means of the link buried in the page information for execution as described above by referring to FIG. 15 (to be referred to as indirect access authentication process hereinafter).

Alternatively, the user authentication process may be such a user authentication process where the client terminal 1002 does not acquire page information from the portal server 1003 and directly accesses the music information delivery server 1004, the merchandising server 1005 or the radio broadcast information delivery server 1006 by means of the URL information that is registered in advance as bookmark for execution (to be referred to as direct access authentication process hereinafter).

Note, however, that indirect access authentication processes can be executed by following the same sequence regardless of the combination of the client terminal 1002 and the server, which may be the music information delivery server 1004, the merchandising server 1005 or the radio broadcast information delivery server 1006.

Also note that direct access authentication processes can be executed by following the same sequence regardless of the combination of the client terminal 1002 and the server, which may be the music information delivery server 1004, the merchandising server 1005 or the radio broadcast information delivery server 1006.

The indirect access authentication process and the direct access authentication process differ from each other only in terms of the way of acquiring the URL information to be used by the client terminal 1002 to access the music information delivery server 1004, the merchandising server 1005 or the radio broadcast information delivery server 1006. In other words, after acquiring the URL information, the same procedures are followed for both the indirect access authentication process and the direct access authentication process.

Therefore, it is assumed that the client terminal 1002 accesses the music information delivery server 1004 in the following description and a single user authentication process will be described for both the indirect access authentication process and the direct access authentication process.

Firstly, in Step SP1010, the control section 1023 of the client terminal 1002 transmits a page information acquisition request signal requesting page information for delivery of music data (which may be page information for merchandising package media and page information for delivery of on-air list information in the case of the merchandizing server 1005 and the radio broadcast information delivery server 1006 respectively) along with the service session ID information and the other pieces of information read out from the authentication information memory section 1038 to the music information delivery server 1004 sequentially by way of the communication control section 1032 and the network interface 1033.

Note that service session ID information is identification information issued from the music information delivery server 1004, the merchandising server 1005 or the radio broadcast information delivery server 1006 that is accessed by the client terminal 1002 to identify the state of individual connection for communication (or session) each time the client terminal 1002 and the music information delivery server 1004, the merchandising server 1005 or the radio broadcast information delivery server 1006, whichever appropriate, are connected for communication in order to execute any of various processes such as a user authentication process.

As in the case of the above described authentication session ID information, a predetermined effective period (e.g., about 1 minute) is defined for each piece of service session ID information. The effective period starts when the music information delivery server 1004, the merchandising server 1005 or the radio broadcast information delivery server 1006 issues the service session ID information for a user authentication process.

Therefore, if the client terminal 1002 that has acquired service session ID information from one of the servers 1004 through 1006 cannot present the service session ID information to the music information delivery server 1004, the merchandizing server 1005 or the radio broadcast information delivery server 1006 within the effective period, the music information delivery server 1004, the merchandising server 1005 or the radio broadcast information delivery server 1006, whichever appropriate, determines that the connection for communication that is identified by the service session ID information is disconnected.

With this arrangement, the music information delivery server 1004, the merchandizing server 1005 and the radio broadcast information delivery server 1006 prevent the service session ID information that has been issued in the past from being improperly and fraudulently utilized by a user who is not under contract with the operator of the music-related service providing system 1000 for the user authentication process and other purposes.

The authentication session ID information that is temporarily stored in the authentication information memory section 1038 was issued by the music information delivery server 1004, the merchandizing server 1005 or the radio broadcast information delivery server 1006 when the client terminal 1002 and the music information delivery server 1004, the merchandising server 1005 or the radio broadcast information delivery server 1006, whichever appropriate, were connected for communication for the purpose of executing a user authentication process or the like in the past.

Then, in Step SP1011, the control section 1070 of the music information delivery server 1004 receives the page information acquisition request signal, the service session ID information and the other pieces of information that are transmitted from the client terminal 1002 sequentially by way of the network interface 1073 and the communication control section 1072 and transmits the service session ID information and the other pieces of information it receives to the authentication processing section 1075.

Then, the authentication processing section 1075 executes a user authentication process under the control of the control section 1070, where it compares the service session ID information and the other pieces of information received from the client terminal 1002 with the service session ID information and the other pieces of information already temporarily stored in the authentication information memory section 1077.

If, as a result, the authentication processing section 1075 cannot authenticate the user who is utilizing the client terminal 1002 as authorized user probably because the effective period of the service session ID information received from the client terminal 1002 has expired, it determines that the request for acquiring the page information for delivery of music data from the client terminal 1002 is not a proper request.

Then, when the authentication processing section 1075 does not authenticate the user who is utilizing the client terminal 1002 as authorized user, the control section 1070 transmits authentication error information showing an authentication error and the shop code for identifying the music information delivery server 1004 to the client terminal 1002 sequentially by way of the communication control section 1072 and the network interface 1073.

In Step SP1012, the control section 1023 of the client terminal 1002 receives the authentication error information and the shop code transmitted from the music information delivery server 1004 sequentially by way of the network interface 1033 and the communication control section 1032 and recognizes from the received authentication error information that the user is not authenticated as authorized user by the music information delivery server 1004, while it temporarily stores the shop code received from the music information delivery server 1004 in the authentication information memory section 1038.

Then, the control section 1023 generates an authentication ticket issuance request signal requesting the portal server 1003 to issue an authentication ticket for accessing the music information delivery server 1004 and transmits the generated authentication ticket issuance request signal to the portal server 1003 sequentially by way of the communication control section 1032 and the network interface 1033 along with the shop code of the music information delivery server 1004 and the authentication session ID information that is already received from the portal server 1003 and temporarily stored in the authentication information memory section 1038.

Then, in Step SP1013, the control section 1050 of the portal server 1003 receives the authentication ticket issuance request signal, the shop code and the authentication session ID information transmitted from the client terminal 1002 sequentially by way of the network interface 1053 and the communication control section 1052 and transmits them to the authentication processing section 1056.

Subsequently, the authentication processing section 1056 executes a user authentication process under the control of the control section 1050, where it compares the authentication session ID information and the other pieces of information received from the client terminal 1002 with the authentication session ID information and the other pieces of information already temporarily stored in the authentication information memory section 1057.

If, as a result, the authentication processing section 1056 cannot authenticate the user who is utilizing the client terminal 1002 as authorized user probably because the effective period of the authentication session ID information received from the client terminal 1002 has expired, it determines that the request for issuance of an authentication ticket from the client terminal 1002 is not a proper request.

Then, as the authentication processing section 1056 does not authenticate the user who is utilizing the client terminal 1002 as authorized user, the control section 1050 transmits authentication error information showing an authentication error to the client terminal 1002 sequentially by way of the communication control section 1052 and the network interface 1053.

If, on the other hand, the authentication processing section 1056 authenticates the user as authorized user probably because the effective period of the authentication session ID information received from the client terminal 1002 has not expired, it determines that the request for issuance of an authentication ticket from the client terminal 1002 is a proper request.

Then, as the authentication processing section 1056 authenticates the user who is utilizing the user terminal 1002 as authorized user, the control section 1050 proceeds to Step SP1018, which will be described in greater detail hereinafter.

In Step SP1014, as the control section 1023 of the client terminal 1002 receives the authentication error information transmitted from the portal server 1003 sequentially by way of the network interface 1033 and the communication control section 1032, it reads out the user ID information, the password information and the other pieces of information stored in the authentication information memory section 1038 and then transmits the user ID information, the password information and the other pieces of information it read out to the portal server 1003 sequentially by way of the communication control section 1032 and the network interface 1033.

Then, in Step SP1015, the control section 1050 of the portal server 1003 receives the user ID information, the password information and the other pieces of information transmitted from the client terminal 1002 sequentially by way of the network interface 1053 and the communication control section 1052 and transmits the user ID information, the password information and the other pieces of information it received to the authentication processing section 1056.

Then, the authentication processing section 1056 executes a user authentication process under the control of the control section 1050, where it checks if the user ID information, the password information and the other pieces of information received from the client terminal 1002 are contained in the client information registered in the client database section 1054 or not.

If, as a result, the authentication processing section 1056 authenticates the user who is utilizing the client terminal 1002 as authorized user, it issues authentication session ID information and other pieces of information for the current state of connection for communication between the client terminal 1002 and the portal server 1003 as information on the portal authentication results and temporarily stores the authentication session ID information and the other pieces of information it issued to the client terminal 1002 in the authentication information memory section 1057 under the control of the control section 1050.

Then, by the authentication processing section 1056, the control section 1050 transmits the authentication session ID information and the other pieces of information it issued to the client terminal 1002 to the client terminal 1002 sequentially by way of the communication control section 1052 and the network interface 1053.

In Step SP1016, the control section 1023 of the client terminal 1002 receives the authentication session ID information and the other pieces of information transmitted from the portal server 1003 sequentially by way of the network interface 1033 and the communication control section 1032 and has the authentication processing section 1037 temporarily store the authentication session ID information and the other pieces of information it received in the authentication information memory section 1038.

Then, the control section 1023 generates an authentication ticket issuance request signal requesting the portal server 1003 to issue an authentication ticket and transmits the generated authentication ticket issuance request signal to the portal server 1003 sequentially by way of the communication control section 1032 and the network interface 1033 along with the shop code that is already temporarily stored in the authentication information memory section 1038 and the authentication session ID information that is temporarily stored now in the authentication information memory section 1038.

While the shop code is temporarily stored in the authentication information memory section 1038 of the client terminal 1002 in this embodiment, the present invention is by no means limited thereto and it is possible to transmit the shop code to the portal server 1003 in Step SP1016 without temporarily storing it in the authentication information memory section 1038 of the client terminal 1002 by sequentially exchanging the shop code in the processing operations of Steps SP1012 through SP1016 that are executed between the client terminal 1002 and the portal server 1003.

Then, in Step SP1017, the control section 1050 of the portal server 1003 receives the authentication ticket issuance request signal, the shop code, the authentication session ID information and the other pieces of information transmitted from the client terminal 1002 sequentially by way of the network interface 1053 and the communication control section 1052 and transmits them to the authentication processing section 1056.

Subsequently, the authentication processing section 1056 executes a user authentication process under the control of the control section 1050, where it compares the authentication session ID information and the other pieces of information received from the client terminal 1002 with the authentication session ID information and the other pieces of information that are already temporarily stored in the authentication information memory section 1057.

When the authentication processing section 1056 authenticates the user as authorized user probably because the effective period of the authentication session ID information received from the client terminal 1002 has not expired, it determines that the request for issuance of an authentication ticket from the client terminal 1002 is a proper request.

Then, as the authentication processing section 1056 authenticates the user who is utilizing the client terminal 1002 as authorized user, the control section 1050 proceeds to the next step, or Step SP1018.

In Step SP1018, the authentication processing section 1056 issues an authentication ticket that allows the client terminal 1002 to access to the music information delivery server 1004 identified by the shop code as information on the portal authentication results under the control of the control section 1050 and according to the shop code and the authentication ticket issuance request signal it received from the client terminal 1002 in the above described step, or Step SP1017.

Then, the authentication processing section 1056 temporarily stores the authentication ticket it issued and the other pieces of information in the authentication information memory section 1057 and, at the same time, extends the effective period of the authentication session ID information it issued to the client terminal 1002 under the control of the control section 1050.

Then, the control section 1050 transmits the authentication ticket and the other pieces of information to the client terminal 1002 along with the authentication session ID information, the effective period of which is extended by the authentication processing section 1056, sequentially by way of the communication control section 1052 and the network interface 1053.

In Step SP1019, the control section 1023 of the client terminal 1002 receives the authentication ticket, the authentication session ID information and the other pieces of information that are transmitted from the portal server 1003 and the effective period of which is extended sequentially by way of the network interface 1033 and the communication control section 1032 and transmits the received authentication session ID information to the authentication processing section 1037.

Then, the control section 1023 transmits the authentication ticked it received from the portal server 1003 to the music information delivery server 1004 along with an authentication request signal sequentially by way of the communication control section 1032 and the network interface 1033.

At this time, the authentication processing section 1037 temporarily stores the authentication session ID information and the other pieces of information that are received from the portal server 1003 and the effective period of which is extended in the authentication information memory section 1038 under the control of the control section 1023 so as to overwrite the authentication session ID information and the other pieces of information before the extension of the effective period. In this way, it updates the authentication session ID information and the other pieces of information temporarily stored in Step SP1016 for the extended effective period.

In Step SP1020, the control section 1070 of the music information delivery server 1004 receives the authentication request signal, the authentication ticket and the other pieces of information transmitted from the client terminal 1002 sequentially by way of the network interface 1073 and the communication control section 1072.

Then, the control section 1070 transmits the authentication ticket and the other pieces of information it received from the client terminal 1002 to the portal server 1003 along with an authentication ticket verification request signal requesting verification of the authentication ticket and the other pieces of information sequentially by way of the communication control section 1072 and the network interface 1073.

In Step SP1021, the control section 1050 of the portal server 1003 receives the authentication ticket verification request signal, the authentication ticket and the other pieces of information transmitted from the music information delivery server 1004 sequentially by way of the network interface 1053 and the communication control section 1052 and transmits the authentication ticket verification request signal and the authentication ticket it received to the authentication processing section 1056.

Then, the authentication processing section 1056 executes a verification process on the authentication ticket received from the music information delivery server 1004 in response to the authentication ticket verification request signal under the control of the control section 1050, where it compares the authentication ticket received from the music information delivery server 1004 with the authentication ticket already temporarily stored in the authentication information memory section 1057.

If the authentication processing section 1056 verifies that the authentication ticket and the other pieces of information received from the music information delivery server 1004 are proper authentication ticket and so on, the control section 1050 transmits information on the verification results indicating that the authentication ticket and so on are proper authentication ticket and so on to the music information delivery server 1004 sequentially by way of the communication control section 1052 and the network interface 1053.

In Step SP1022, the control section 1070 of the music information delivery server 1004 receives the information on the verification results transmitted from the portal server 1003 sequentially by way of the network interface 1073 and the communication control section 1072 and transmits the received information on the verification results to the authentication processing section 1075.

Then, the authentication processing section 1075 issues service session ID information and other pieces of information for the current state of connection for communication between the client terminal 1002 and the music information delivery server 1004 according to the information on the verification results under the control of the control section 1070 and, at the same time, temporarily stores the service session ID information and the other pieces of information it issued in the authentication information memory section 1077.

Additionally, the control section 1070 transmits the service session ID information and the other pieces of information issued to the client terminal 1002 by the authentication processing section 1075 to the client terminal 1002 sequentially by way of the communication control section 1072 and the network interface 1073.

In Step SP1023, the control section 1023 of the client terminal 1002 receives the service session ID information and the other pieces of information transmitted from the music information delivery server 1004 sequentially by way of the network interface 1033 and the communication control section 1032 and have the authentication processing section 1037 temporarily store the service session ID information and the other pieces of information it received in the authentication information memory section 1038.

Then, the control section 1023 transmits a page information acquisition request signal requesting page information for delivery of music data to the music information delivery server 1004 along with the service session ID information and the other pieces of information it received from the music information delivery server 1004 and temporarily stored in the authentication information memory section 1038 sequentially by way of the communication control section 1032 and the network interface 1033.

In Step SP1024, the control section 1070 of the music information delivery server 1004 receives the page information acquisition request signal, the service session ID information and the other pieces of information transmitted from the client terminal 1002 sequentially by way of the network interface 1073 and the communication control section 1072 and transmits the service session ID information and the other pieces of information it received to the authentication processing section 1075.

Then, the authentication processing section 1075 executes a user authentication process under the control of the control section 1070, where it compares the service session ID information and the other pieces of information it received from the client terminal 1002 with the service session ID information and the other pieces of information already issued to the client terminal 1002 and temporarily stored in the authentication information memory section 1077 in Step SP1022.

If, as a result, the authentication processing section 1075 authenticates the user as authorized user probably because the effective period of the service session ID information received from the client terminal 1002 has not expired, it determines that the request for acquisition of page information for delivery of music data from the client terminal 1002 is a proper request.

Then, as the authentication processing section 1075 authenticates the user who is utilizing the client terminal 1002 as authorized user, the control section 1070 proceeds to the next step, or Step SP1025.

In Step SP1025, the control section 1070 reads out the page information for delivery of music data requested by the user for acquisition from the page information memory section 1076 and, at the same time, has the authentication processing section 1075 extends the effective period of the service session ID information issued to the client terminal 1002.

Then, the control section 1070 transmits the page information for delivery of music data read out from the page information memory section 1076 to the client terminal 1002 sequentially by way of the communication control section 1072 and the network interface 1073 along with the service session ID information and the other pieces of information, the effective period of which is extended by the authentication processing section 1075.

In Step SP1026, the control section 1023 of the client terminal 1002 receives the page information for delivery of music data transmitted from the music information delivery server 1004, the service session ID information and the other pieces of information, the effective period of the service session ID information and the other pieces of information being extended, sequentially by way of the network interface 1033 and the communication control section 1032 and transmits the received page information for delivery of music data to the page information generating section 1036 and, at the same time, the service session ID information and the other pieces of information it received from the music information delivery server 1004 to the authentication processing section 1037.

Then, the authentication processing section 1037 temporarily stores the service session ID information and the other pieces of information that are received from the music information delivery server 1004 and the effective period of which is extended in the authentication information memory section 1038 under the control of the control section 1023 so as to overwrite the service session ID information and the other pieces of information before the extension of the effective period. In this way, it updates service session ID information and the other pieces of information temporarily stored in Step SP1023 for the extended effective period.

Additionally, the page information generating section 1036 generates video data on the basis of the page information for delivery of music data and transmits the generated video data to the display control section 1024.

Then, the display control section 1024 executes a digital/analog conversion process on the video data supplied from the page information generating section 1036 and transmits the obtained analog video signal to the display section 1025 so as to have the display section 1025 display the page for delivery of music data as an image that is based on the analog video signal.

(3-7-3) Music-Related Service Providing Process

Now, the music-related service providing process that is executed in the user authentication process when receiving a music data delivery service, a merchandizing service or a radio broadcast information delivery service by utilizing the page information for delivery of music data, the page information for merchandizing package media or page information for delivery of on-air list information, whichever appropriate, that the client terminal 1002 acquired from the music information delivery server 1004, the merchandizing server 1005 or the radio broadcast information delivery server 1006, whichever appropriate, after the end of the sequence of the user authentication process executed between the client terminal 1002 and the music information delivery server 1004, the merchandizing server 1005 or the radio broadcast information delivery server 1006 as described above by referring to FIG. 16 will be described by referring to FIGS. 17 through 20.

(3-7-3-1) Music Data Delivery Service Providing Process Sequence

Figure 17:
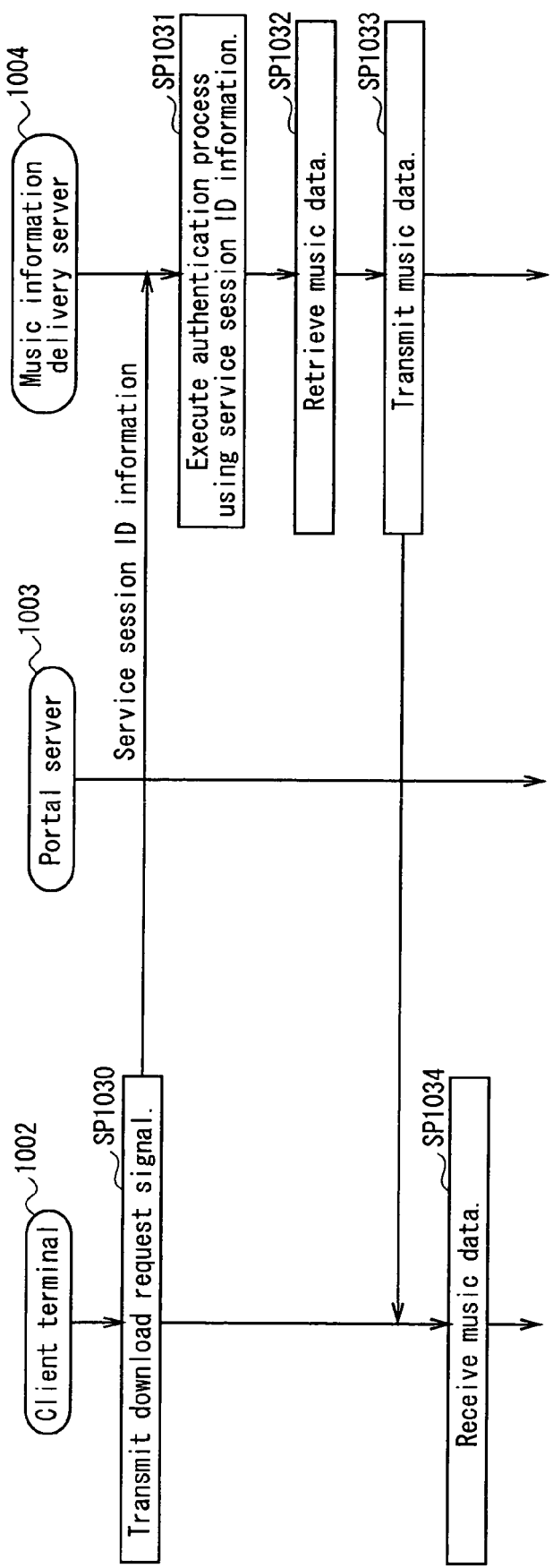
FIG. 17 is a sequence chart illustrating the processing sequence for providing a music data delivery service.

Firstly, the music data delivery service providing process sequence to be followed when the client terminal 1002 receives a music data delivery service from the music information delivery server 1004 will be described below by referring to FIG. 17.

In Step SP1030, as a control command for selecting part of the page for delivery of music data that is displayed as an image on the display section 1025 is input from the input processing section 1021, the control section 1023 of the client terminal 1002 generates a download request signal requesting the music data that the user wants to be downloaded according to the input control command.

Then, the control section 1023 transmits the download request signal to the music information delivery server 1004 along with the service session ID information and the other pieces of information already issued by the music information delivery server 1004 and temporarily stored in the authentication information memory section 1038 sequentially by way of the communication control section 1032 and the network interface 1033.

In Step SP1031, the control section 1070 of the music information delivery server 1004 receives the download request signal, the service session ID information and the other pieces of information transmitted from the client terminal 1002 sequentially by way of the network interface 1073 and the communication control section 1072 and transmits the service session ID information and the other pieces of information it received to the authentication processing section 1075.

Then, the authentication processing section 1075 executes a user authentication process under the control of the control section 1070, where it compares the service session ID information and the other pieces of information received from the client terminal 1002 with the service session ID information and the other pieces of information already temporarily stored in the authentication information memory section 1077.

If, as a result, the control section 1070 authenticates the user who requested music data to be downloaded by utilizing the client terminal 1002 as authorized user by way of the authentication processing section 1075, it proceeds to the next step, or Step SP1032.

In Step SP1032, the retrieval section 1079 retrieves the music data desired to be downloaded that meet the requirements for retrieval indicated in the retrieval key that is contained in the download request signal out of the plurality of sets of music data stored in the music data memory section 1078, using the retrieval key.

Then, as the retrieval section 1079 retrieves the music data, the control section 1070 has the authentication processing section 1075 extend the effective period of the service session ID information and the other pieces of information issued to the client terminal 1002 and proceeds to the next step, or Step SP1033.

In Step SP1033, the control section 1070 reads out the music data desired to be downloaded and retrieved by the retrieval section 1079 from the music data memory section 1078 and transmits them to the client terminal 1002 along with the service session ID information and the other pieces of information, the effective period of which is extended by the authentication processing section 1075, sequentially by way of the communication control section 1072 and the network interface 1073.

In Step SP1034, the control section 1023 of the client terminal 1002 receives the music data to be downloaded, the service session ID information and the other pieces of information transmitted from the music information delivery server 1004, the effective period of the service session ID information and the other pieces of information being extended, sequentially by way of the network interface 1033 and the communication control section 1032 and stores the received music data in the recording medium 1029, while it transmits the service session ID information and the other pieces of information received from the music information delivery server 1004 to the authentication processing section 1037.

The authentication processing section 1037 temporarily stores the service session ID information and the other pieces of information that are received from the music information delivery server 1004 and the effective period of which is extended in the authentication information memory section 1038 under the control of the control section 1023 so as to overwrite the service session ID information and the other pieces of information before the extension of the effective period. In this way, it updates the service session ID information and the other pieces of information already temporarily stored in the authentication information memory section 1038 for the extended effective period.

Thus, the client terminal 1002 can download the music data that the user wants to acquire, utilizing the music data delivery service provided by the music information delivery server 1004.

(3-7-3-2) Merchandizing Service Providing Process Sequence

Figure 18:
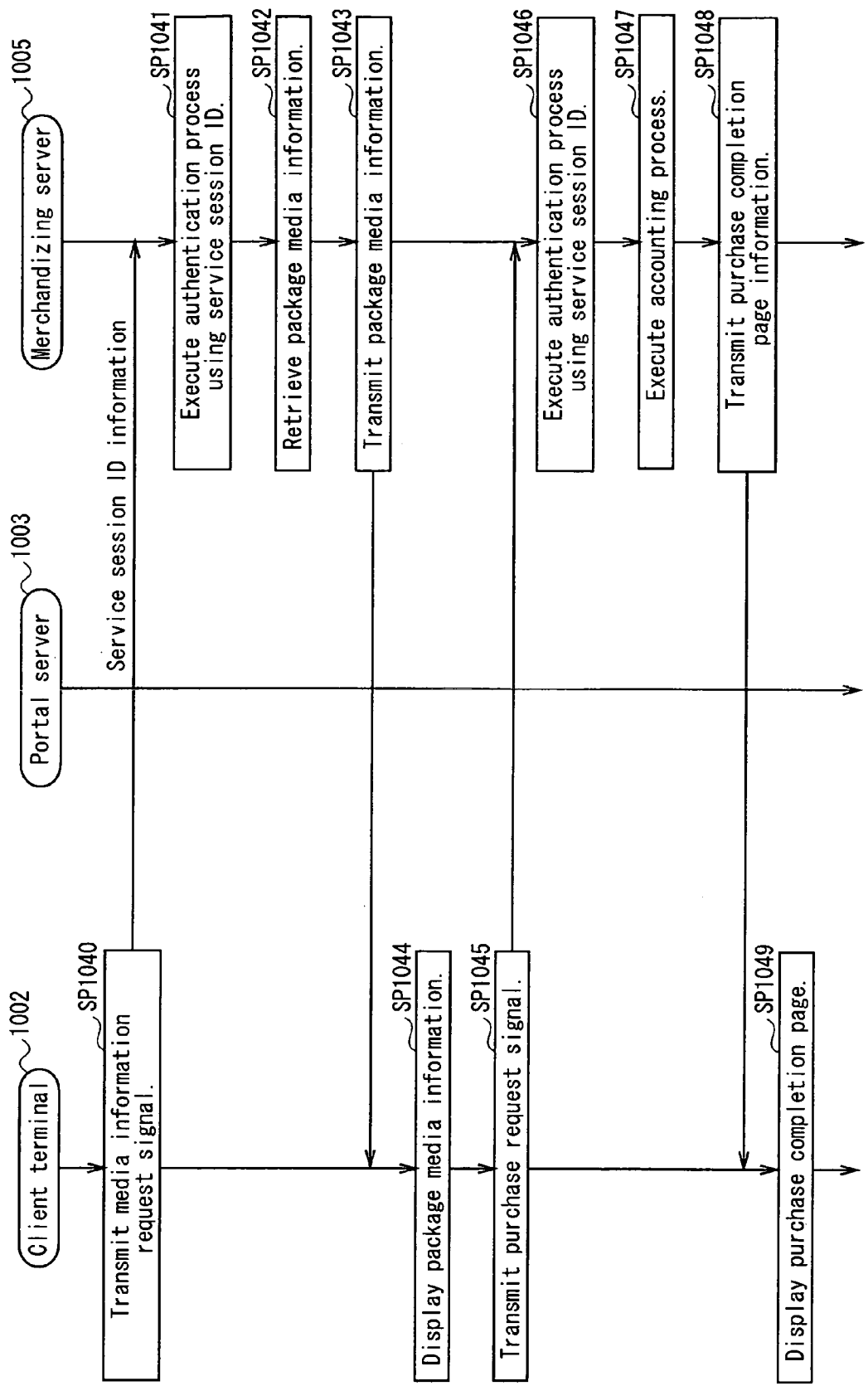
FIG. 18 is a sequence chart illustrating the processing sequence for providing a merchandising service.

Now, the merchandising service providing process sequence to be followed when the client terminal 1002 receives a merchandizing service from the merchandising server 1005 will be described below by referring to FIG. 18.

In Step SP1040, as a control command for selecting part of the page for merchandizing package media that is displayed as an image on the display section 1025 is input from the input processing section 1021, the control section 1023 of the client terminal 1002 generates a media information request signal requesting package media information relating to the package media that the user wants to be downloaded according to the input control command.

Then, the control section 1023 transmits the media information request signal to the merchandising server 1005 along with the service session ID information and the other pieces of information already issued by the merchandising server 1005 and temporarily stored in the authentication information memory section 1038 sequentially by way of the communication control section 1032 and the network interface 1033.

In Step SP1041, the control section 1090 of the merchandising server 1005 receives the media information request signal, the service session ID information and the other pieces of information transmitted from the client terminal 1002 sequentially by way of the network interface 1093 and the communication control section 1092 and transmits the service session ID information and the other pieces of information it received to the authentication processing section 1095.

Then, the authentication processing section 1095 executes a user authentication process under the control of the control section 1090, where it compares the service session ID information and the other pieces of information received from the client terminal 1002 with the service session ID information and the other pieces of information already temporarily stored in the authentication information memory section 1097.

If, as a result, the control section 1090 authenticates the user who requested package media information to be downloaded by utilizing the client terminal 1002 as authorized user by way of the authentication processing section 1095, it proceeds to the next step, or Step SP1042.

In Step SP1042, the retrieval section 1099 retrieves the package media information on the specific package media desired to be downloaded that meet the requirements for retrieval as indicated in the retrieval key that is contained in the media information request signal out of the plurality of pieces of package media information stored in the package media information memory section 1098, using the retrieval key.

Then, as the retrieval section 1099 retrieves the package media information, the control section 1090 has the authentication processing section 1095 extend the effective period of the service session ID information and the other pieces of information issued to the client terminal 1002 and proceeds to the next step, or Step SP1043.

In Step SP1043, the control section 1090 reads out the package media information retrieved by the retrieval section 1099 from the package media information memory section 1098 and transmits it to the client terminal 1002 along with the service session ID information and the other pieces of information, the effective period of which is extended by the authentication processing section 1095, sequentially by way of the communication control section 1092 and the network interface 1093.

In Step SP1044, the control section 1023 of the client terminal 1002 receives the package media information, the service session ID information and the other pieces of information transmitted from the merchandizing server 1005, the effective period of the service session ID information and the other pieces of information being extended, sequentially by way of the network interface 1033 and the communication control section 1032 and transmits the received package media information to the page information generating section 1036, while it transmits the service session ID information and the other pieces of information received from the merchandizing server 1005 to the authentication processing section 1037.

The authentication processing section 1037 temporarily stores the service session ID information and the other pieces of information that are received from the merchandizing server 1005 and the effective period of which is extended in the authentication information memory section 1038 under the control of the control section 1023 so as to overwrite the service session ID information and the other pieces of information before the extension of the effective period. In this way, it updates the service session ID information and the other pieces of information already temporarily stored in the authentication information memory section 1038 for the extended effective period.

The page information generating section 1036 generates video data on the basis of the package media information given from the control section 1023 and the display control section 1024 converts the generated video data into an analog video signal and transmits the analog video signal to the display section 1025.

Then, the control section 1023 has the display section 1025 display the package media information as an image that is based on the analog video signal, and proceeds to the next step, or Step SP1045.

In Step SP1045, as a control command requesting the purchase of a package media that corresponds to the package media information displayed as an image on the display section 1025 is input from the input processing section 1021, the control section 1023 generates a purchase request signal requesting the purchase of the package media in response to the input control command.

Then, the control section 1023 transmits the purchase request signal to the merchandizing server 1005 along with the service session ID information and the other pieces of information that are already received from the merchandizing server 1005 and temporarily stored in the authentication information memory section 1038 (the service session ID information and the other pieces of information, the effective period of which is extended) sequentially by way of the communication control section 1032 and the network interface 1033.

In Step SP1046, the control section 1090 of the merchandizing server 1005 receives the purchase request signal, the service session ID information and the other pieces of information transmitted from the client terminal 1002 sequentially by way of the network interface 1093 and the communication control section 1092 and transmits the service session ID information and the other pieces of information it received to the authentication processing section 1095.

The authentication processing section 1095 executes a user authentication process under the control of the control section 1090, where it compares the service session ID information and the other pieces of information received from the client terminal 1002 with the service session ID information and the other pieces of information already temporarily stored in the authentication information memory section 1097.

If, as a result, the control section 1090 authenticates the user requesting the purchase of the package media by utilizing the client terminal 1002 is an authorized user by way of the authentication processing section 1095, the control section 1090 proceeds to the next step, or Step SP1047.

In Step SP1047, the control section 1090 executes a purchase process involving the procedures for delivering the package media requested for the purchase to the user who utilizes the client terminal 1002 and, at the same time, transmits accounting information necessary for the accounting process to be executed for the purchase by the user of the package media to the accounting server 1008 sequentially by way of the communication control section 1092 and the network interface 1093 so as to have the accounting server 1008 execute the accounting process corresponding to the purchase by the user of the package media.

Additionally, the control section 1090 has the authentication processing section 1095 extend the effective period of the service session ID information and the other pieces of information issued to the client terminal 1002.

In Step SP1048, after the end of the accounting process, the control section 1090 transmits purchase completion page information indicating that the purchase process of the package media is completed to the client terminal 1002 along with the service session ID information and the other pieces of information, the effective period of which is extended by the authentication processing section 1095, sequentially by way of the communication control section 1092 and the network interface 1093.

In Step SP1049, the control section 1023 of the client terminal 1002 receives the purchase completion page information, the service session ID information and the other pieces of information transmitted from the merchandizing server 1005, the effective period of the service session ID information and the other pieces of information being extended, sequentially by way of the network interface 1033 and the communication control section 1032 and transmits the received purchase completion page information to the page information generating section 1036, while it also transmits the service session ID information and the other pieces of information also received from the merchandizing server 1005 to the authentication processing section 1037.

On the other hand, the authentication processing section 1037 temporarily stores the service session ID information and the other pieces of information that are received from the merchandizing server 1005 and the effective period of which is extended in the authentication information memory section 1038 under the control of the control section 1023 so as to overwrite the service session ID information and the other pieces of information before the extension of the effective period. In this way, it updates the service session ID information and the other pieces of information already temporarily stored in the authentication information memory section 1038 for the extended effective period.

The page information generating section 1036 generates video data on the basis of the purchase completion page information given from the control section 1023 and the display control section 1024 converts the generated video data into an analog video signal and transmits the analog video signal to the display section 1025.

Then, the control section 1023 has the display section 1025 display the purchase completion page as an image that is based on the analog video signal.

In this way, the client terminal 1002 can make the user purchase the package media data that the user wants to acquire, utilizing the merchandizing service provided by the merchandizing server 1005.

(3-7-3-3) On-Air List Information Delivery Service Providing Process Sequence

Figure 19:
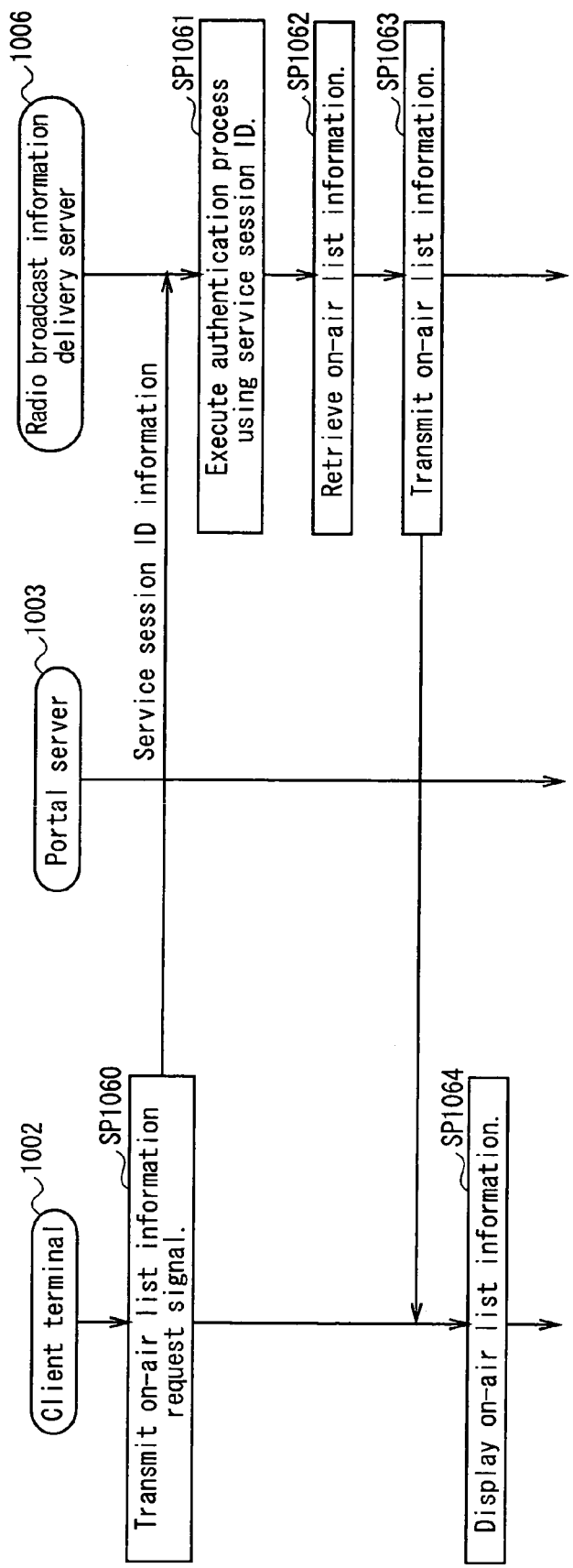
FIG. 19 is a sequence chart illustrating the processing sequence (A) for providing a radio broadcast information (on-air list information) delivery service.

Now, the on-air list information delivery service providing process sequence to be followed when the client terminal 1002 receives an on-air list information delivery service from the radio broadcast information delivery server 1006 as radio broadcast information delivery service will be described below by referring to FIG. 19.

In Step SP1060, as the retrieval key for retrieving the on-air list information that the user wants to acquire is operated in the input box of the page for delivering on-air list information that is displayed on the display section 1025 as an image and the control command that corresponds to the string of characters indicating the operated retrieval key is input from the input processing section 1021, the control section 1023 of the client terminal 1002 generates an on-air list information request signal requesting the on-air list information that the user wants to be downloaded according to the input control command.

Then, the control section 1023 transmits the on-air list information request signal to the radio broadcast information delivery server 1006 along with the service session ID information and the other pieces of information already issued by the radio broadcast information delivery server 1006 and temporarily stored in the authentication information memory section 1038 sequentially by way of the communication control section 1032 and the network interface 1033.

In Step SP1061, the control section 1110 of the radio broadcast information delivery server 1006 receives the on-air list information request signal, the service session ID information and the other pieces of information transmitted from the client terminal 1002 sequentially by way of the network interface 1113 and the communication control section 1112 and transmits the service session ID information and the other pieces of information it received to the authentication processing section 1115.

Then, the authentication processing section 1115 executes a user authentication process under the control of the control section 1110, where it compares the service session ID information and the other pieces of information received from the client terminal 1002 with the service session ID information and the other pieces of information already temporarily stored in the authentication information memory section 1120.

If, as a result, the control section 1110 authenticates the user who requested on-air list information by utilizing the client terminal 1002 as authorized user by way of the authentication processing section 1115, it proceeds to the next step, or Step SP1062.

In Step SP1062, the retrieval section 1118 retrieves the part of a predetermined range of the on-air list information that meets the requests for retrieval indicated in the retrieval key that is contained in the on-air list information request signal out of the entire on-air list information stored in the on-air list information memory section 1117 as on-air list information that is desired to be acquired by the user.

Then, as the retrieval section 1118 retrieves the on-air list information, the control section 1110 has the authentication processing section 1115 extend the effective period of the service session ID information and the other pieces of information issued to the client terminal 1002 and proceeds to the next step, or Step SP1063.

In Step SP1063, the control section 1070 reads out the on-air list information stored in the on-air list information memory section 1117 and retrieved by the retrieval section 1118 and transmits the read out on-air list information to the client terminal 1002 along with the service session ID information and the other pieces of information, the effective period of which is extended by the authentication processing section 1115, sequentially by way of the communication control section 1112 and the network interface 1113.

In Step SP1064, the control section 1023 of the client terminal 1002 receives the on-air list information, the service session ID information and the other pieces of information transmitted from the radio broadcast information delivery server 1006, the effective period of the service session ID information and the other pieces of information being extended, sequentially by way of the network interface 1033 and the communication control section 1032 and transmits the received on-air list information to the page information generating section 1036, and as well as transmits the service session ID information and the other pieces of information received from the radio broadcast information delivery server 1006 to the authentication processing section 1037.

The authentication processing section 1037 temporarily stores the service session ID information and the other pieces of information that are received from the radio broadcast information delivery server 1006 and the effective period of which is extended in the authentication information memory section 1038 under the control of the control section 1023 so as to overwrite the service session ID information and the other pieces of information before the extension of the effective period. In this way, it updates the service session ID information and the other pieces of information already temporarily stored in the authentication information memory section 1038 for the extended effective period.

Additionally, the page information generating section 1036 generates video data on the basis of the on-air list information given from the control section 1023 and the display control section 1024 converts the generated video data into an analog video signal and transmits the analog video signal to the display section 1025 so as to have the latter display the on-air list information as an image based on the analog video signal.

Thus, the client terminal 1002 can acquire the on-air list information that the user wants, utilizing the radio broadcast information delivery service provided by the radio broadcast information delivery server 1006.

(3-7-3-4) Now-On-Air Information Delivery Service Providing Process Sequence

Figure 20:
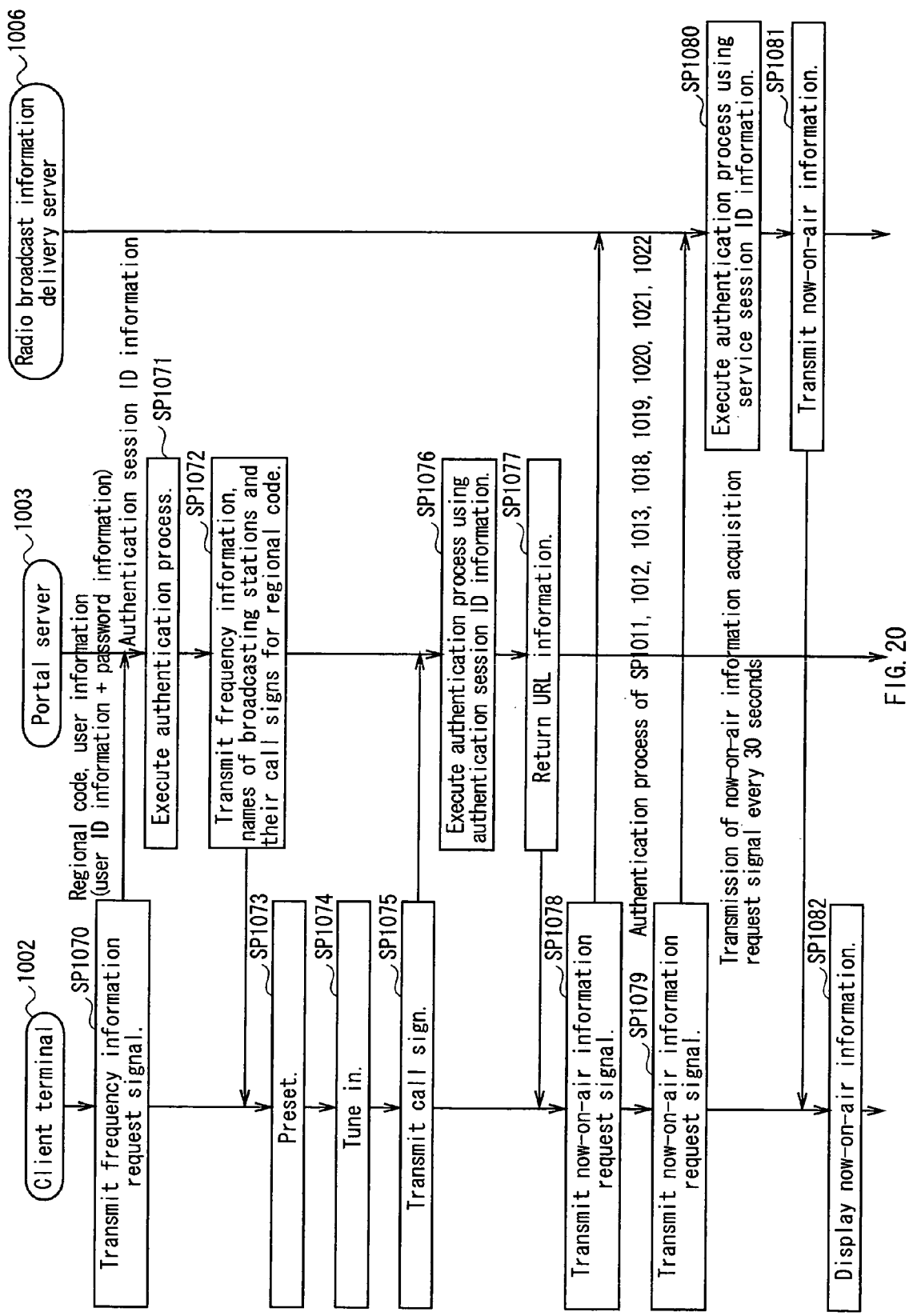
FIG. 20 is a sequence chart illustrating the processing sequence (B) for providing a radio broadcast information (now-on-air list information) delivery service.

Now, the radio broadcast information delivery service providing process sequence to be followed when the client terminal 1002 receives a now-on-air information delivery service from the radio broadcast information delivery server 1006 as radio broadcast information delivery service will be specifically described below by referring to FIG. 20.

Note that a radio broadcast information delivery server 1006 that provides now-on-air information is provided for each radio station (call sign).

In the initial stages, the client terminal 1002 may not store the URL information of the radio broadcast information delivery servers 1006 that correspond to respective radio stations.

Therefore, it is assumed in the following description of the radio broadcast information delivery service providing process sequence that the URL information of radio broadcast information delivery servers 1006 is managed by the portal server 1003 for the call sign of each radio station.

In such a radio broadcast information delivery service providing process sequence, it is assumed that the client terminal 1002 may not store authentication session ID information and other pieces of information in the authentication information memory section 1038 when the client terminal 1002 requests the portal server 1003 to provide frequency information indicating the broadcasting frequency of each radio station in order to automatically preset the broadcasting frequency of the radio station. Therefore, the client terminal 1002 has to firstly transmit user ID information, password information and other pieces of information of the user to the portal server 1003.

In Step SP1070, as an operation command requesting to automatically preset the broadcasting frequency of each radio station that can be received by the client terminal 1002 is input from the input processing section 1021, the control section 1023 of the client terminal 1002 transmits a frequency information request signal requesting frequency information on the broadcasting frequency of each ratio station to the portal server 1003 along with the regional code input by the user as well as the user ID information, the password information and other pieces of information stored in the authentication information memory section 1038 sequentially by way of the communication control section 1032 and the network interface 1033.

In Step SP1071, the control section 1050 of the portal server 1003 receives the frequency information request signal, the regional code, the use ID information, the password information and the other pieces of information transmitted from the client terminal 1002 sequentially by way of the network interface 1053 and the communication control section 1052 and transmits the user ID information, the password information and the other pieces of information it received from the client terminal 1002 to the authentication processing section 1056.

Then, the authentication processing section 1056 executes a user authentication process under the control of the control section 1050, where it compares the user ID information, the password information and the other pieces of information received from the client terminal 1002 with the client information registered in the client database section 1054.

If, as a result, the authentication processing section 1056 authenticates the user who is utilizing the client terminal 1002 as authorized user and the request for acquiring frequency information from the client terminal 1002 is a proper request, it issues authentication session ID information for the state of connection for communication between the client terminal 1002 and the portal server 1003 at present under the control of the control section 1050 and, at the same time, temporarily stores the issued authentication session ID information in the authentication information memory section 1057 along with other pieces of information.

As the user is authenticated by the authentication processing section 1056 as authorized user, the control section 1050 proceeds to the next step, which is Step SP1072.

In Step SP1072, the control section 1050 retrieves the frequency information, the names of the radio stations and their call signs that correspond to the input regional code out of the list of a plurality of pieces of frequency information, names of radio stations and their call signs stored in the frequency information memory section 1058, prepares a list of them and reads them out.

Then, the control section 1050 transmits the frequency information, the names of the radio stations and their call signs it read out as a list from the frequency information memory section 1058 to the client terminal 1002 along with the authentication session ID information and so on issued by the authentication processing section 1056 to the client terminal 1002 in the above-described Step SP1071 sequentially by way of the communication control section 1052 and the network interface 1053.

In Step SP1073, the control section 1023 of the client terminal 1002 receives the list of the frequency information, the names of the radio stations, their call signs and the authentication session ID information and so on transmitted from the portal server 1003 sequentially by way of the network interface 1033 and the communication control section 1032 and transmits the authentication session ID information and so on received from the portal server 1003 to the authentication processing section 1037, while it also transmits the list of the frequency information, the names of the radio stations and their call signs to the display control section 1024.

Then, the authentication processing section 1037 temporarily stores the authentication session ID information and the other pieces of information received from the portal server 1003 in the authentication information memory section 1038 under the control of the control section 1023.

The display control section 1024 transmits the list of the frequency information, the names of the radio stations and their call signs given from the control section 1023 to the display section 1025 and has it display the list.

Additionally, the control section 1023 stores the frequency information, the name of the radio station and its call sign that are selected out of the list by the selection command input from the input processing section 1021 in the recording medium 1029 as preset information and proceeds to the next step, or Step SP1074.

In Step SP1074, the control section 1023 controls the tuner section 1031 so as to have it extract the radio broadcast signal of the radio program that is being broadcast at the broadcasting frequency corresponding to the tuning control command input from the input processing section 1021 out of the radio broadcasting waves.

Then, the tuner section 1031 extracts the radio broadcast signal that is being broadcast at the broadcasting frequency out of the radio broadcasting waves received by the broadcasting signal receiving section 1030 and executes a predetermined reception process such as decoding on the radio broadcast signal. Then, it transmits the audio data obtained as a result of the reception process to the sound control section 1026.

Subsequently, the sound control section 1026 converts the audio data that is given to it from the tuner section 1031 into an analog audio signal and transmits the obtained analog audio signal to the speaker 1027. Thus, the sounds of the selected radio program can be output from the speaker 1027.

In Step SP1075, the radio broadcasting display control section 1039 reads out the call sign that is stored in the recording medium 1029 and corresponds to the frequency information indicating the broadcasting frequency that by turn corresponds to the above described tuning control command under the control of the control section 1023 and transmits the read out call sign to the portal server 1003 along with the authentication session ID information and the other pieces of information already temporarily stored in the authentication information memory section 1038 sequentially by way of the communication control section 1032 and the network interface 1033.

In Step SP1076, the control section 1050 of the portal server 1003 receives the call sign, the authentication session ID information and the other pieces of information transmitted from the client terminal 1002 sequentially by way of the network interface 1053 and the communication control section 1052 and transmits the authentication session ID information and the other pieces of information it received to the authentication processing section 1056.

Then, the authentication processing section 1056 executes a user authentication process under the control of the control section 1050, where it compares the authentication session ID information and the other pieces of information received from the client terminal 1002 with the authentication session ID information and the other pieces of information already temporarily stored in the authentication information memory section 1057.

If, as a result, the authentication processing section 1056 authenticates that the user who transmitted the call sign by utilizing the client terminal 1002 is an authorized user probably because the effective period of the authentication session ID information and the other pieces of information received from the client terminal 1002 has not expired yet, the control section 1050 proceeds to the next step, or Step SP1077.

In Step SP1077, the control section 1050 retrieves the piece of URL information that is correlated with the call sign out of the plurality of pieces of URL information stored in the URL memory section 1059 by referring to the call sign received from the client terminal 1002.

Additionally, the control section 1050 has the authentication processing section 1056 extend the effective period of the authentication session ID information and the other pieces of information issued to the client terminal 1002.

Then, the control section 1050 reads out the retrieved URL information from the URL memory section 1059 and transmits the read out URL information to the client terminal 1002 along with the authentication session ID information and the other pieces of information, the effective period of which is extended by the authentication processing section 1056, sequentially by way of the communication control section 1052 and the network interface 1053.

In Step SP1078, the control section 1023 of the client terminal 1002 receives the URL information, the authentication session ID information and the other pieces of information transmitted from the portal server 1003, the effective period of the authentication session ID information and the other pieces of information being extended, sequentially by way of the network interface 1033 and the communication control section 1032 and transmits the authentication session ID information and the other pieces of information it received to the authentication processing section 1037, while it transmits the URL information to the radio broadcasting display control section 1039.

Then, the authentication processing section 1037 temporarily stores the authentication session ID information and the other pieces of information that are received from the portal server 1003 and the effective period of which is extended in the authentication information memory section 1038 under the control of the control section 1023 so as to overwrite the authentication session ID information and the other pieces of information before the extension of the effective period. In this way, it updates the authentication session ID information and the other pieces of information temporarily stored in the authentication information memory section 1038 for the extended effective period.

The radio broadcasting display control section 1039 temporarily stores the URL information given from the control section 1023 in the recording medium 1029 under the control of the control section 1023, correlating it with the call sign stored in the recording medium 1029.

Then, the radio broadcasting display control section 1039 transmits a now-on-air information request signal requesting to acquire now-on-air information to the radio broadcast information delivery server 1006 under the control of the control section 1023 according to the URL information temporarily stored in the recording medium 1029 or the like along with the service session ID information and the other pieces of information that are already received from the radio broadcast information delivery server 1006 and temporarily stored in the authentication information memory section 1038 sequentially by way of the communication control section 1032 and the network interface 1033.

Note that the process of transmitting the now-on-air information request signal, the service session ID information and the other pieces of information from the client terminal 1002 to the radio broadcast information delivery server 1006 in Step SP1078 of this radio broadcast information delivery service providing process sequence corresponds to the process of the Step SP1010 described earlier by referring to FIG. 16.

Therefore, in this radio broadcast information delivery service providing process sequence, the client terminal 1002, the radio broadcast information delivery server 1006 and the portal server 1003 execute a user authentication process similar to the one executed in the Steps SP1011 through SP1013 and the Step SP1018 through SP1022 as described above by referring to FIG. 16 immediately after the process of Step SP1078 and then proceed to the next step, or Step SP1079.

In Step SP1079, the radio broadcasting display control section 1039 of the client terminal 1002 transmits the now-on-air information request signal according to the URL information temporarily stored in the recording medium 1029 or the like again to the radio broadcast information delivery server 1006 under the control of the control section 1023 along with the service session ID information and the other pieces of information already received from the radio broadcast information delivery server 1006 and temporarily stored in the authentication information memory section 1038 sequentially by way of the communication control section 1032 and the network interface 1033.

In Step SP1080, the control section 1110 of the radio broadcast information delivery server 1006 receives the now-on-air information request signal, the service session ID information and the other pieces of information transmitted from the client terminal 1002 sequentially by way of the network interface 1113 and the communication control section 1112 and transmits the authentication session ID information and the other pieces of information it received to the authentication processing section 1115.

Then, the authentication processing section 1115 executes a user authentication process under the control of the control section 1110, where it compares the service session ID information and the other pieces of information received from the client terminal 1002 with the service session ID information and the other pieces of information already temporarily stored in the authentication information memory section 1120.

If, as a result, the authentication processing section 1115 authenticates the user who is utilizing the client terminal 1002 as authorized user, it determines that the request for acquiring now-on-air information from the client terminal 1002 is a proper request.

Then, as the user who is utilizing the client terminal 1002 is authenticated as authorized user by the authentication processing section 1115, the control section 1110 has the authentication processing section 1115 extend the effective period of the service session ID information and the other pieces of information issued to the client terminal 1002 and proceeds to the next step, or Step SP1081.

In Step SP1081, the control section 1110 reads out the now-on-air information from the now-on-air information memory section 1119 and transmits the read out now-on-air information to the client terminal 1002 along with the service session ID information and the other pieces of information, the effective period of which is extended by the authentication processing section 1115, sequentially by way of the communication control section 1112 and the network interface 1113.

In Step SP1082, the control section 1023 of the client terminal 1002 receives the now-on-air information, the service session ID information and the other pieces of information transmitted from the radio broadcast information delivery server 1006, the effective period of the service session ID information and the other pieces of information being extended, sequentially by way of the network interface 1033 and the communication control section 1032 and transmits the received service session ID information and the other pieces of information to the authentication processing section 1037, while it also transmits the now-on-air information to the radio broadcasting display control section 1039.

Then, the authentication processing section 1037 temporarily stores the service session ID information and the other pieces of information that are received from the radio broadcast information delivery server 1006 and the effective period of which is extended in the authentication information memory section 1038 under the control of the control section 1023 so as to overwrite the service session ID information and the other pieces of information before the extension of the effective period. In this way, it updates the service session ID information and the other pieces of information already temporarily stored in the authentication information memory section 1038.

Additionally, the radio broadcasting display control section 1039 transmits the now-on-air information given from the control section 1023 to the display section 1025 by way of the display control section 1024 so as to have the display section 1025 display the now-on-air information relating to the radio program of the radio broadcasting that is being received.

In the above-described radio broadcast information delivery service providing process sequence, the client terminal 1002 periodically repeats the execution of the now-on-air information acquisition requesting process in Step SP1079, whereas the radio broadcast information delivery server 1006 executes the processing operations in Steps SP1080 and SP1081 in response to each acquisition request it receives from the client terminal 1002.

Thus, the client terminal 1002 can display the title of the radio program it is currently receiving, the clock time when the program started, the clock time when the prom ends, the title of the piece of music that is now-on-air in the radio program, the names of the performing artists, the clock time when the piece of music started and other pieces of information as now-on-air information, while incessantly updating the now-on-air information.

With the above-described arrangement, the music-related service providing system 1000 can accurately authenticate the user registered so as to receive the music-related services provided by the system 1000 and allow the client terminal 2 that the user utilizes to acquire related information (now-on-air information, on-air list information, and so on) relating to the contents of the broadcast information of radio broadcasting or the like.

Therefore, the music-related service providing system 1000 can prevent any third party from acquiring such related information and fraudulently utilize the information.

The client terminal 1002 of the second embodiment described above by referring to FIG. 9 corresponds to the terminal apparatus 10 of the first embodiment of recording apparatus 1 according to the invention. Additionally, the portal server 1003 described above by referring to FIG. 11 corresponds to the comprehensive service server 35 of the first embodiment. Furthermore, the radio broadcast information delivery server 1006 described above by referring to FIG. 14 corresponds to the broadcasting station server 32 of the first embodiment.

Still additionally, the music information delivery server 1004 described above by referring to FIG. 12 corresponds to the music delivery server 33 of the first embodiment. Finally, the merchandizing server 1005 described above by referring to FIG. 13 corresponds to the CD shop server 34 of the first embodiment.

Meanwhile, the HTTP message program 111 and the communicator program 112 in FIG. 5 that illustrates the program modules of the above-described terminal apparatus 10 are program modules that can realize functions similar to those of the client terminal 1002 and the communication control section 1032 respectively, which are described above by referring to FIG. 9.

The contents reproduction module 113 is a program module that can realize a function similar to that of the encoder/decoder section 1034 of the client terminal 1002, which is described above by referring to FIG. 9.

Additionally, the copyright protecting information management module 114 is a program module that can realize a function similar to that of the copyright management section 1035 of the client terminal 1002, which is described above by referring to FIG. 9.

Still additionally, the Internet radio tuning/reproduction module 118 is a program module that can realize a function similar to that of the control section 1023 and the sound control section 1026 as combined of the client terminal 1002, which are described above by referring to FIG. 9.

Still additionally, the piece of music purchase/reproduction module 119 is also a program module that can realize a function similar to that of the control section 1023 and the sound control section 1026 as combined of the client terminal 1002, which are described above by referring to FIG. 9.

Still additionally, the XML browser 151 is a program module that can realize a function similar to that of the input processing section 1021 and the page information generating section 1036 as combined of the client terminal 1002, which are described above by referring to FIG. 9.

Still additionally, the hard disk contents controller 117, the database access module 115 and the contents data access module 116 are program modules that can realize a function similar to that of the control section 1023 of the client terminal 1002, which is described above by referring to FIG. 9.

Still additionally, the authentication library 131 of the library 130 is a program module that can realize a function similar to that of the authentication processing section 1037 and the authentication information memory section 1038 as combined of the client terminal 1002, which are described above by referring to FIG. 9.

Still additionally, the clip library 132 of the library 130 is a program module that can realize a function similar to that of the control section 1023 of the client terminal 1002, which is described above by referring to FIG. 9.

Still additionally, the related information display module 120 is a program module that can realize a function similar to that of the radio broadcasting display control section 1039 of the client terminal 1002, which is described above by referring to FIG. 9.

Still additionally, the tuner tuning/reproduction/recording module 121 is a program module that can realize a function similar to that of the control section 1023 and the sound control section 1026 as combine of the client terminal 1002, which are described above by referring to FIG. 9.

Still additionally, the audio user interface 152 is a program module that can realize a function similar to that of the input processing section 1021 and the control section 1023 as combined of the client terminal 1002, which are described above by referring to FIG. 9.

Still additionally, the CD replay module 141 is a program module that can realize a function similar to that of the sound control section 1026 and the external recording medium recording/reproduction section 1028 as combined of the client terminal 1002, which are described above by referring to FIG. 9.

Finally, the HDD reproduction module 142 is a program module that can realize a function similar to that of the control section 1023 and the sound control section 1026 as combined of the client terminal 1002, which are described above by referring to FIG. 9.

Therefore, the terminal apparatus 10 having a hardware configuration realized by using the hardware circuit blocks that are described above by referring to FIG. 4 can execute processes like the client terminal 1002 having a hardware configuration realized by the functional circuit blocks, which are described above by referring to FIG. 9.

While the above-described embodiment is described in terms of terrestrial radio broadcasting of radio programs that are broadcast from radio stations and can be received by the client terminal 1002, the present invention is by no means limited thereto and it may alternatively be so arranged that the client terminal 1002 is adapted to receive Internet radio broadcasting or satellite radio broadcasting to acquire related information and radio broadcast information. Still alternatively, it may be so arranged that the client terminal 1002 is adapted to receive television broadcast of television programs that are broadcast from television stations and acquire various pieces of broadcast information relating to television programs from a server on the network NT1000.

While a recording apparatus according to the present invention is described above in terms of the first and second embodiments that are a terminal apparatus 10 and a client terminal 1002 respectively, the present invention is by no means limited thereto and has a wide scope of application that covers personal computers, portable phones, PDAs (personal digital assistances), game machines and other information processing apparatus as well as television receiving sets, radio broadcast receiving sets, DVDs (digital versatile disks) and hard disk recorders.

More specifically, while hardware circuit blocks, functional circuit blocks and program modules are installed in the above-described first and second embodiments, which are a terminal apparatus 10 and a client terminal 1002 respectively, the present invention is by no means limited thereto and such elements may be installed in various terminal apparatus such as portable phones and personal computers other than terminal apparatus 10 and client terminals 1002. Namely, terminal apparatus in which hardware circuit blocks, functional circuit blocks and program modules are installed can execute processes just like the terminal apparatus 10 and the client terminal 1002 that are described above.

While a program according to the present invention is applied to the program modules described above by referring to FIG. 5, the present invention is by no means limited thereto and a program may have any of various other possible configurations when it is applied to the program modules.

While the embodiments of the present invention are described in terms of the communication processing section 22 and the network interface 23 of the terminal apparatus 10 and the communication control section 1032 of the client terminal 1002, which are described by referring to FIGS. 1 through 20, that operate as reception means for receiving information relating to the contents contained in the broadcast information that is being received, the present invention is by no means limited thereto and any of various other reception means can be used for the purpose of the present invention depending on the communication system that is employed between the recording apparatus and the apparatus for providing contents-related information.

While the CPU 11 and the hard disk drive 21 (or the RAM 20) of the terminal apparatus 10 and the control section 1023 and the recording medium 10029 of the client terminal 1002 are adapted to operate as temporary memory means for temporarily storing contents-related information in the description of the present invention given above by referring to FIGS. 1 through 20, the present invention is by no means limited thereto and any of various other temporary memory means including magneto-optical disks and semiconductor memories can be used to temporarily store contents-related information for the purpose of the present invention.

While the CPU 11 and the hard disk drive 21 (or the RAM 20) of the terminal apparatus 10 and the control section 1023 and the recording medium 10029 of the client terminal 1002 are adapted to operate as related information recording means for recording related information in a keeping means from the temporary memory means that temporarily stores the related information in the description of the present invention given above by referring to FIGS. 1 through 20, the present invention is by no means limited thereto and any of various other related information recording means can be used for the purpose of the present invention so long as such a means can record related information in the keeping means from the temporary memory means.

Furthermore, while the CPU 11 and the hard disk drive 21 (or the RAM 20) of the terminal apparatus 10 and the control section 1023 and the recording medium 10029 of the client terminal 1002 are adapted to operate as broadcast information recording means for recording the broadcast information that is being received in the keeping means, correlating it with the related information to be recorded in the keeping means, in response to an externally input recording request in the description given above by referring to FIGS. 1 through 20, the present invention is by no means limited thereto and any of various other broadcast information recording means can be used so long as such a means can record the broadcast information that is being received in the keeping means, correlating it with the related information.

While the comprehensive service server 35 and the portal server 1003 are adapted to operate as authentication server having an authentication function in the description of the present invention given above by referring to FIGS. 1 through 20, the present invention is by no means limited thereto and any of various other authentication servers such as a server having only an authentication function may be used.

While the broadcast station server 32 and the radio broadcast information delivery server 1006 are adapted to operate as related information providing server having a function of providing contents-related information in the description of the embodiments given above by referring to FIGS. 1 through 20, the present invention is by no means limited thereto and any of various other related information providing servers such as the CD title information providing server 31 and servers for running television broadcasting stations may be used for the purpose of the present invention so long as such a server can provide information relating to the contents contained in broadcast information.

Finally, while a shop code as described above by referring to FIGS. 1 through 20 is used as service identifying information for identifying the related information providing server that is transmitted from the related information providing server along with information indicating an authentication error to the terminal apparatus, the present invention is by no means limited thereto and any of various other pieces of service identifying information can be used so long as such a piece of information can be used to identify the related information providing server.

INDUSTRIAL APPLICABILITY

The present invention can be utilized in recording apparatus of personal computers, portable phones and other appliances.

EXPLANATION OF REFERENCE NUMERALS

1 . . . RECORDING APPARATUS, 2 . . . RECEPTION MEANS, 3 . . . TEMPORARY MEMORY MEANS, 4 . . . KEEPING MEANS, 5 . . . RELATED INFORMATION RECORDING MEANS, 6 . . . BROADCAST INFORMATION RECORDING MEANS, 7 . . . RECORDING TIME

SETTING MEANS, 8 ... SOUND INFORMATION SYNTHESIZING MEANS, 10 ... TERMINAL APPARATUS, 11 ... CPU, 20 ... RAM, 21 ... HARD DISK DRIVE, 22 ... COMMUNICATION PROCESSING SECTION, 23 ... NETWORK INTERFACE, 30, NT1000 ... NETWORK, 31 ... CD TITLE INFORMATION PROVIDING SERVER, 32 ... BROADCASTING STATION SERVER, 32A ... BROADCASTING STATION, 35 ... COMPREHENSIVE SERVICE SERVER, 1002 ... CLIENT TERMINAL, 1003 ... PORTAL SERVER, 1006 ... RADIO BROADCAST INFORMATION DELIVERY SERVER, 1023 ... CONTROL SECTION, 1032 ... COMMUNICATION CONTROL SECTION, 1029 ... RECORDING MEDIUM

The invention claimed is:

1. A content receiving apparatus, comprising:
a receiver that receives first contents-related information from a server;
broadcast information recording processing circuitry that receives first contents broadcast from a broadcasting station and that stores a part of the first contents in a memory of the content receiving apparatus during a first period of time, the content receiving apparatus being separate from the broadcasting station and the server being separate from the broadcasting station;
a temporary memory, associated with the content receiving apparatus, that temporarily stores the first contents-related information related to the first contents; and
information recording processing circuitry that receives the first contents-related information from the temporary memory and stores the first contents-related information in the memory during a second period of time in response to an external input recording request received by the content receiving apparatus, the memory being separate from the temporary memory and the external input recording request being received during reception of the first contents from the broadcasting station;
sound information synthesizing circuitry that synthesizes sound information with the first contents being received at a time when the external input recording request is received by the content receiving apparatus, wherein
the broadcast information recording processing circuitry and the information recording processing circuitry store a remaining part of the first contents and the first contents-related information, respectively, in the memory during the second period of time in response to the external input recording request being received by the content receiving apparatus so as to correlate the first contents and the first contents-related information,
the memory stores a plurality of second contents and a plurality of second contents-related information received from the server, the second contents-related information being related to the first contents,
the first contents with synthesized sound information are correlated with the first contents-related information, and
the broadcast information recording processing circuitry records the correlated first contents with the synthesized sound information and the first contents-related information in the memory.

2. The apparatus according to claim 1, wherein the broadcast information recording processing circuitry records the first contents at predetermined times in a buffer, included in the memory, and records the part of the first contents before the external input recording request and records the remaining part of the first contents after the external input recording request.

3. The apparatus according to claim 2, wherein
the predetermined times are modified to include recording amounts of the first contents for predetermined time periods in the buffer.

4. A content receiving method performed by a content receiving apparatus, the method comprising:
receiving first contents broadcast from a broadcasting station by broadcast information recording processing circuitry of the content receiving apparatus and first contents-related information from a server by a receiver of the content receiving apparatus, the content receiving apparatus being separate from the broadcasting station and the server being separate from the broadcasting station;
storing, in a memory, a part of the first contents by the broadcast information recording processing circuitry during a first period of time;
temporarily storing, using the receiver, the first contents-related information related to the first contents in a temporary memory, separate from the memory;
receiving, from a user, an external input recording request by the receiver during the receiving of the first contents from the broadcasting station;
storing, using the broadcast information recording processing circuitry and information recording processing circuitry in the memory, separate from the temporary memory, at least a remaining part of the first contents and the first contents-related information in response to the external input recording request during a second period of time;
correlating, using the broadcast information recording processing circuitry, in the memory, the first contents to the first contents-related information in response to the external input recording request;
storing, using the broadcast information recording processing circuitry and the information recording processing circuitry in the memory, a plurality of second contents and a plurality of second contents-related information received from the server, the second contents-related information being related to the first contents;
synthesizing, using sound information synthesizing circuitry, sound information with the first contents being received at a time when the external input recording request is received;
correlating, using the broadcast information recording processing circuitry, the first contents with the synthesized sound information and the first contents-related information;
recording, using the broadcast information recording processing circuitry, the correlated first contents with the synthesized sound information and the first contents-related information; and
storing, using the broadcast information recording processing circuitry, the correlated first contents with the synthesized sound information and the first contents-related information in the memory.

5. The method according to claim 4, further comprising:
recording the first contents at predetermined times in a buffer included in the memory; and
recording the part of the first contents before the external input recording request and recording the remaining part of the first contents after the external input recording request.

6. The method according to claim 5, further comprising:
modifying the predetermined times to include recording amounts of the first contents for predetermined time periods in the buffer.

7. A non-transitory computer-readable storage medium having embedded therein instructions, which when executed by a processor, cause the processor to perform a method comprising:
receiving first contents broadcast from a broadcasting station and first contents-related information from a server by a receiver, the processor being separate from the broadcasting station and the server being separate from the broadcasting station;
storing, in a memory, a part of the first contents during a first period of time;
temporarily storing the first contents-related information related to the first contents in a temporary memory, separate from the memory;
receiving, from a user, an external input recording request in the receiver during the receiving of the first contents from the broadcasting station;
storing, in the memory, separate from the temporary memory, at least a remaining part of the first contents and the first contents-related information in response to the external input recording request during a second period of time;
correlating, in the memory, the first contents to the first contents-related information in response to the external input recording request;
storing, in the memory, a plurality of second contents and a plurality of second contents-related information received from the server, the second contents-related information being related to the first contents;
synthesizing sound information with the first contents being received at a time when the external input recording request is received;
correlating the first contents with the synthesized sound information and the first contents-related information;
recording the correlated first contents with the synthesized sound information and the first contents-related information; and
storing the correlated first contents with the synthesized sound information and the first contents-related information in the memory.

8. The apparatus according to claim 1, wherein
the memory stores a plurality of the first contents in response to a single user operation, the first contents being included in one broadcast program.

9. The method according to claim 4, further comprising:
storing a plurality of the first contents in response to a single user operation, the first contents being included in one broadcast program.

10. The non-transitory computer-readable storage medium according to claim 7 including instructions for causing the processor to execute the method, further comprising:
storing a plurality of the first contents in response to a single user operation, the first contents being included in one broadcast program.

11. A content receiving apparatus, comprising:
a receiver that receives first contents-related information from a server;
broadcast information recording processing circuitry that receives first contents broadcast from a broadcasting station and that stores a part of the first contents in a memory of the content receiving apparatus during a first period of time, the content receiving apparatus being separate from the broadcasting station and the server being separate from the broadcasting station;
information recording processing circuitry that receives the first contents-related information from a temporary memory and stores the first contents-related information in the memory during a second period of time in response to an external input recording request received by the content receiving apparatus, the memory being separate from the temporary memory and the external input recording request being received during reception of the first contents from the broadcasting station; and
sound information synthesizing circuitry that synthesizes sound information with the first contents being received at a time when the external input recording request is received by the content receiving apparatus, wherein
the broadcast information recording processing circuitry and the information recording processing circuitry store a remaining part of the first contents and the first contents-related information, respectively, in the memory during the second period of time in response to the external input recording request being received by the content receiving apparatus so as to correlate the first contents and the first contents-related information,
the memory stores a plurality of second contents and a plurality of second contents-related information received from the server, the second contents-related information being related to the first contents,
the first contents with synthesized sound information are correlated with the first contents-related information, and
the broadcast information recording processing circuitry records the correlated first contents with the synthesized sound information and the first contents-related information in the memory.

12. The content receiving apparatus according to claim 1, wherein
the temporary memory temporarily stores the first contents-related information related to the first contents at specific time intervals.

13. The content receiving method according to claim 4, wherein
temporarily storing the first contents-related information related to the first contents includes temporarily storing the first contents-related information at specific time intervals.

14. The non-transitory computer-readable storage medium according to claim 7, wherein
temporarily storing the first contents-related information related to the first contents includes temporarily storing the first contents-related information at specific time intervals.

15. The content receiving apparatus according to claim 11, wherein
the temporary memory temporarily stores the first contents-related information related to the first contents at specific time intervals.

16. The content receiving apparatus according to claim 1, wherein the remaining part of the first contents and the first contents-related information are received separately by the content receiving apparatus from the broadcasting station and the server, respectively.

* * * * *